US008743317B2

(12) United States Patent
Shiota et al.

(10) Patent No.: US 8,743,317 B2
(45) Date of Patent: Jun. 3, 2014

(54) IMAGE FORMING APPARATUS COMPRISING A TRANSPARENT LAYER AND AN OPTICAL ABSORPTION LAYER ARRANGED IN A PITCH OF 1/N OF A PIXEL PITCH

(75) Inventors: Kunihiro Shiota, Kanagawa (JP); Koji Mimura, Kanagawa (JP); Hiroshi Tanabe, Kanagawa (JP); Koji Shigemura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 355 days.

(21) Appl. No.: 12/903,364

(22) Filed: Oct. 13, 2010

(65) Prior Publication Data

US 2011/0085182 A1    Apr. 14, 2011

(30) Foreign Application Priority Data

Oct. 13, 2009  (JP) ................. 2009-235850

(51) Int. Cl.
 *G02F 1/1335* (2006.01)
 *G02F 1/1333* (2006.01)
(52) U.S. Cl.
 USPC ............................ 349/66; 349/110
(58) Field of Classification Search
 CPC .............. G06F 1/133524; G06F 1/13476
 USPC .......................... 349/66, 110–111
 See application file for complete search history.

(56) References Cited

U.S. PATENT DOCUMENTS

| | | | |
|---|---|---|---|
| 5,875,013 A * | 2/1999 | Hiroshi | ............ 349/110 |
| 8,026,880 B2 | 9/2011 | Mimura et al. | |
| 8,325,303 B2 | 12/2012 | Hiroya et al. | |
| 8,497,960 B2 | 7/2013 | Hiroya et al. | |
| 2007/0029550 A1 | 2/2007 | Yoshida et al. | |
| 2007/0139765 A1 | 6/2007 | Daniel et al. | |
| 2008/0144179 A1 * | 6/2008 | Mimura et al. | ............ 359/599 |
| 2008/0284958 A1 * | 11/2008 | Hiroya et al. | ............ 349/123 |

FOREIGN PATENT DOCUMENTS

| | | |
|---|---|---|
| CN | 101153923 | 4/2008 |
| CN | 101308280 | 11/2008 |
| JP | 60-140322 | 7/1985 |
| JP | 64-25123 | 1/1989 |
| JP | 2005-072662 | 3/2005 |
| JP | 2005-181744 | 7/2005 |
| JP | 2006-085137 | 3/2006 |
| JP | 2006-330331 | 12/2006 |
| JP | 2007-047202 | 2/2007 |
| JP | 2008-185964 | 8/2008 |

OTHER PUBLICATIONS

CN Office Action dated Dec. 4, 2013, with English Translation; Application No. 201010510294.4.
JP Office Action dated Dec. 6, 2013, with English Translation; Application No. 2009-235850.

* cited by examiner

*Primary Examiner* — Paul Lee

(74) *Attorney, Agent, or Firm* — Young & Thompson

(57) ABSTRACT

An image forming apparatus includes: a functional element substrate to which a pixel is formed in a predetermined cycle; an opposed substrate formed on the functional element substrate; and an optical device arranged on the opposed substrate, which includes a transparent layer and an optical absorption layer arranged in a cycle of 1/n (n is an integer number) of the cycle of arranging the pixel, and restricts spread of transmitted light.

20 Claims, 41 Drawing Sheets

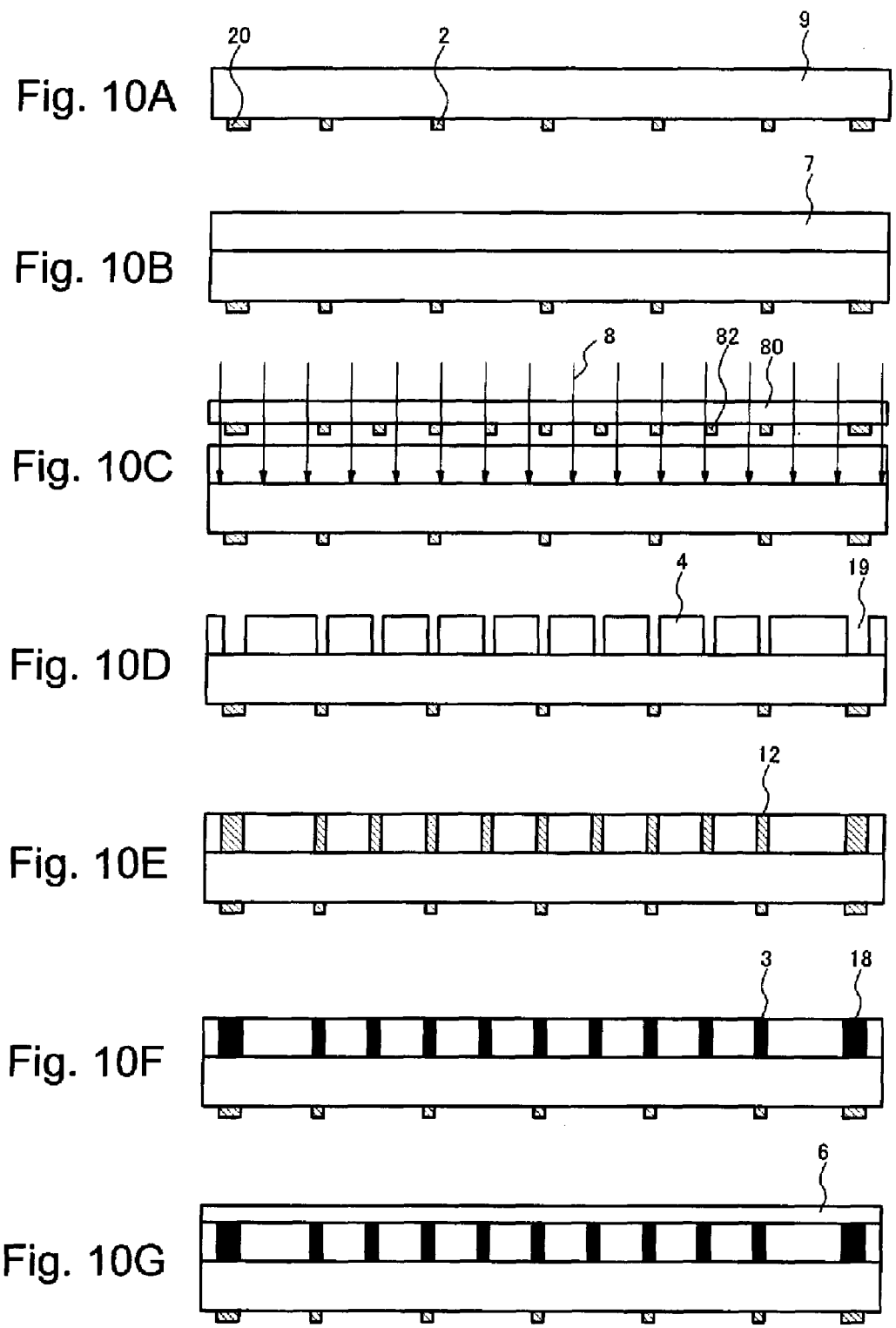

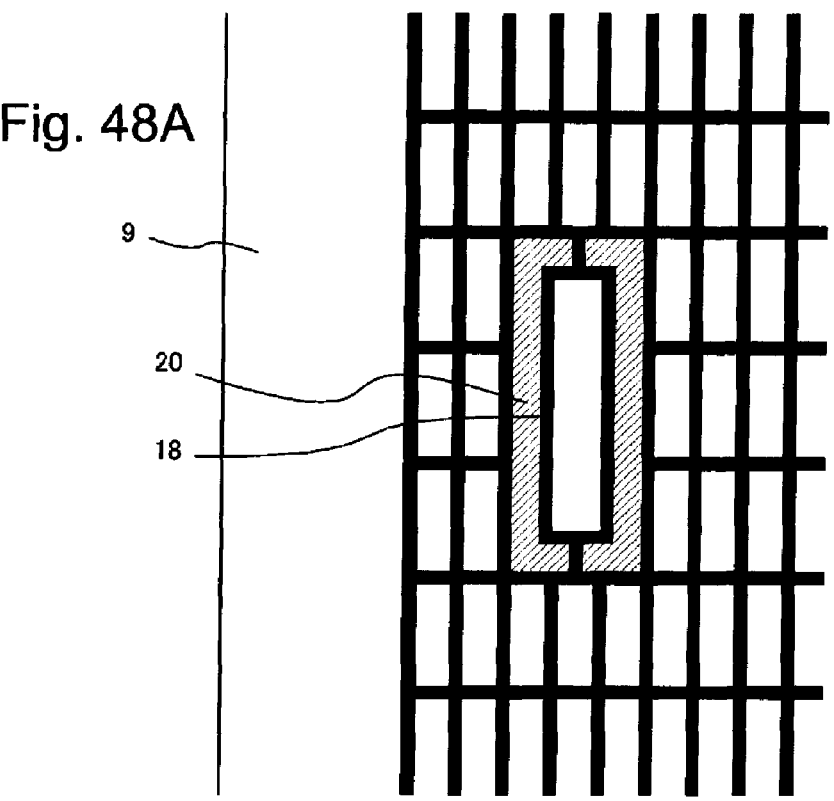
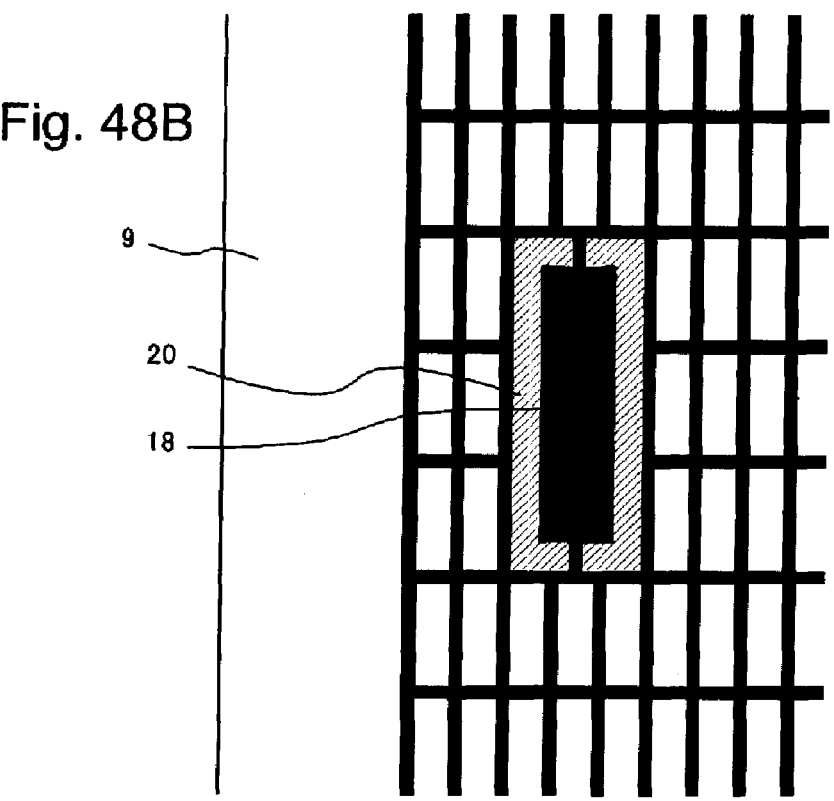

IMAGE FORMING APPARATUS COMPRISING A TRANSPARENT LAYER AND AN OPTICAL ABSORPTION LAYER ARRANGED IN A PITCH OF 1/N OF A PIXEL PITCH

This application is based upon and claims the benefit of priority from Japanese Patent Application No. 2009-235850, filed on Oct. 13, 2009, the disclosure of which is incorporated herein in its entirety by reference.

TECHNICAL FIELD

The present invention relates to an image forming apparatus using an optical device called a micro louver that limits the range of a emission direction of transmitted light and a display device represented by a liquid crystal display (LCD), an organic EL display and a plasma display.

BACKGROUND ART

A display device typified by a liquid crystal display is used in various information processing apparatuses such as a mobile phone, a Personal Digital Assistance (PDA), an ATM (Automatic Teller Machine) and a personal computer. In recent years, liquid crystal displays having a wide visible area are in practical use. Also, liquid crystal displays are required to have various light distribution characteristics along with the trend of enlarging display sizes and widening varieties of purpose of use. In particular, in order not to be peeped into by others from a view point of an information leak, need for restricting a visible area and need for not emitting light in an unnecessary direction are growing.

As an image forming apparatus to meet the above-mentioned needs, there has been proposed one in which a micro louver is added to the display device to restrict the visible area (or, the emission area) as disclosed in Japanese Patent Application Laid-Open No. 1985-140322 (hereinafter, referred to as patent document 1) and Japanese Patent Application Laid-Open No. 1989-25123 (hereinafter, referred to as patent document 2), and some of such apparatuses are now in practical use.

SUMMARY

An object of the present invention is to provide an image forming apparatus which solves the problem that the number of optical absorption layers existing within a picture element of a display device is non-uniform in a substrate surface, causing variation of the rates of luminance fall of the display device in the surface.

According to one aspect of the present invention, an image forming apparatus comprises: a functional element substrate in which pixels are arranged in a predetermined cycle; an opposed substrate formed on the functional element substrate; and an optical device which is arranged on the opposed substrate and in which a transparent layer and an optical absorption layer are arranged at a cycle of 1/n (n is an integer number) of the cycle at which the pixels are arranged to restrict expansion of a transmitted light.

BRIEF DESCRIPTION OF THE DRAWINGS

Exemplary features and advantages of the present invention will become apparent from the following detailed description when taken with the accompanying drawings in which:

FIGS. 10A to 10G are sectional views showing a summary of a manufacturing process of a micro louver used in an image forming apparatus of a fourth exemplary embodiment of the present invention;

FIG. 48A is a plan view showing an outline of yet another example in the state that an opposed substrate alignment mark and a micro louver alignment mark in an image forming apparatus of the present invention are overlapped, and 48B is a plan view showing a modification of 48A.

EXEMPLARY EMBODIMENT

[The First Exemplary Embodiment]

Next, this exemplary embodiment will be described in detail with reference to drawings.

Figure 1:
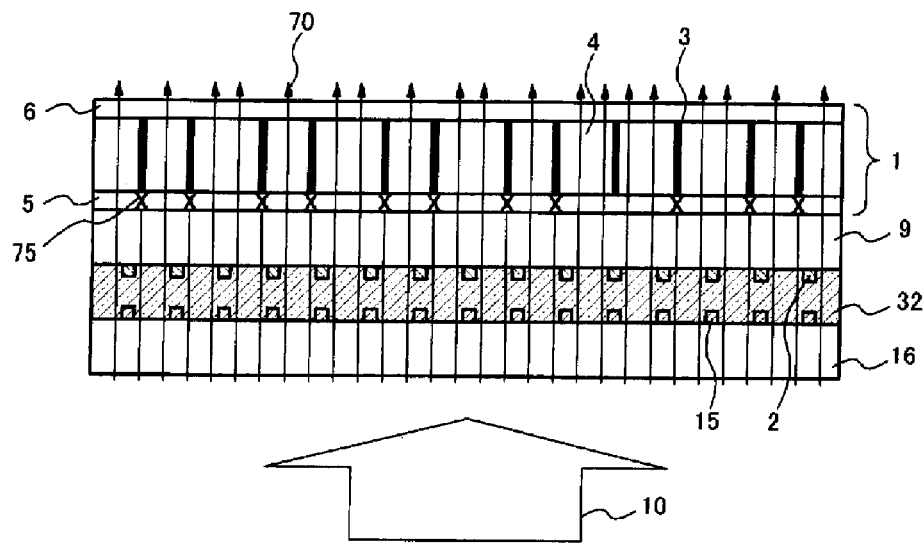
FIG. 1 is a sectional view showing an outline of a transmission situation of light of a backlight in an related image forming apparatus.
Figure 2:
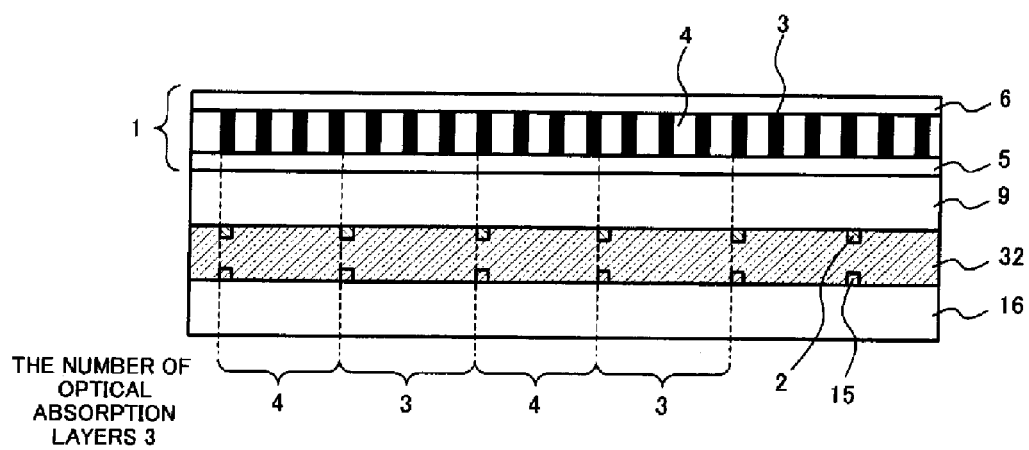
FIG. 2 is a sectional view showing an outline of a structure of another related image forming apparatus.
Figure 3:
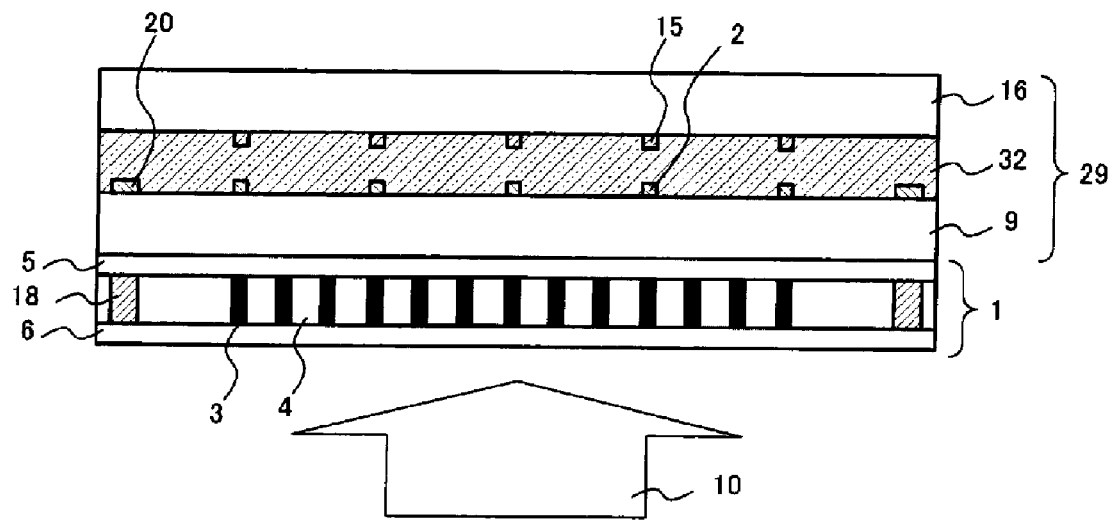
FIG. 3 is a sectional view showing an outline of a structure of an image forming apparatus of a first exemplary embodiment of the present invention.

A sectional view in the thickness-wise direction of an image forming apparatus 200 according to the first exemplary embodiment is shown in FIG. 3. The image forming apparatus 200 in this exemplary embodiment includes a micro louver 1 and a liquid crystal display 29.

The liquid crystal display 29 is of a structure that a pair of substrates of a TFT (Thin Film Transistor) substrate 16 and an opposed substrate 9 sandwich a liquid crystal layer 32. A TFT pattern 15 is formed onto the TFT substrate 16. A BM pattern 2 is formed onto the opposed substrate 9. It is preferred that the pitch of the BM pattern 2 is 150 μm. A picture element 63 is formed in the liquid crystal layer 32.

The BM pattern 2 means a black matrix pattern, and it prevents light which passes the picture element 63 provided in the liquid crystal layer 32 from leaking to the surroundings. Although not shown in the figure, a polarizer may be provided on the outside faces of the TFT substrate 16 and the opposed substrate 9.

The picture element 63 is provided in the liquid crystal layer 32. The picture element 63 is the smallest area operation of which can be controlled when an image is indicated by the liquid crystal display 29. In the liquid crystal display 29 constituted of a pair of substrates, the TFT substrate 16 and the opposed substrate 9, the picture element 63 corresponds to an area controlled by one TFT pattern 15.

The micro louver 1 is mounted on the opposed substrate 9 side of liquid crystal display 29. The micro louver 1 includes a transparent substrate 5, an optical absorption layer 3, a transparent layer 4 and a laminated substrate 6. The micro louver 1 has the function to restrict the range of a projection direction of transmitted light 70.

The transparent substrate 5 is made of polyethylene terephthalate (PET) or made of polycarbonate (PC). The transparent substrate 5 is formed on the opposed substrate 9. Optical absorption layer 3 is formed at a position on the transparent substrate 5 opposing to the BM pattern 2. The transparent layer 4 is formed between each optical absorption layer 3. The laminated substrate 6 is formed on the surfaces of transparent layer 4 and optical absorption layer 3. The laminated substrate 6 is made of PET or PC the same as the transparent substrate 5.

As a shape of transparent layer 4, its height is preferably within the range of 30 μm-300 μm, and it is set to 120 μm in this exemplary embodiment. The width of transparent layer 4 is preferably within the range of 5 μm-150 μm at the surface of the transparent substrate 5, and it is set to 40 μm in this exemplary embodiment. The width of optical absorption layer 3 is preferably within the range of 1 μm-30 μm at the transparent substrate surface, and it is set to 10 μm in this exemplary embodiment.

The interval of optical absorption layer 3 in the micro louver 1 is smaller than the interval of picture element 63 in the liquid crystal layer 32. The interval of optical absorption layer 3 is 1/n (n is an integer no smaller than 2) of the interval of picture element 63.

As above, the image forming apparatus 200 according to this exemplary embodiment is of the structure that the micro louver 1 is provided in the side of the opposed substrate 9 of the liquid crystal display 29, and incidence of a backlight 10 is performed from the micro louver 1 side.

[Description of the effect] In the image forming apparatus 200 of this exemplary embodiment, the interval of optical absorption layer 3 in the micro louver 1 is smaller than the interval of picture element 63 in the liquid crystal layer 32, and in addition, the interval of optical absorption layer 3 is 1/n (n is an integer no smaller than 2) of the interval of picture element 63. By the above-mentioned structure, occurrence of nonuniformity of a transmittance can be prevented because the number of optical absorption layer 3s of the micro louver 1 that exist in picture element 63 of the liquid crystal layer 32 is uniform.

Figure 36:
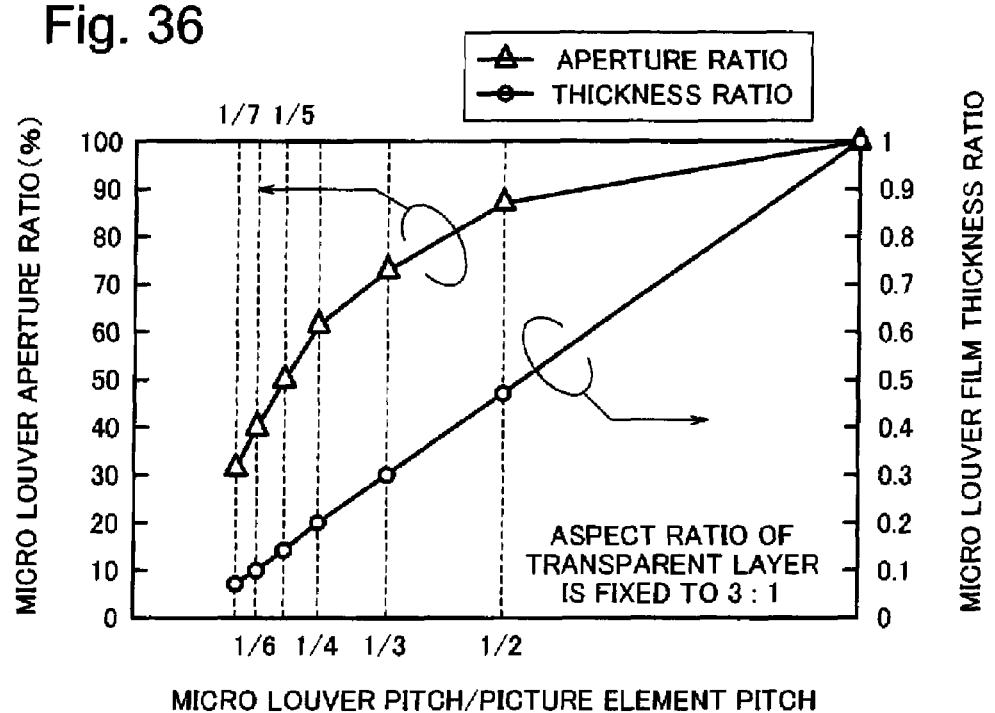
FIG. 36 is a characteristics diagram showing relation between a ratio of a micro louver pitch to a picture element pitch and a micro louver film thickness ratio, and relation between the former and a micro louver aperture ratio of the present invention.

[Example] FIG. 36 indicates relation between a ratio of the pitch of the micro louver 1 to the pitch of picture element 63 and a micro louver film thickness ratio and a micro louver aperture ratio in this exemplary embodiment example.

The micro louver film thickness ratio is a ratio of the film thickness required, when the pitch of each of the micro louver 1 and picture element 63 are changed, to make the aspect ratio of transparent layer 4 be 3:1 to a film thickness required when a micro louver pitch/picture element pitch=1. According to this exemplary embodiment, by setting the width of the optical absorption layer 3 to 10 μm, and fixing the aspect ratio of transparent layer 4 to 3:1, an identical light distribution characteristic can be obtained regardless of a change in the pitch of the micro louver 1.

For example, when a picture element pitch 64 is set to 100 um, a micro louver pitch at which a micro louver pitch/picture element pitch becomes 1/2 will be 50 um, and thus the width of the transparent layer 4 will be 40 um (the optical absorption layer 3:10 um). In this case, because the aspect ratio of the transparent layer 4 is 3:1, the film thickness will be 120 um. The micro louver film thickness ratio at that time is 0.5. Similarly, when the micro louver film thickness ratio at is 1, a micro louver pitch/picture element pitch becomes 1, so the film thickness is 240 μm.

In other words, when the pitches (the intervals) of the micro louver 1 and picture element 63 are changed respectively, a micro louver film thickness ratio at respective values also changes. The micro louver aperture ratio indicates a rate of an area occupied by transparent layer 4 in the surface area of micro louver 1.

By making the value of a micro louver pitch/picture element pitch small, the micro louver film thickness ratio becomes small, enabling a thinner film structure. However, in the above-mentioned case, because a micro louver aperture ratio also becomes small simultaneously, a value of a micro louver pitch/picture element pitch should be set to a value serving the purpose.

For example, when a micro louver aperture ratio required is no smaller than 50% and the micro louver film thickness ratio is desired to be less than 0.5, a micro louver pitch/picture element pitch should be selected within the range of 1/2-1/5 as shown in FIG. 36.

In patent document 3 (Japanese Patent Application Laid-Open No. 2005-181744), there is disclosed a structure that optical absorption layer 3 of the micro louver 1 is arranged between a pixel 65 and a neighboring pixel 65 as a light shielding wall. However, in the case of the above-mentioned structure, the light shielding wall needs to be made high in order to improve characteristics of a micro louver, and thus there is a concern about a cost rise and a yield fall.

The image forming apparatus 200 in this exemplary embodiment enables a thinner film structure by making a micro louver pitch/picture element pitch be 1/2-1/5 while maintaining an aspect ratio of transparent layer 4, and as a result, cost reduction and yield improvement become possible.

The image forming apparatus 200 in this exemplary embodiment is the structure that the micro louver 1 is provided in the opposed substrate 9 side, not in the TFT substrate 16 side.

In patent document 4 (Japanese Patent Application Laid-Open No. 2005-72662) and patent document 5 (US 2007/0139765), there is described a structure that the micro louver 1 is provided on a functional element substrate to which a functional element such as a thin film transistor (TFT) device is formed. However, in the case of the above-mentioned structure, when a positional displacement between the micro louver 1 and the functional element substrate exists, the functional element substrate which has been an non-defective product originally cannot be used any more, and thus there is a concern that it leads to a yield fall.

The image forming apparatus 200 according to this exemplary embodiment is provided with the micro louver 1 in the opposed substrate 9 side. Therefore, when a positional displacement occurs between the micro louver 1 and the opposed substrate 9, the opposed substrate 9 can be disposed before being pasted together with the TFT substrate 16. Therefore, negative influence of a positional displacement to the TFT substrate 16 can be prevented from occurring. Because the manufacturing process of the TFT substrate 16 is complicated compared with that of the opposed substrate 9, it is very important to be able to prevent negative influence to the TFT substrate 16.

Next, the detail structure of the micro louver 1 and the liquid crystal display 29 will be described using plan views of FIGS. 4-6. The numbers of picture elements 63 and the pixel 65s are not limited to those indicated below.

Figure 4:
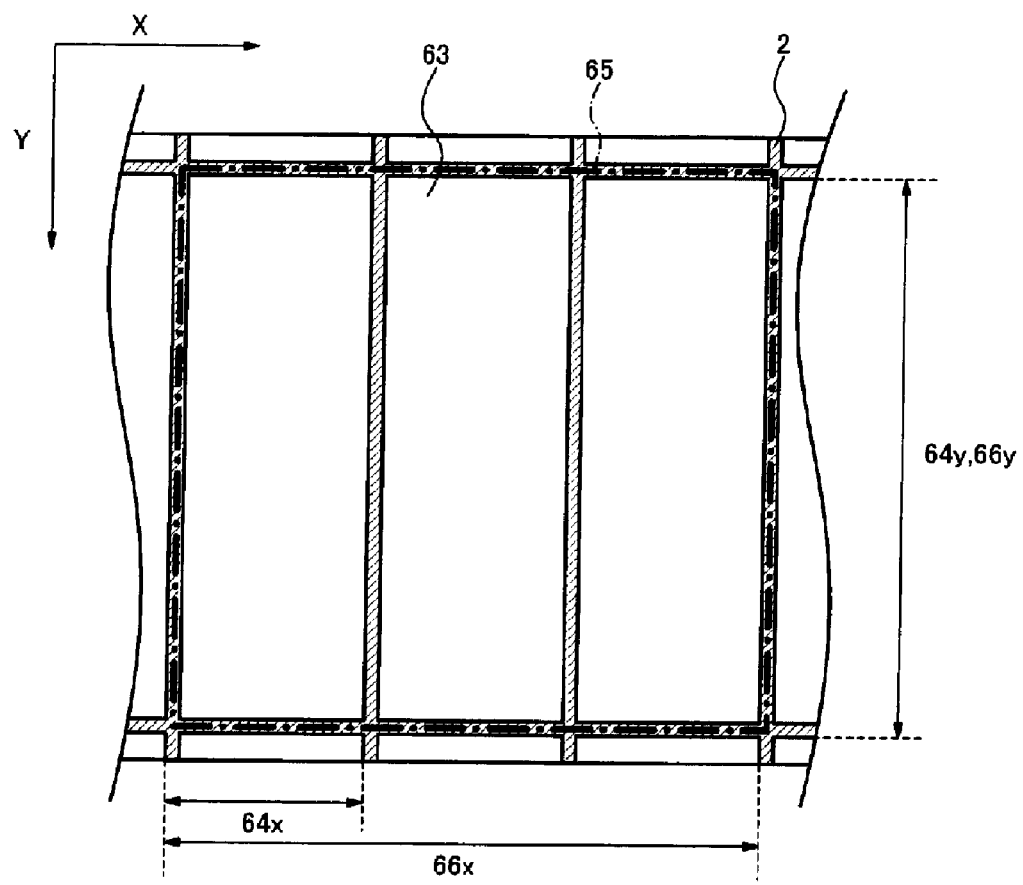
FIG. 4 is a plan view showing a pixel structure of a liquid crystal display in an image forming apparatus of the first exemplary embodiment of the present invention.

The structure of pixel 65 in the liquid crystal display 29 of this exemplary embodiment is shown in FIG. 4. The area surrounded by a thick dash-and-dot line drawn in the figure indicates one pixel 65. Each pixel 65 includes three picture elements 63.

As shown in FIG. 4, each picture element 63 corresponds to a block surrounded by the BM pattern 2. However, when the BM pattern 2 is not formed onto the opposed substrate 9, it is not limited to this. Each picture element 63 indicates the smallest area whose operation can be controlled when an image is displayed in the liquid crystal display 29.

Here, a X-direction pixel pitch 66x is the width of pixel 65 in the X-direction, and a Y-direction pixel pitch 66y is the width of pixel 65 in the Y-direction. A X-direction picture element pitch 64x is the width of picture element 63 in a X-direction, and a Y-direction picture element pitch 64y is the width of picture element 63 in the Y-direction.

As indicated in FIG. 4, the X-direction pixel pitch 66x is a numerical value obtained by multiplying the X-direction picture element pitch 64x by 3. On the other hand, the Y-direction pixel pitch 66y is the same numerical value as the Y-direction picture element pitch 64y.

The liquid crystal display 29 of this exemplary embodiment is not limited to a monochrome display or a color display. Therefore, because there are no concepts of pixel 65 in the case of a monochrome display, only picture element 63 is arranged. In the case of a color display, picture elements 63 corresponding to red (R), green (G) and blue B respectively are arranged in arbitrary positions in pixel 65.

Figure 5:
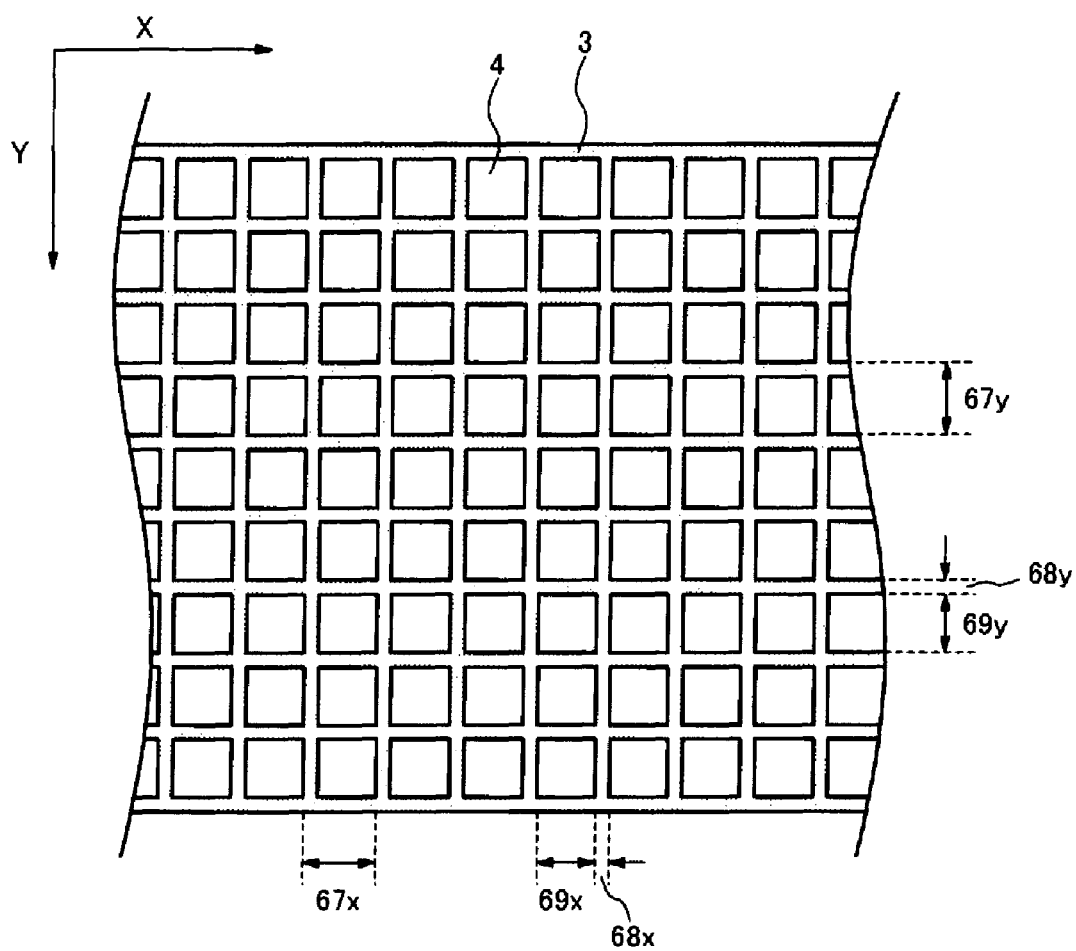
FIG. 5 is a plan view showing a structure of a micro louver in an image forming apparatus of the first exemplary embodiment of the present invention.

Next, a planar structure of the micro louver 1 is indicated referring to FIG. 5.

A X-direction louver pitch 67x is a numerical value obtained by adding a X-direction optical absorption layer width 68x and a X-direction transparent layer width 69x. A Y-direction louver pitch 67y is a numerical value obtained by adding a Y-direction optical absorption layer width 68y and a Y-direction transparent layer width 69y.

The X-direction louver pitch 67x is of the size of 1/3 of the X-direction picture element pitch 64x shown in FIG. 4. The Y-direction louver pitch 67y is of the size of 1/9 of the Y-direction picture element pitch 64y shown in FIG. 4.

Figure 6:
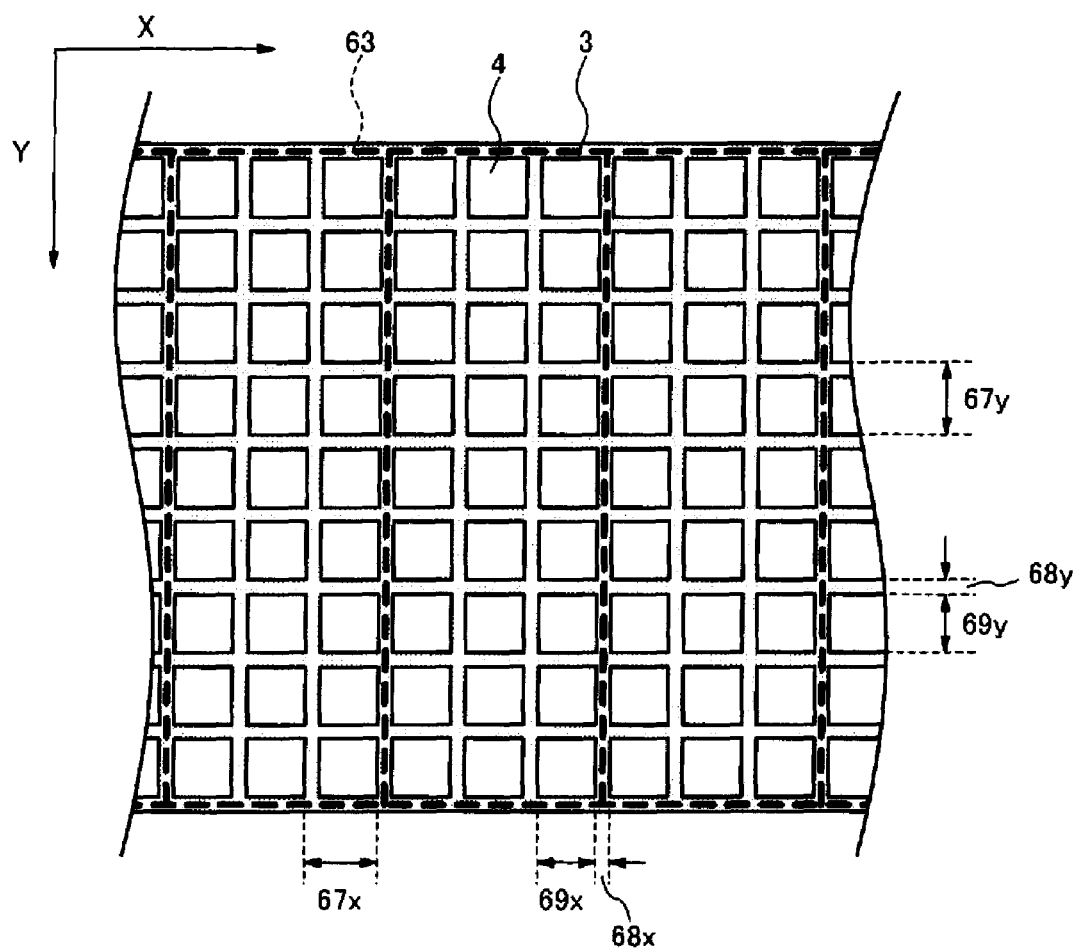
FIG. 6 is a plan view showing an outline of a positional relationship in the state that a liquid crystal display and a micro louver in an image forming apparatus of the first exemplary embodiment of the present invention are stacked.

FIG. 6 is the surface structure when overlapping the micro louver 1 to the liquid crystal display 29. The range of each picture element 63 is indicated being surrounded by a thick dotted line in the drawing. In one picture element 63, there exist 27 transparent layer 4 of the micro louver 1, and the position of the BM pattern 2 (not illustrated) corresponds to optical absorption layer 3.

[The Second Exemplary Embodiment]

Next, the second exemplary embodiment will be described with reference to FIGS. 37-48.

In order to align the micro louver 1 and the opposed substrate 9 correctly, the image forming apparatus 200 in this exemplary embodiment is provided with alignment marks on them, respectively. The micro louver 1 has a micro louver alignment mark 18, and the opposed substrate 9 has an opposed substrate alignment mark 20.

Hereinafter, referring to FIGS. 37-48, the shapes of the micro louver alignment mark 18 and the opposed substrate alignment mark 20 for aligning the micro louver 1 and the opposed substrate 9 correctly will be described in detail.

Figure 37A:
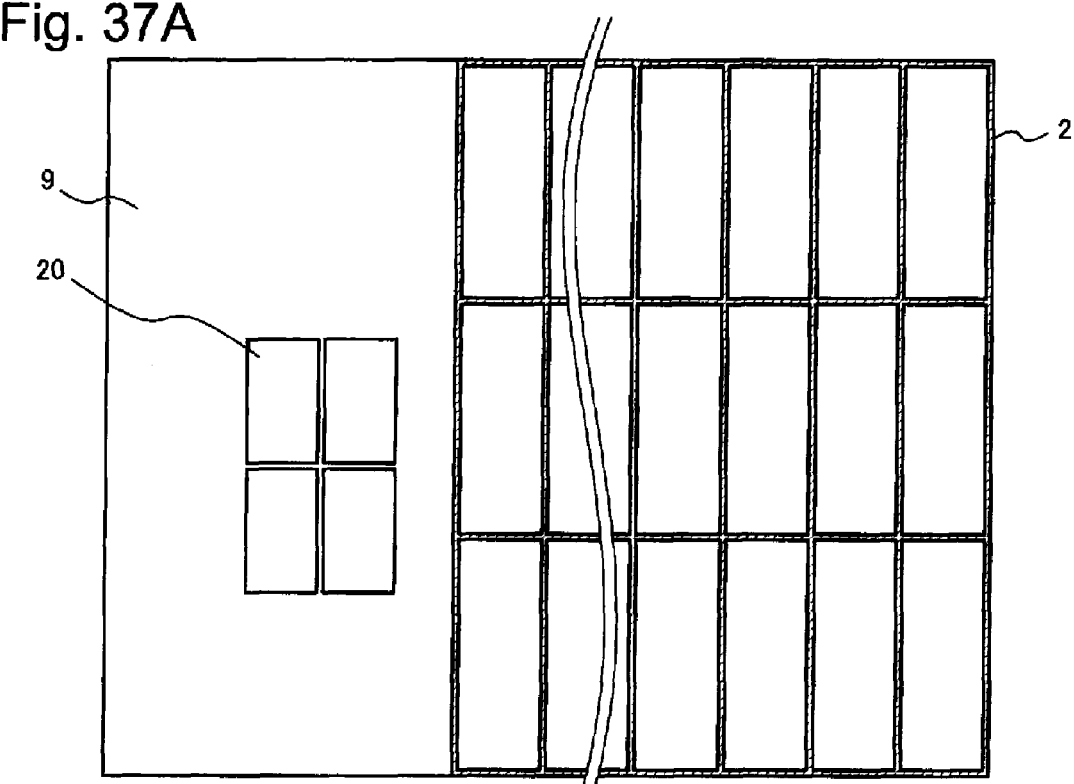
FIG. 37A is a plan view showing an outline of an opposed substrate alignment mark of an opposed substrate in an image forming apparatus of the present invention, and 37B is a plan view showing an outline of a micro louver alignment mark of a micro louver in an image forming apparatus of the present invention.

[The first alignment] FIG. 37A indicates the opposed substrate alignment mark 20 formed on the surface of the opposed substrate 9. The opposed substrate alignment mark 20 has a shape in which four square patterns are arranged opposing each other, and it is formed at a position away from the BM pattern 2.

Figure 37B:
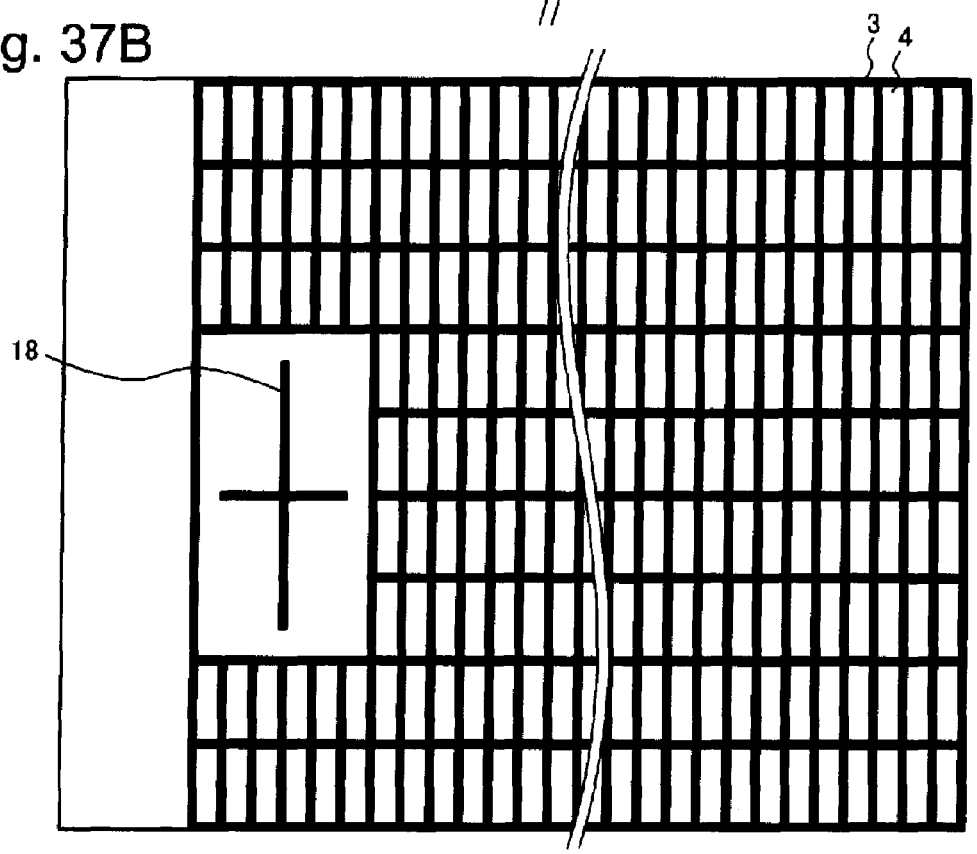

Next, the micro louver alignment mark 18 formed onto the micro louver 1 is shown in FIG. 37B. The micro louver alignment mark 18 has a cross-shape corresponding to the spaces between the four square patterns of the opposed substrate alignment mark 20. In other words, the micro louver alignment mark 18 has transparent layer 4 formed at a part corresponding to the opposed substrate alignment mark 20, and optical absorption layer 3 is formed in outer fringe areas neighboring the above-mentioned transparent layer 4. The cross-shape of the micro louver alignment mark 18 is formed of optical absorption layer 3.

Figure 38:
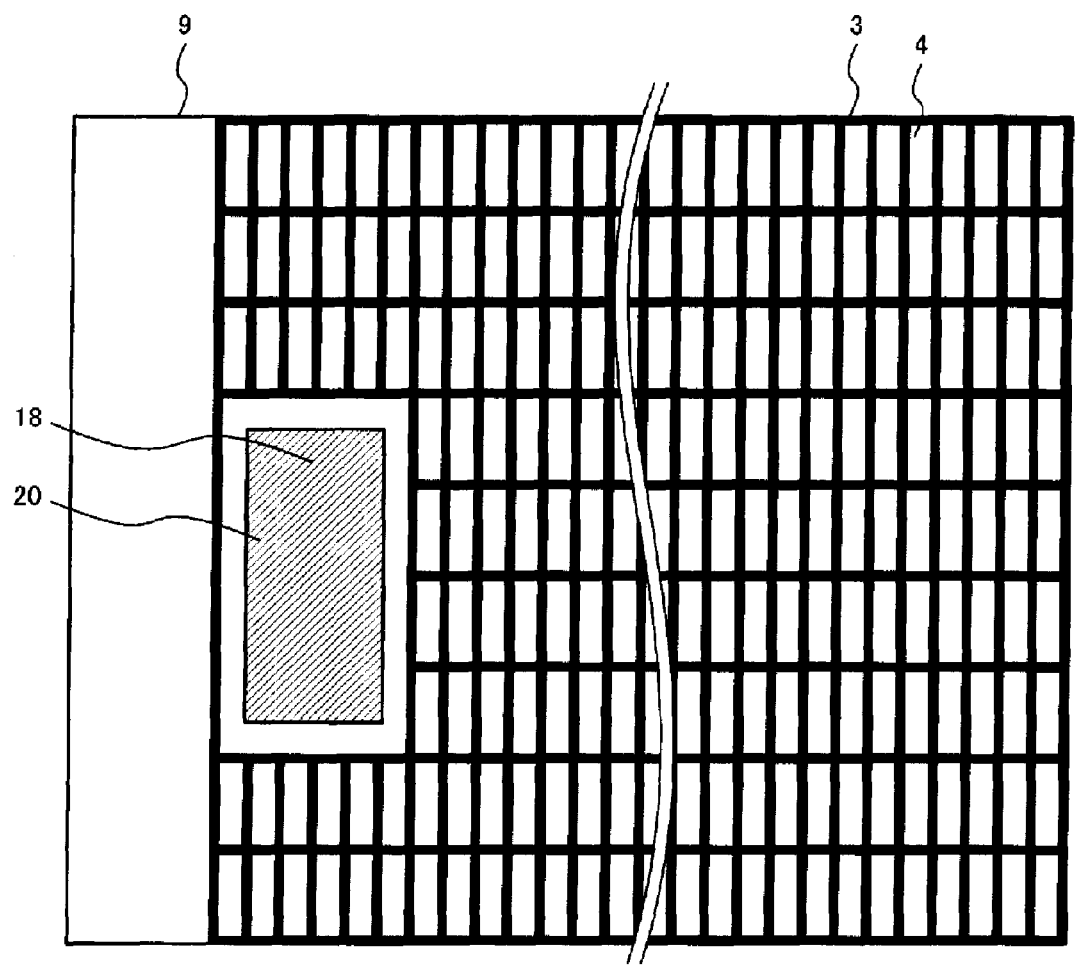
FIG. 38 is a plan view showing an outline of a positional relationship in the state that an opposed substrate and a micro louver in an image forming apparatus of an exemplary embodiment of the present invention are overlapped.

FIG. 38 is a top view when stacking the opposed substrate 9 and the micro louver 1, in which the opposed substrate alignment mark 20 and the micro louver alignment mark 18 are aligned. When both of them are successfully stacked correctly without generating a positional displacement, the cross pattern of the micro louver alignment mark 18 can infill the part of the spaces of the opposed substrate alignment mark 20. As a result, the whole can be seen as one square pattern.

Figure 39A:
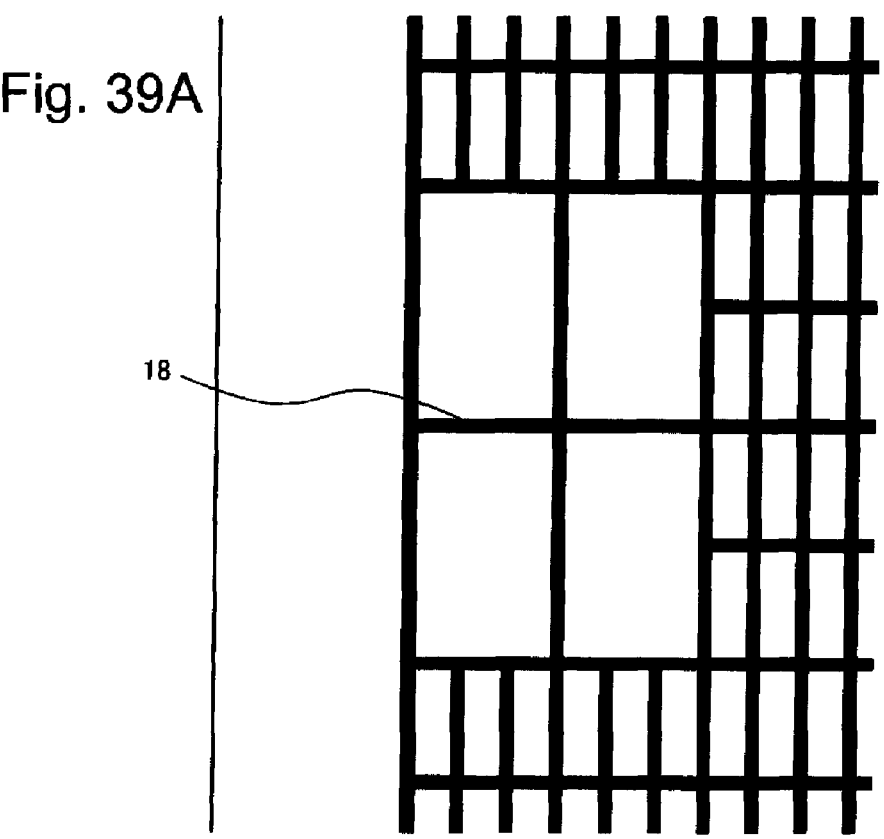
FIG. 39A is a plan view showing an outline of another micro louver alignment mark of a micro louver in an image forming apparatus of the present invention, and 39B is a plan view showing an outline of a positional relationship in the state that an opposed substrate alignment mark and the another micro louver alignment marks in an image forming apparatus of an exemplary embodiment of the present invention are overlapped.

As shown in FIG. 39A, the cross pattern of the micro louver alignment mark 18 may be connected with surrounding optical absorption layer 3 without a break.

When the pattern of the micro louver alignment mark 18 is connected with the surrounding optical absorption layer 3, the micro louver alignment mark 18 and optical absorption layer 3 can be formed simultaneously. Therefore, when optical absorption layer 3 is formed in the micro louver alignment mark 18, filling using a capillary phenomenon can be carried out.

Figure 39B:
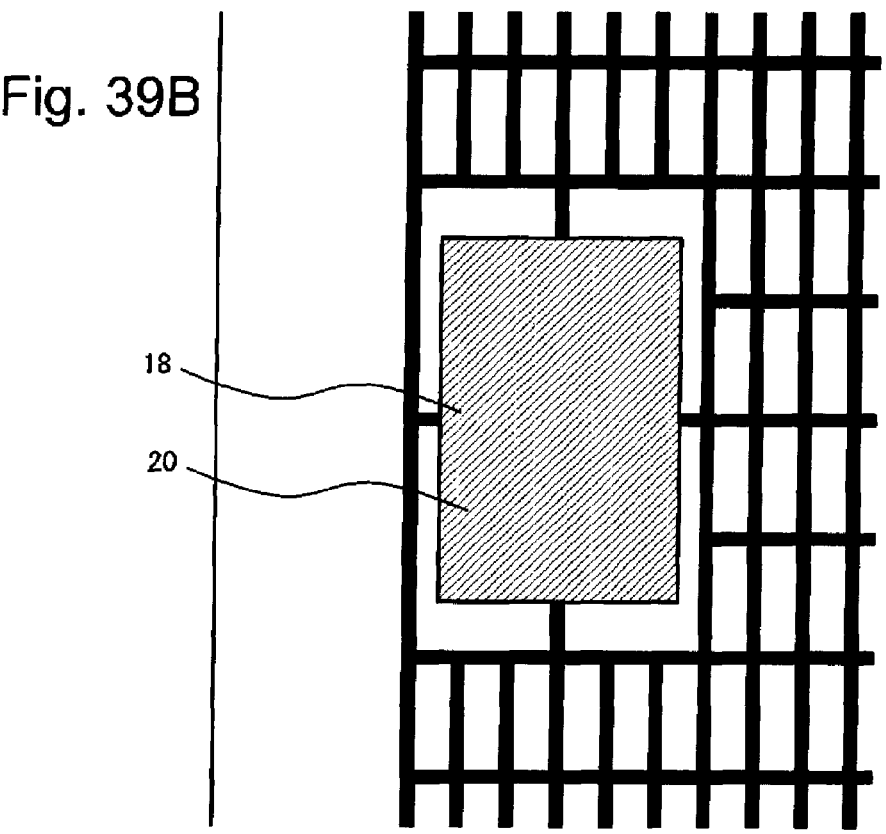

FIG. 39B is a plan view showing the state when aligning the micro louver alignment mark 18 of FIG. 39A and the opposed substrate alignment mark 20.

Figure 40A:
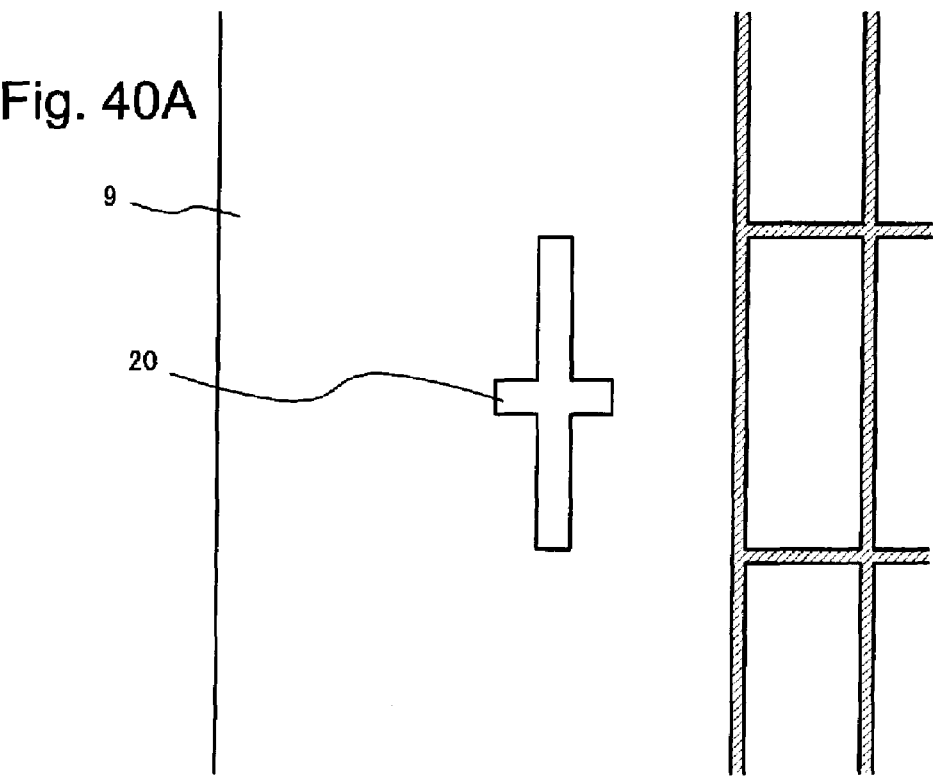
FIG. 40A is a plan view showing an outline of another opposed substrate alignment mark of an opposed substrate in an image forming apparatus of the present invention, and 40B is a plan view showing an outline of another micro louver alignment mark of a micro louver in the image forming apparatus of the present invention.
Figure 40B:
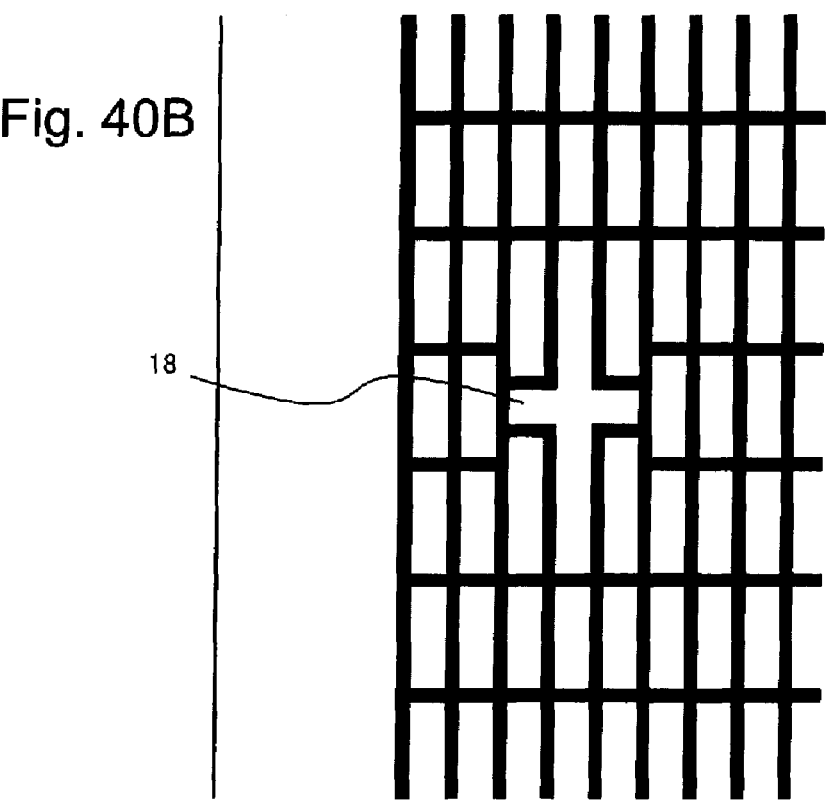
Figure 41:
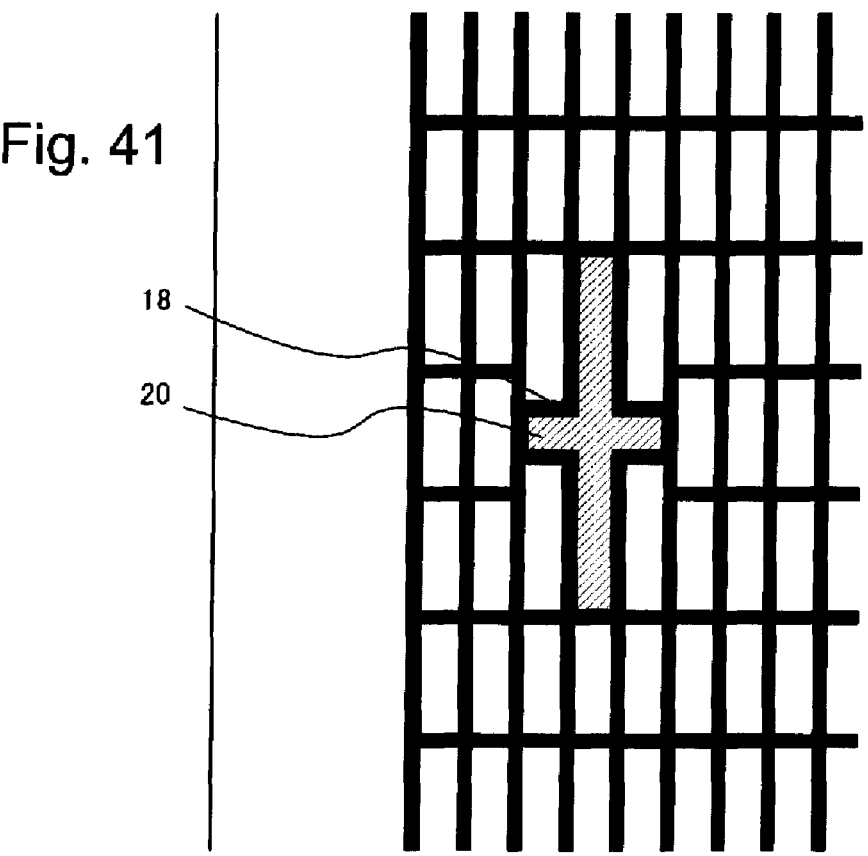
FIG. 41 is a plan view showing an outline of a positional relationship in the state that an opposed substrate and a micro louver in an image forming apparatus of an exemplary embodiment of the present invention are overlapped.

[The second alignment] FIGS. 40, 41 and 42 indicate yet other examples of the opposed substrate alignment mark 20 and the micro louver alignment mark 18 of the image forming apparatus 200 in this exemplary embodiment.

As shown in FIG. 40A, the opposed substrate alignment mark 20 is of a cross shape. As shown in FIG. 40B, the micro louver alignment mark 18 is of a shape corresponding to the cross shape of the opposed substrate alignment mark 20. In other words, the micro louver alignment mark 18 has transparent layer 4 formed in the part corresponding to the opposed substrate alignment mark 20, and optical absorption layer 3 is formed in fringe areas surrounding the above-mentioned transparent layer 4. FIG. 41 indicates the state when overlapping the two alignment marks.

The above-mentioned structure is a structure in which the periphery of the opposed substrate alignment mark 20 corresponds to the micro louver alignment mark 18. Therefore, an effect that whether a positional displacement exist or not can be judged easily visually can be expected.

Also, in the cross pattern consisting of the transparent layer 4 of FIG. 40B, the area occupied by the transparent layer 4 is small compared with the pattern consisting of the transparent layer 4 around the cross pattern of FIG. 37B. Therefore, it has the effect that a risk such as occurring of a local stress reduces and the frequency of occurrence of pattern defects of the micro louver 1 decreases.

Figure 42A:
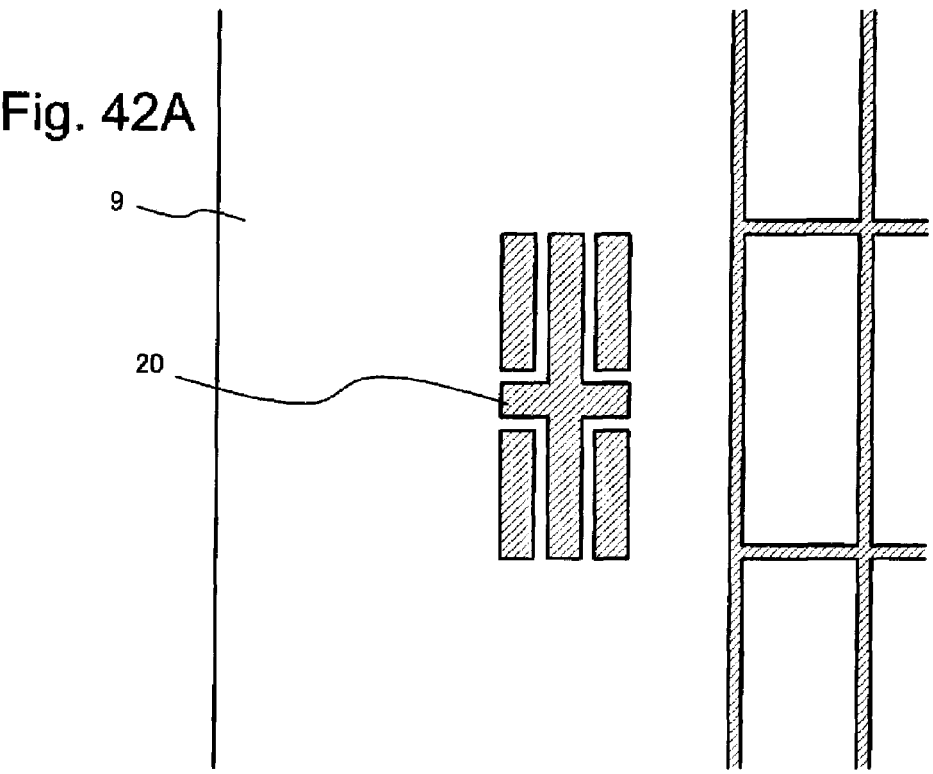
FIG. 42A is a plan view showing an outline of another opposed substrate alignment mark of an opposed substrate in an image forming apparatus of the present invention, and 42B is a plan view showing an outline of a positional relationship in the state that the opposed substrate alignment mark and another micro louver alignment mark in an image forming apparatus of an exemplary embodiment of the present invention are overlapped.

FIG. 42A indicates a modified example of the opposed substrate alignment mark 20. This opposed substrate alignment mark 20 is of the structure that, in addition to the cross pattern, four rectangle patterns are arranged around it.

Figure 42B:
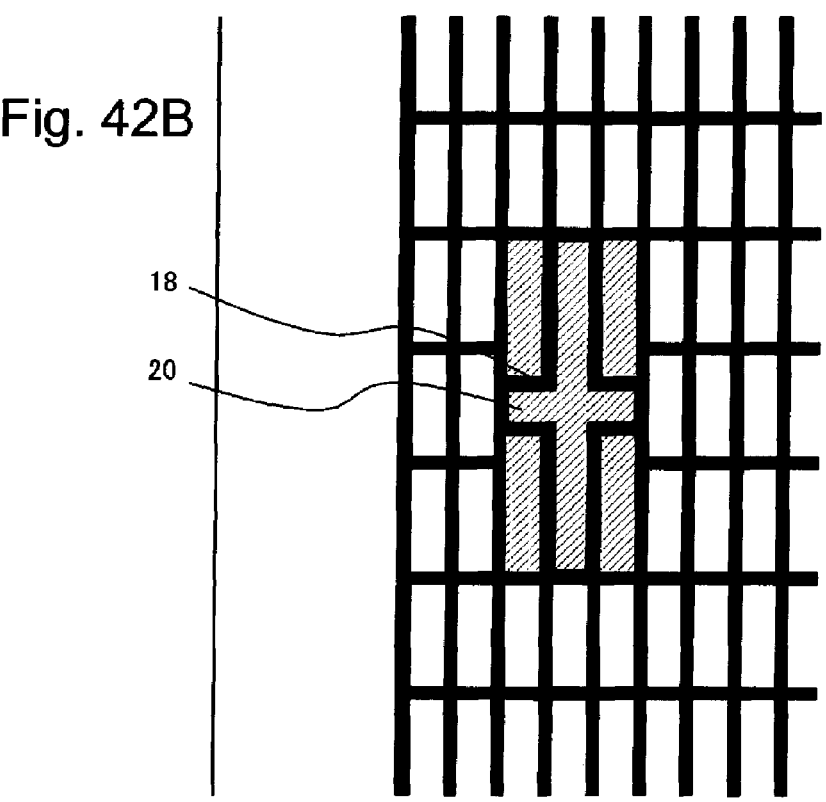

FIG. 42B is a plan view showing the state when overlapping the opposed substrate alignment mark 20 of FIG. 42A and the micro louver alignment mark 18 of FIG. 40B. As shown in the figure, this rectangle pattern is also of the shape corresponding to the micro louver alignment mark pattern 18.

Due to the increased number of patterns constituting an alignment mark, alignment accuracy improves compared with the pattern shown in FIG. 40 A. In addition, it has the effect that judgment of a positional displacement visually will be more easier because the shape of the whole alignment marks when a positional displacement is not occurring becomes a single rectangle pattern.

Figure 43A:
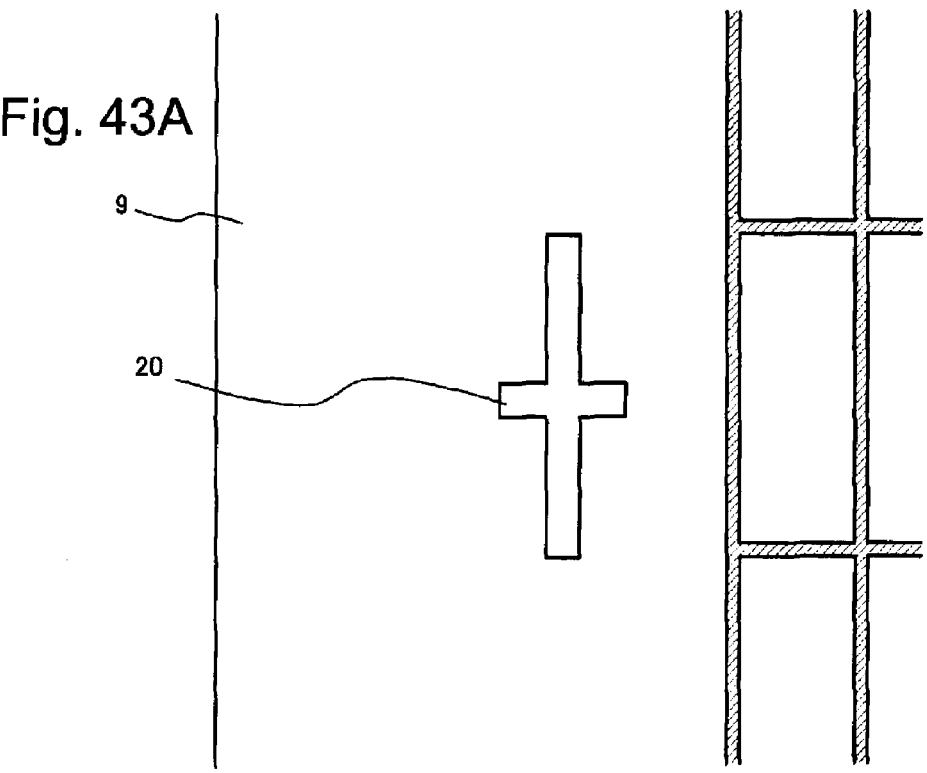
FIG. 43A is a plan view showing an outline of another opposed substrate alignment mark of an opposed substrate in an image forming apparatus of the present invention, and 43B is a plan view showing an outline of another micro louver alignment mark of a micro louver in the image forming apparatus of the present invention.
Figure 43B:
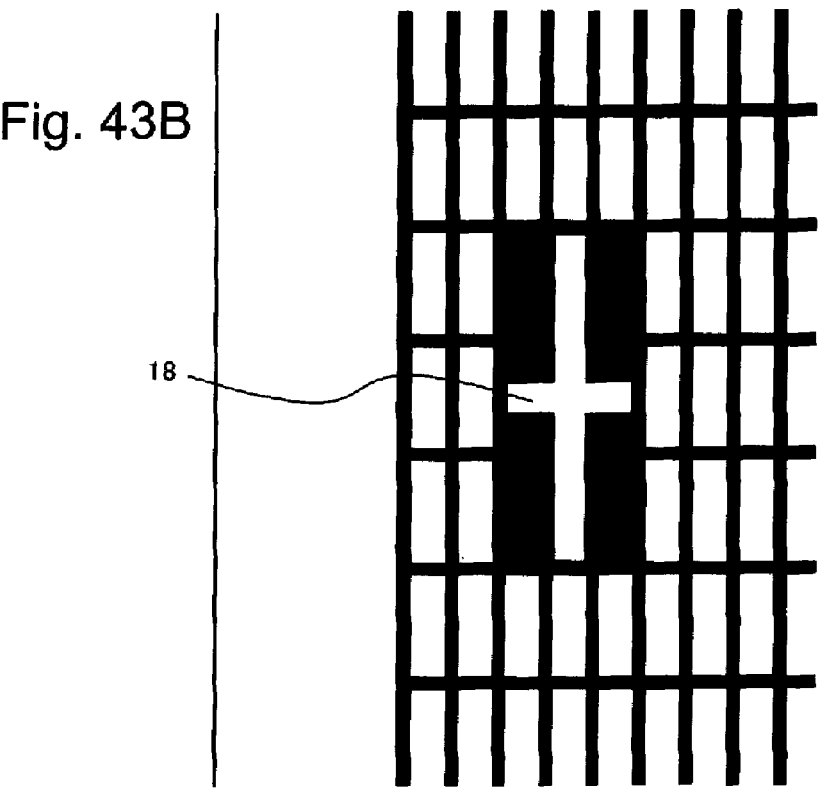
Figure 44:
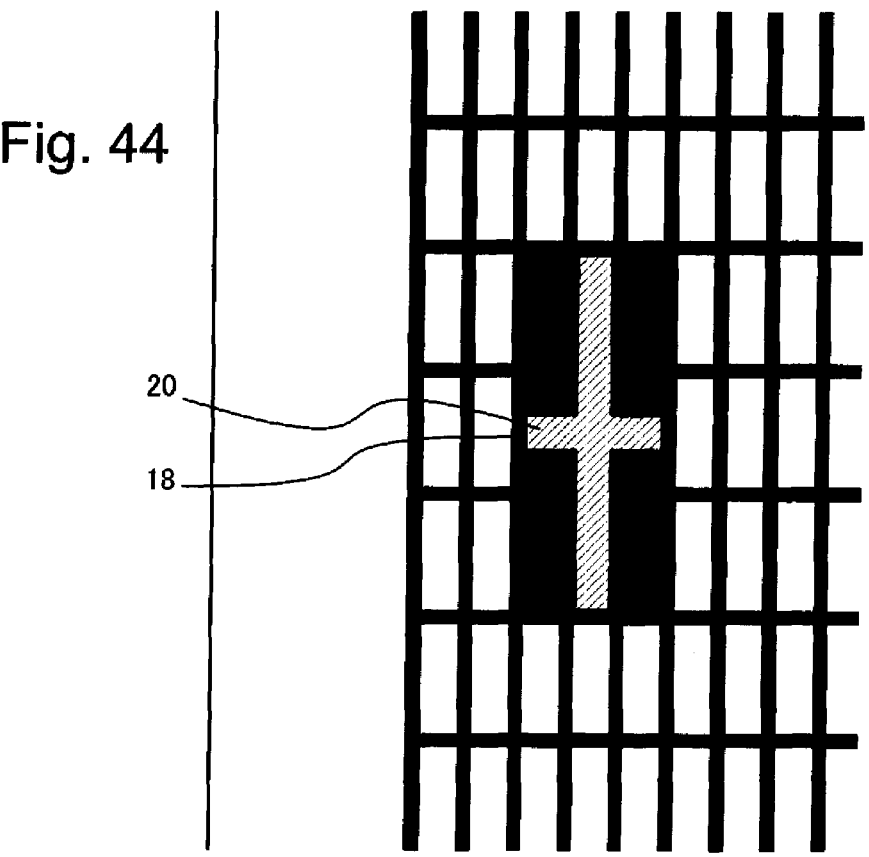
FIG. 44 is a plan view showing an outline of a positional relationship in the state that an opposed substrate and a micro louver in an image forming apparatus of an exemplary embodiment of the present invention are overlapped.

[The third alignment] FIGS. 43 and 44 indicates yet another example of the opposed substrate alignment mark 20 and the micro louver alignment mark 18 of the image forming apparatus 200 in this exemplary embodiment.

FIG. 43A is the opposed substrate alignment mark 20 that is of the same cross shape as FIG. 40A. As shown in FIG. 43B, the micro louver alignment mark 18 has transparent layer 4 formed in a part corresponding to the cross pattern of the opposed substrate alignment mark 20. Optical absorption layer 3 is formed in outer edge sections of the transparent layer 4 having the above-mentioned cross pattern.

As shown in FIG. 44, when the alignment marks overlap correctly, the whole is seen as one rectangle pattern like FIG. 42B, and thus judgment of a positional displacement becomes easy visually.

Figure 45A:
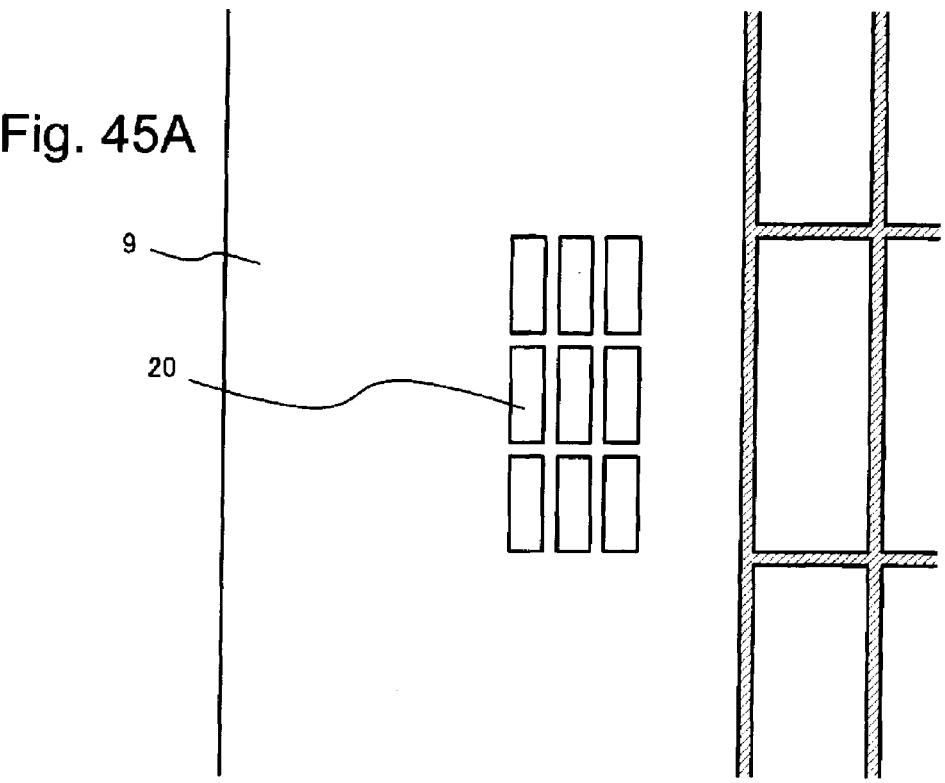
FIG. 45A is a plan view showing an outline of a modification example of an opposed substrate alignment mark in an image forming apparatus of the present invention, and 45B is a plan view showing an outline of a micro louver alignment mark corresponding to 45A.
Figure 45B:
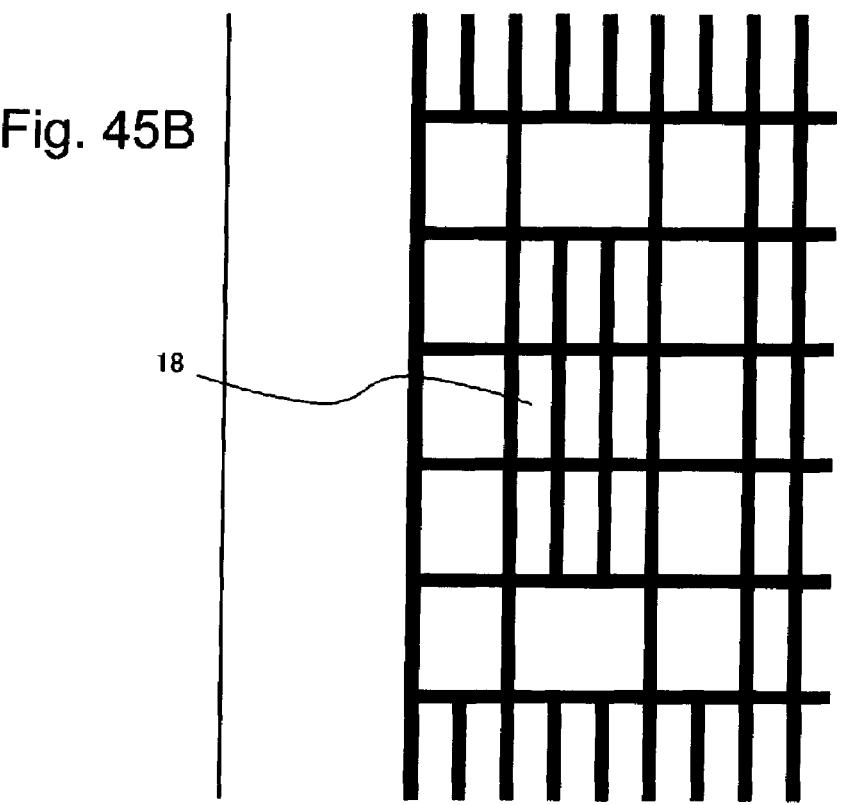
Figure 46:
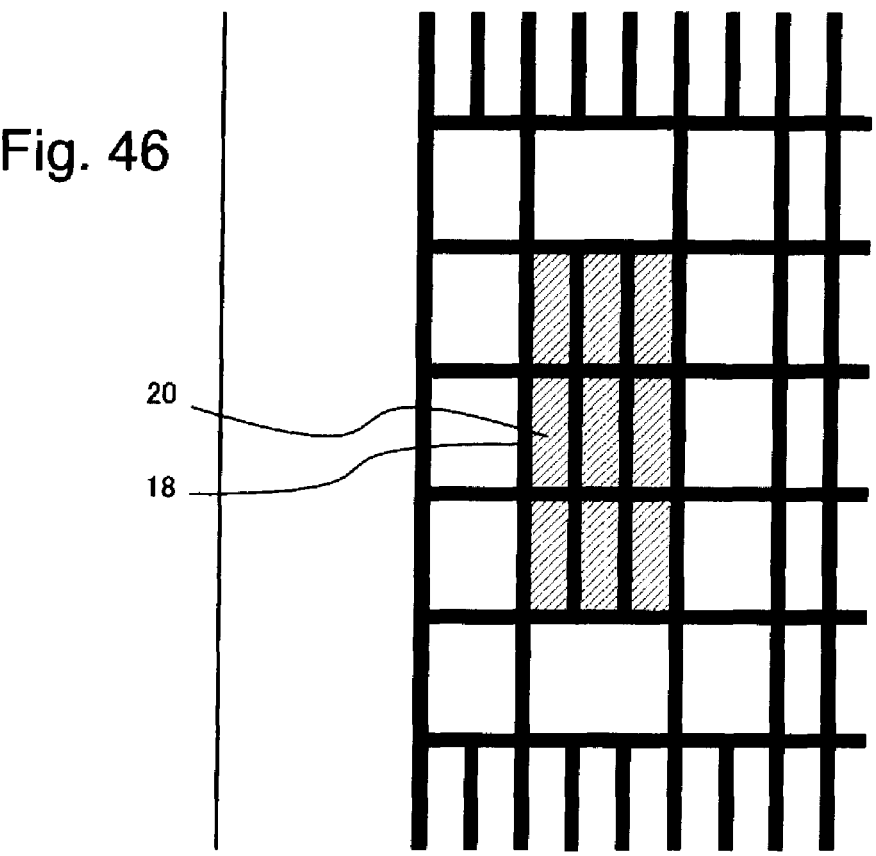
FIG. 46 is a plan view showing an outline of a positional relationship in the state that the opposed substrate and the micro louver shown in FIG. 45 are overlapped.

[The fourth alignment] FIGS. 45 and 46 are plan views of yet another example of the opposed substrate alignment mark 20 and the micro louver alignment mark 18 of the image forming apparatus 200 in this exemplary embodiment showing alignment marks and their surroundings.

As shown in FIG. 45A, the opposed substrate alignment mark 20 is of a shape in which opposed nine rectangles align (three in the longitudinal direction x three in the lateral direction). As shown in FIG. 45B, the micro louver alignment mark 18 is of the shape corresponding to the opposed substrate alignment mark 20.

The shape of the micro louver alignment mark 18 is the shape of optical absorption layer 3 corresponding to the opposed substrate alignment mark 20. In other words, the micro louver alignment mark 18 has transparent layer 4 formed in a part corresponding to the opposed substrate alignment mark 20 and optical absorption layer 3 formed in fringe areas surrounding the above-mentioned transparent layer 4. The optical absorption layer 3 in the surrounding areas of the micro louver alignment mark 18 are arranged such that they are surrounded by a rather large pattern compared with the other areas.

Because the optical absorption layer 3 in the surrounding areas of the micro louver alignment mark 18 are surrounded by a large pattern as the above-mentioned structure, determination of the position of the opposed substrate alignment mark 20 becomes easy. Also in the above case, when the opposed substrate alignment mark 20 and the micro louver alignment mark 18 overlap correctly, judgment of a positional displacement becomes easy visually because the whole is seen as one rectangle pattern as shown in FIG. 46.

It is desirable that the micro louver alignment mark 18 and the opposed substrate alignment mark 20 have a structure in which, in respective corresponding parts of them, the outlines or the internal shapes are equivalent with each other and the sizes in the length direction and the width direction and the respective inclined angles are also equivalent with each other.

[The fifth alignment] FIG. 47 and FIG. 48 are plan views of yet another example of the opposed substrate alignment mark 20 and the micro louver alignment mark 18 of the image forming apparatus 200 in this exemplary embodiment showing alignment marks and their surroundings.

Figure 47A:
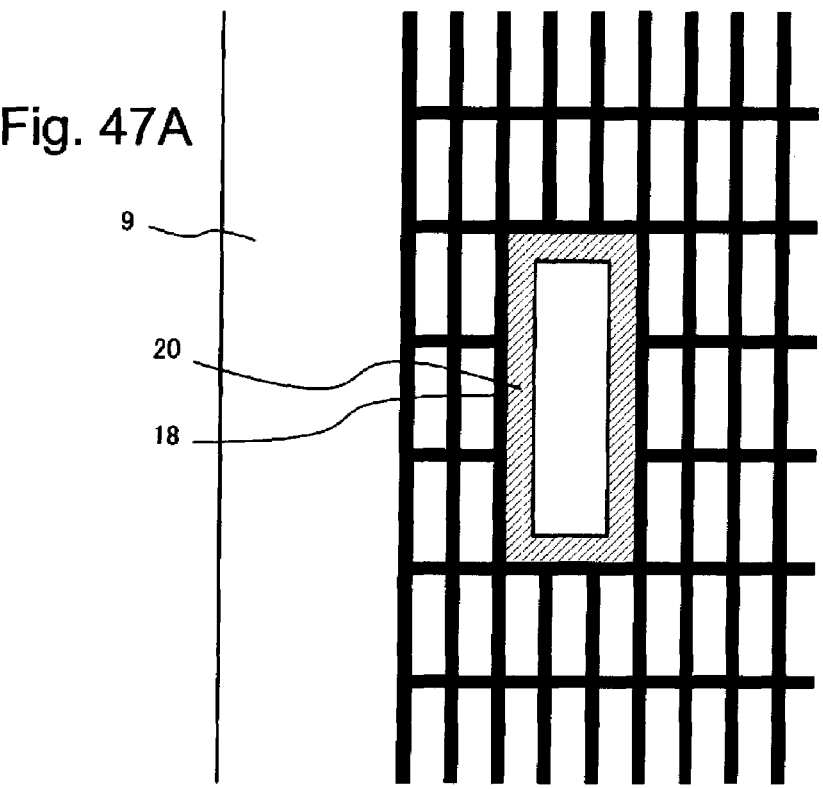
FIG. 47A is a plan view showing an outline of another example in the state that an opposed substrate alignment mark and a micro louver alignment mark in an image forming apparatus of the present invention are overlapped, and 47B is a plan view showing a modification of 47A.

As shown in FIG. 47A, the micro louver alignment mark 18 is a rectangle. The opposed substrate alignment mark 20 is of a frame-like shape that fit to the perimeter part of the rectangle of the micro louver alignment mark 18.

Figure 47B:
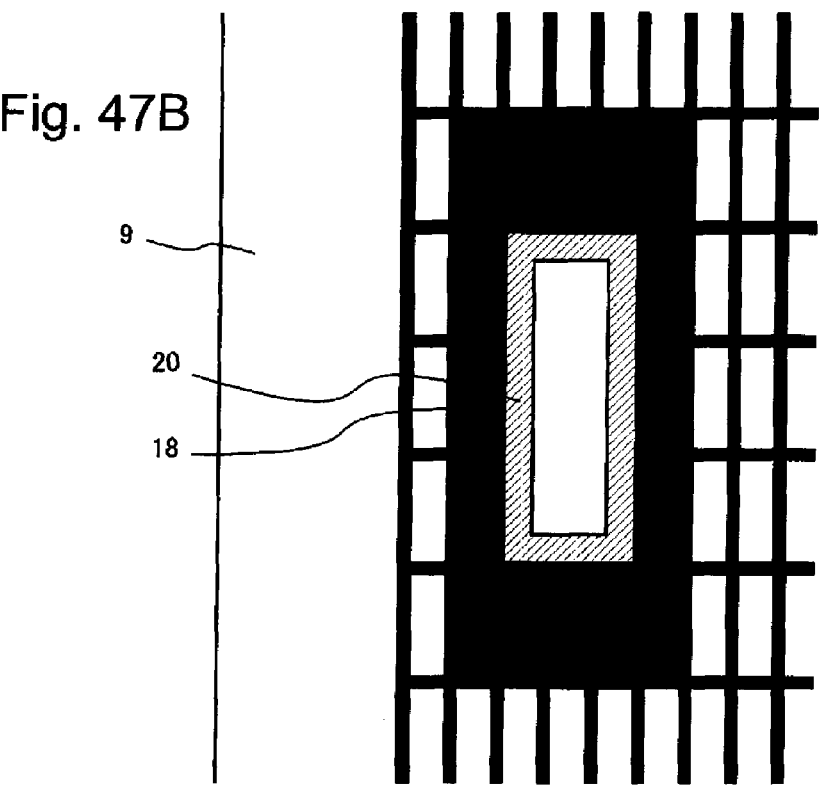

As shown in FIG. 47B, the shape of the micro louver alignment mark 18 may be a shape that the frame width is expanded compared with one shown in FIG. 47A.

Moreover, the shape of the micro louver alignment mark 18 shown in FIG. 48A is a shape that a rectangular flame is added inside the flame of FIG. 47A. In the above-mentioned case, the shape of the opposed substrate alignment mark 20 is a brackets-like shape.

As shown in FIG. 48B, the shape of the opposed substrate alignment mark 20 may be a shape in which the inside of the internal frame of FIG. 48A is formed by optical absorption layer 3.

In consideration of occurrence of a pattern defect, the width of optical absorption layer 3 of which the micro louver alignment mark 18 is constituted is necessary to be the same as or thicker than the width of optical absorption layer 3 formed at a portion corresponding to the BM pattern 2 of the opposed substrate 9.

Further, optical absorption layer 3 of which the micro louver alignment mark 18 is constituted can be also of a pattern isolated from the surrounding optical absorption layer 3. However, when the pattern size of the transparent layer 4 that composes the micro louver alignment mark 18 becomes large, possibility of occurrence of disorder and undulation or the like of a pattern by a stress increases.

Therefore, it is desirable to make the micro louver alignment mark 18 have a pattern that is connected with the surrounding optical absorption layer 3 if possible. In the above-mentioned case, there is a merit that, as a forming method of optical absorption layer 3, a filling method using a capillary phenomenon becomes selectable.

[Description of the effects] Thus, luminance degradation in the micro louver 1 can be suppressed to a minimum by performing alignment such that a part of the optical absorption layer 3 of the micro louver 1 and the BM pattern 2 of the liquid crystal display 29 are overlapped correctly.

Like the first exemplary embodiment, the pitch of the micro louver 1 is made smaller than the picture element pitch 64 of the liquid crystal display 29, and it is the size of 1/n (n is an integer number, and in this example, 3) of a pixel pitch 66. By the above-mentioned structure, the number of optical absorption layer 3 of the micro louver 1 that exist in picture element 63 can be made uniform. As a result, occurrence of nonuniformity of a transmittance can be prevented.

Further, when the micro louver 1 is arranged in the TFT substrate 16 side, a positional displacement of the micro louver 1 and the TFT substrate 16 influences the yield of the TFT substrate 16 directly. By arranging the micro louver 1 in the opposed substrate 9 side, the opposed substrate 9 causing a positional displacement can be disposed before being pasted to the TFT substrate 16. Therefore, influence to the TFT substrate 16 by a positional displacement can be prevented from happening. Because the manufacturing process of the TFT substrate 16 is complicated compared with the opposed substrate 9, it is very important to be able to prevent negative influence to the TFT substrate 16.

In FIG. 3, although the case where the laminated substrate 6 is attached to the micro louver 1 has been described, a similar effect can be obtained even when the laminated substrate 6 is not attached.

[Description of the manufacturing method] An outline of a manufacturing process of the image forming apparatus 200 in this exemplary embodiment is shown in FIGS. 7-8. A summary of a manufacturing process of the micro louver 1 in this exemplary embodiment is shown in FIG. 7A to 7G.

Figure 7A:
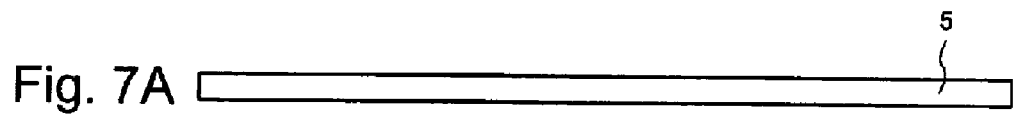
FIGS. 7A to 7G are sectional views showing a summary of a manufacturing process of a micro louver used in an image forming apparatus of the first exemplary embodiment of the present invention.
Figure 7B:
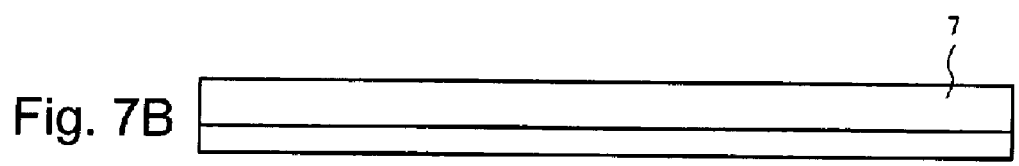

First, a transparent photosensitive resin 7 is formed on the surface of the transparent substrate 5 (refer to FIGS. 7A and 7B). As a forming method of the transparent photosensitive resin 7, a film-forming method such as a slit die coater, a wire coater, an applicator, dry film transfer and sprayer application can be used, for example. PET or PC is used as the material of the transparent substrate 5. As the transparent photosensitive resin 7, a chemically-amplified type photoresist (product name: SU-8) made by Kayaku MicroChem (Microchem) company is employed.

The above-mentioned transparent photosensitive resin 7 is a negative resist of an epoxy system (specifically, a glycidyl ether derivative of Bis Phenol A novolak) in which a photoinitiator generates an acid by applying ultraviolet rays, and hardenable monomers are polymerized using this proton acid as a catalyst. In addition, this transparent photosensitive resin 7 is superior in transparency characteristics in the visible light range.

Hardenable monomers included in the transparent photosensitive resin 7 are a cyclopentanone, propylene glycol methyl ethereal acetate (PEGMEA), gamma butyl lactone (GBL) and isobutyl ketone (MIBK). Because molecular weight of the above-mentioned hardenable monomers before hardening is small relatively and they can be dissolved in a solvent very well, thick film forming is easy.

Because optical transparency of the transparent photosensitive resin 7 is very good also in the wavelengths of intravital ultraviolet ranges, it has the feature that ultraviolet rays are transmitted even though it is a thick film. The thickness of transparent photosensitive resin 7 is in the range of 30 µm-300 µm, and it is set to 120 µm in this exemplary embodiment.

Because the transparent photosensitive resin 7 has the above-mentioned feature of good optical transparency, a pattern of a high aspect ratio of no smaller than 3 can be formed. In the hardenable monomers, a lot of functional groups exist. Therefore, after hardening, the transparent photosensitive resin 7 becomes a quite high-density bridged state, having a feature of being very stable chemically and thermally.

For this reason, processing of this transparent photosensitive resin 7 after pattern forming can be easily performed also. Of course, the transparent photosensitive resin 7 used in this exemplary embodiment is not limited to the transparent photosensitive resin 7 described here (the trade name: SU-8), and any kind of photocurable material having similar characteristics may be used.

Figure 7C:
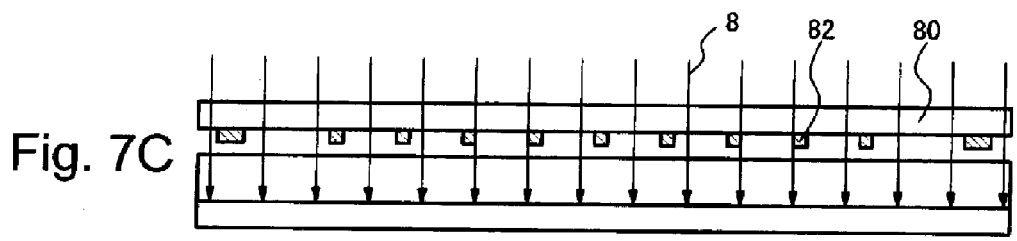

Next, the transparent photosensitive resin 7 is patterned using a mask pattern 82 of a photomask 80 (refer to FIG. 7C). Exposing light 8 used on this occasion is parallel light. An ultraviolet (UV) light source is employed as a light source, and a UV ray of the wavelength of 365 nm is radiated as the exposing light 8. Luminous exposure on this occasion is in the range of 200 mJ/cm$^2$-400 mJ/cm$^2$, and 350 mJ/cm$^2$ is selected in this exemplary embodiment.

Figure 7D:
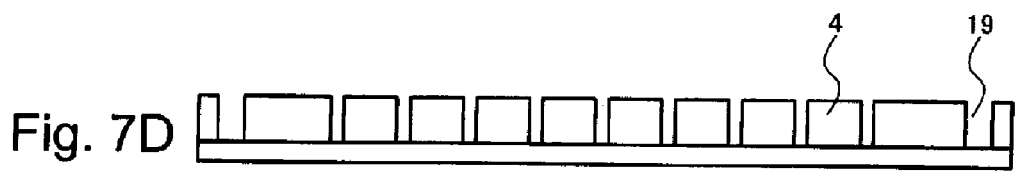
Figure 7E:
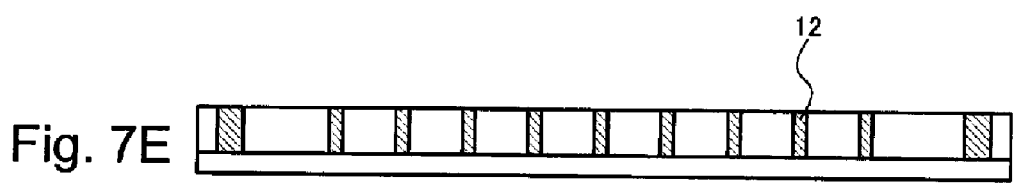
Figure 7F:
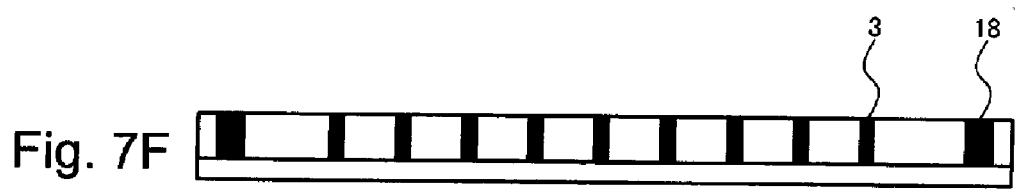

When exposure and development is finished, transparent layer 4 is formed (refer to FIG. 7D). A micro louver alignment mark pattern 19 is formed simultaneously at that time. Next, a black hardening resin 12 is filled between each pattern of the patterned transparent layer 4. Then, the black hardening resin 12 is hardened and optical absorption layer 3 is formed. (Refer to FIGS. 7E and 7F).

As a hardening method of the black hardening resin 12, thermal annealing and UV irradiation is generally used. UV irradiation is performed with a light quantity of 120 mJ/cm$^2$ in this exemplary embodiment, and after that, thermal annealing is carried out under the condition of 90°C./30 minutes. At that time, the micro louver alignment mark 18 is formed simultaneously.

Figure 7G:
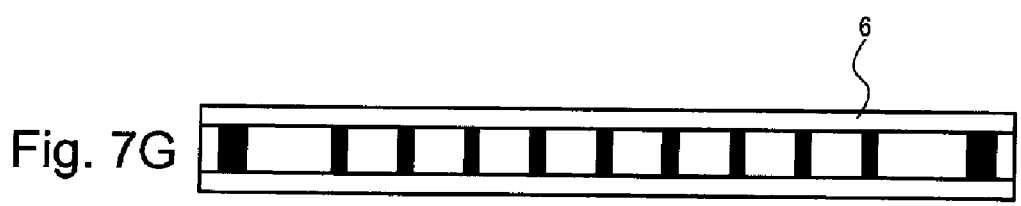

Finally, the micro louver 1 will be completed by mounting the laminated substrate 6 on the surfaces of the transparent photosensitive resin 7 and the black hardening resin 12 (refer to FIG. 7G). The laminated substrate 6 may be mounted on the transparent photosensitive resin 7 and the black hardening resin 12, and it may also be mounted on the transparent photosensitive resin 7 and the black hardening resin 12 via a clear adhesive layer.

Figure 8A:
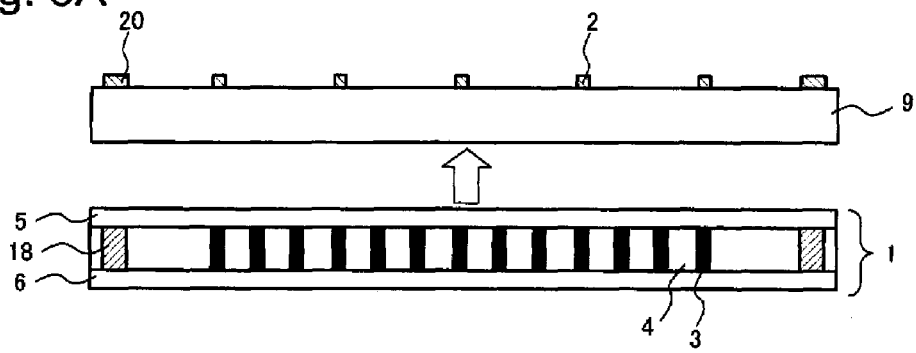
FIGS. 8A to 8D are sectional views showing a summary of a manufacturing process of an image forming apparatus of the first exemplary embodiment of the present invention.

Next, as shown in FIGS. 8A to D, the micro louver 1 is mounted on the opposed substrate 9 (refer to FIG. 8A). At the time when the micro louver 1 is mounted, alignment is performed using the micro louver alignment mark 18 and the opposed substrate alignment mark 20 so that the position of the BM pattern 2 of the opposed substrate 9 may be matched to optical absorption layer 3 of the micro louver 1.

By the above-mentioned alignment, it is possible to suppress luminance degradation by the micro louver 1 to a minimum compared with a case when positions are not aligned. Meanwhile, there is a polarizer which is not being illustrated on a surface of the opposed substrate 9, and the micro louver 1 is mounted on the polarizer. About mounting of the micro louver 1, it may be pasted on the opposed substrate 9 using a pressure-sensitive adhesive or the like, and also it may be fixed by a clip or the like. In this exemplary embodiment, the micro louver 1 is pasted on the opposed substrate 9 using a pressure-sensitive adhesive.

Figure 8B:
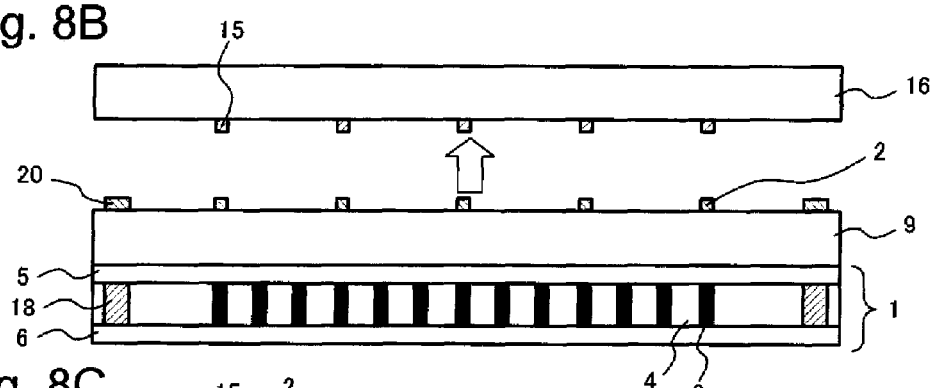
Figure 8C:
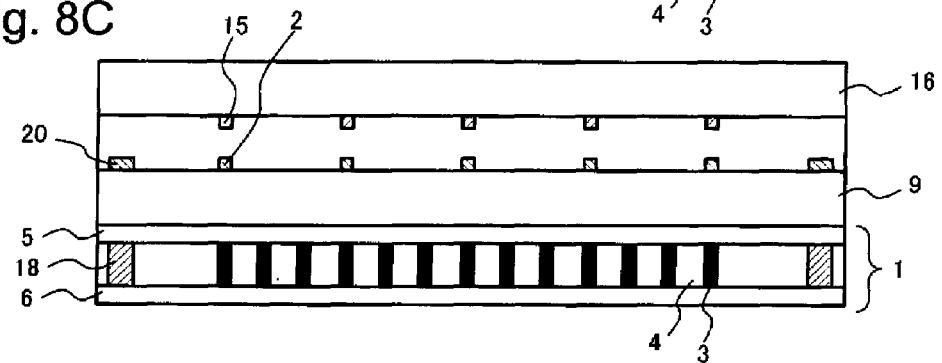
Figure 8D:
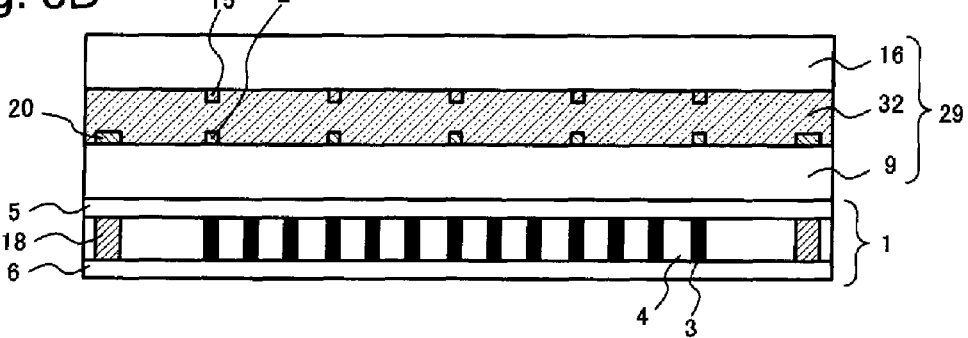

Next, the opposed substrate 9 to which the micro louver 1 is attached is pasted together with the TFT substrate 16 (refer to FIGS. 8B and 8C). Finally, by interposing the liquid crystal layer 32 between the TFT substrate 16 and the opposed substrate 9, the image forming apparatus 200 of this exemplary embodiment can be obtained (refer to FIG. 8D).

[The Third Exemplary Embodiment]

Next, the third exemplary embodiment will be described.

Figure 9:
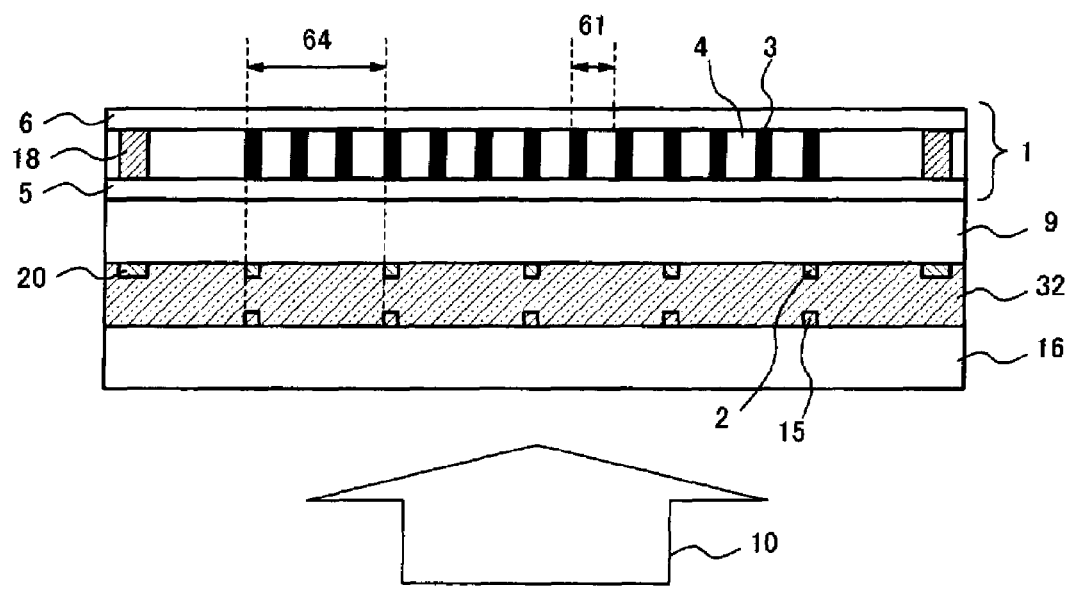
FIG. 9 is a sectional view showing an outline of a structure of an image forming apparatus of a third exemplary embodiment of the present invention.

FIG. 9 indicates a sectional view of the image forming apparatus 200 according to this exemplary embodiment in the thicknesswise direction. Meanwhile, for simplification, symbols of constructional elements of main parts such as a substrate will be described using the same symbols as the first exemplary embodiment.

A point of difference of this exemplary embodiment and the first exemplary embodiment is a point that the micro louver 1 is arranged in the outgoing side of the light. By the above-mentioned structure, the backlight 10 enters from the TFT substrate 16 side.

[Description of the effect] In the image forming apparatus 200 of this exemplary embodiment, the micro louver 1 is arranged in the outgoing side of the light. Therefore, an observer can see an image just after light distribution is performed, and a light distribution characteristic is improved compared with the case where the light passes the liquid crystal display 29 after light distribution. In other words, because a light distribution characteristic improves, a visible area can be restricted correctly and the light is not emitted in the unnecessary directions. As a result, it becomes difficult for others to peep from the side, and thus the information leak prevention effect improves.

Although a case where the laminated substrate 6 is attached on the micro louver 1 has been described in FIG. 9, even when the laminated substrate 6 is not mounted, the similar effect can be obtained.

[The Fourth Exemplary Embodiment]

Next, the fourth exemplary embodiment will be described.

FIG. 10 and FIG. 11 show a summary of the manufacturing process of an image forming apparatus 200 according to this exemplary embodiment. Meanwhile, for easiness, symbols of such as a substrate will be described using the same symbols as the first and second exemplary embodiments.

A point of difference of this exemplary embodiment and the first exemplary embodiment is a point that the micro louver 1 is formed directly on the opposed substrate 9.

First, the BM pattern 2 and the opposed substrate alignment mark 20 is formed on a surface of the opposed substrate 9. The transparent photosensitive resin 7 is formed in the side opposite to the face on which the BM pattern 2 of the opposed substrate 9 has been formed (refer to FIGS. 10A and 10B). As the transparent photosensitive resin 7, the chemically-amplified type photoresist (product name: SU-8) made by Kayaku MicroChem (Microchem) company is employed like the first and second exemplary embodiment.

The thickness of transparent photosensitive resin 7 is made be in the range of 30 μm-300 μm, and it is set to 120 μm in this exemplary embodiment like the first and second exemplary embodiment. The transparent photosensitive resin 7 is not limited to the transparent photosensitive resin 7 described above (trade name: SU-8), and any kind of photocurable material having similar characteristics may be used.

Next, the transparent photosensitive resin 7 is patterned using the mask pattern 82 of the photomask 80 (refer to FIG. 10C). A mask pattern 82 is made be the same one as the first and second exemplary embodiment. The exposing light 8 is parallel light.

The opposed substrate 9 and the micro louver 1 are aligned using the opposed substrate alignment mark 20 formed on the opposed substrate 9 and the micro louver alignment mark 18 in the photomask 80.

When exposure and development is performed, transparent layer 4 is formed, and the micro louver alignment mark 18 in the photomask 80 is transcribed as the micro louver alignment mark pattern 19 (refer to FIG. 10D). When a mask is arranged such that the exposing light 8 does not enter the micro louver alignment mark 18 in the photomask 80 at the time of exposing, the micro louver alignment mark pattern 19 is not formed.

After this, optical absorption layer 3 is formed between transparent layer 4 like the first exemplary embodiment. The micro louver 1 will be completed by mounting the laminated substrate 6 on the transparent layer 4 and the optical absorption layer 3 (refer to FIGS. 10E 10F and 10G).

Figure 11A:
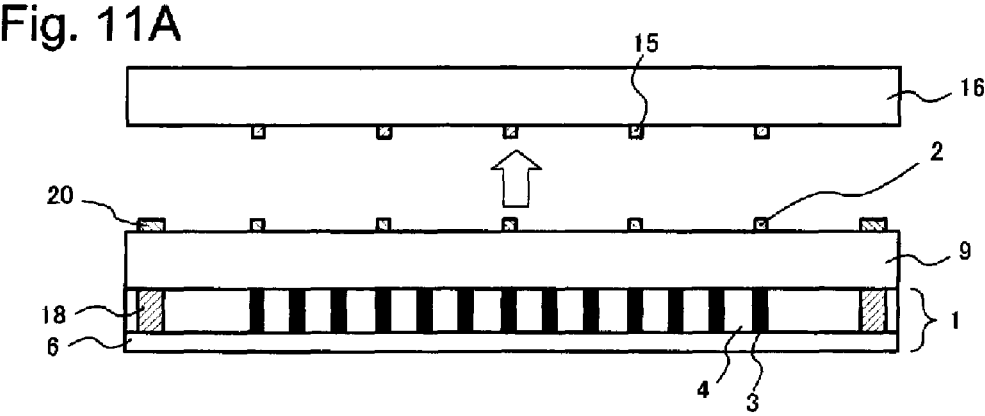
FIGS. 11A to 11C are sectional views showing a summary of a manufacturing process of an image forming apparatus of the fourth exemplary embodiment of the present invention.
Figure 11B:
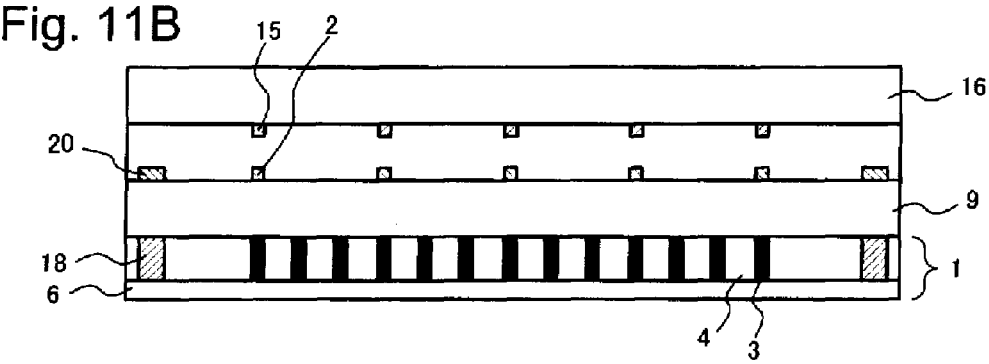
Figure 11C:
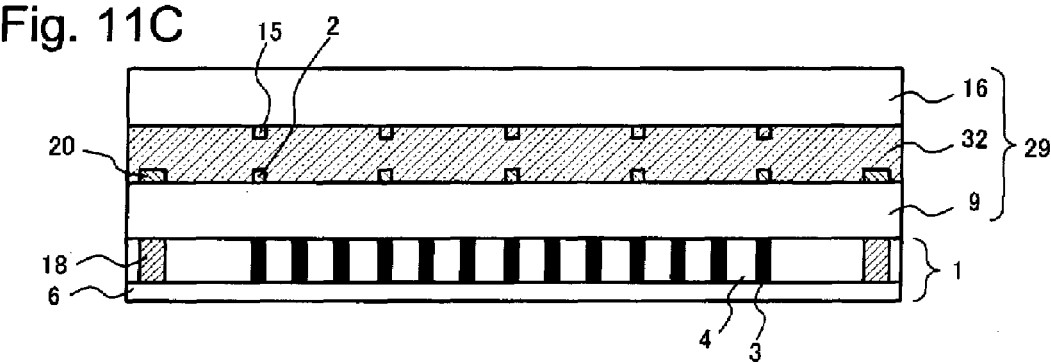

Next, as shown in FIG. 11A to 11C, the opposed substrate 9 on which the micro louver 1 is formed is pasted together with the TFT substrate 16 first (refer to FIGS. 11A and 11B). Next, the liquid crystal layer 32 is formed between the TFT substrate 16 and the opposed substrate 9 (refer to FIG. 11C). Then, as shown in FIG. 12, by radiating the backlight 10 from the micro louver 1 side, the image forming apparatus 200 in the third exemplary embodiment is obtained.

[Description of the effect] In the image forming apparatus 200 of this exemplary embodiment, the image forming apparatus 200 can be made thin by forming the micro louver 1 directly on the opposed substrate 9, and improvement of a yield becomes possible by reduction of the number of components.

Figure 12:
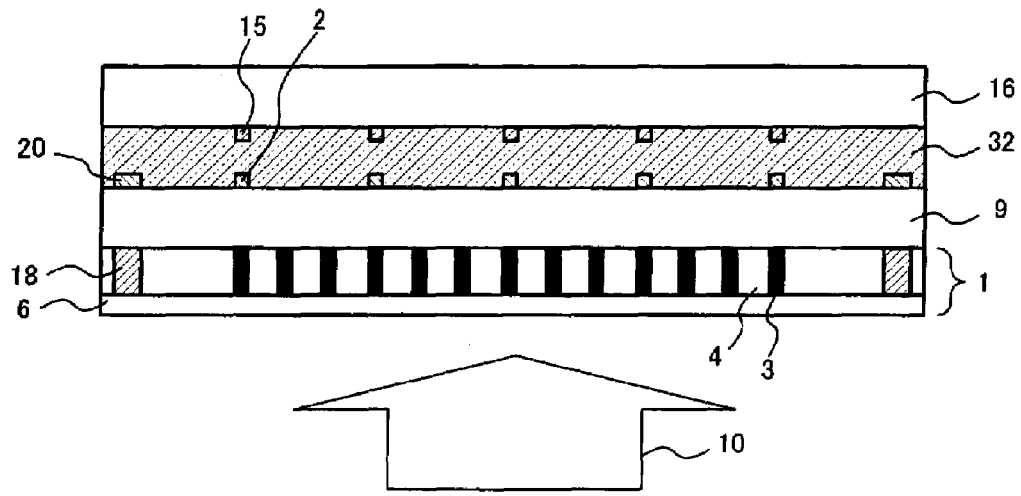
FIG. 12 is a sectional view showing an outline of a structure of an image forming apparatus of the fourth exemplary embodiment of the present invention.
Figure 13:
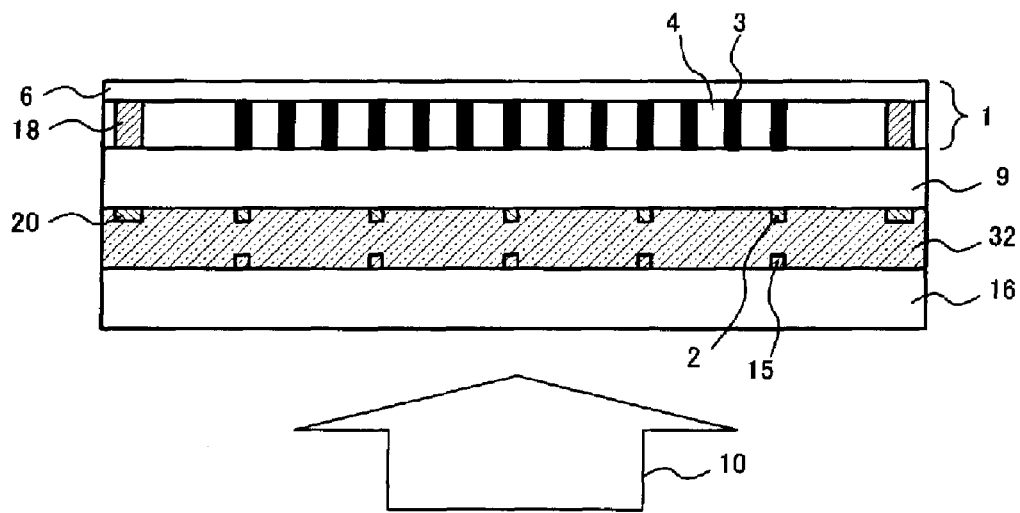
FIG. 13 is a sectional view showing an outline of a structure in the case where the light source direction in an image forming apparatus of the fourth exemplary embodiment of the present invention is reversed.

Although, in FIG. 12, a case where the micro louver 1 is located in the incoming side of the backlight 10 has been described, the similar effect can be also obtained in a case where it is arranged in the outgoing light side as shown in FIG. 13. In addition, as indicated in the second exemplary embodiment, the light distribution characteristic improves compared with a case where the micro louver 1 is arranged in the incoming light side.

Further, although a case where the laminated substrate 6 is attached to the micro louver 1 has been described in FIGS. 10-13, even when there is no laminated substrate 6, the similar effect is obtained.

[The Fifth Exemplary Embodiment]

Next, the fifth exemplary embodiment will be described.

FIG. 14 shows a summary of the manufacturing process of an image forming apparatus 200 in this exemplary embodiment. Meanwhile, for simplification, symbols of constructional elements of main parts such as a substrate will be described using the same symbols as the first and second exemplary embodiments, and the same micro louver 1 as the first exemplary embodiment is used.

A point of difference of this exemplary embodiment and the first exemplary embodiment is a point that the BM pattern 2 is not formed.

Figure 14A:
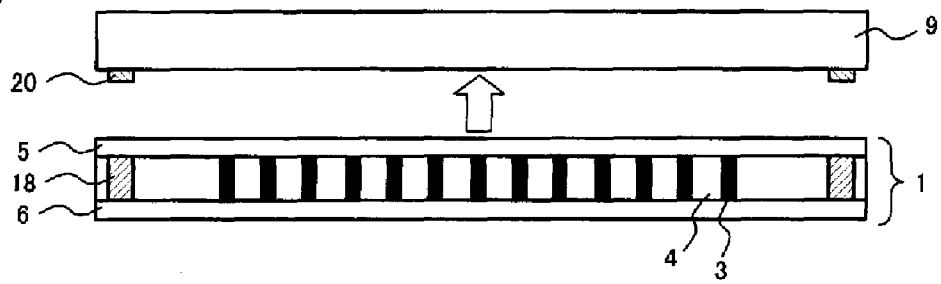
FIGS. 14A to 14D are sectional views showing a summary of a manufacturing process of an image forming apparatus of a fifth exemplary embodiment of the present invention.

First, the micro louver 1 is mounted on the opposed substrate 9 (refer to FIG. 14A). On the opposed substrate 9, there is no BM pattern 2, and the opposed substrate alignment mark 20 is formed. When the micro louver 1 is mounted, the alignment is made using the micro louver alignment mark 18 and the opposed substrate alignment mark 20.

A luminance fall by a positional displacement of the BM pattern 2 and optical absorption layer 3 can be prevented because optical absorption layer 3 of the micro louver 1 also functions as the BM pattern 2 as an alternative of the BM pattern 2 which is supposed to exist in the opposed substrate 9.

Figure 14B:
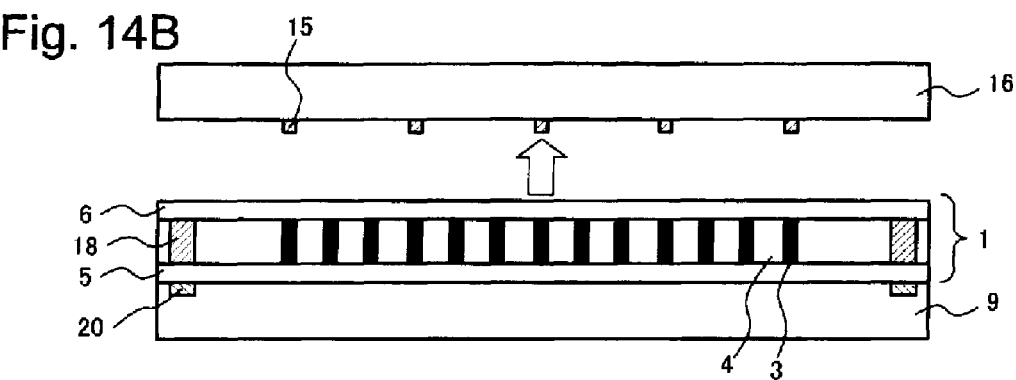
Figure 14C:
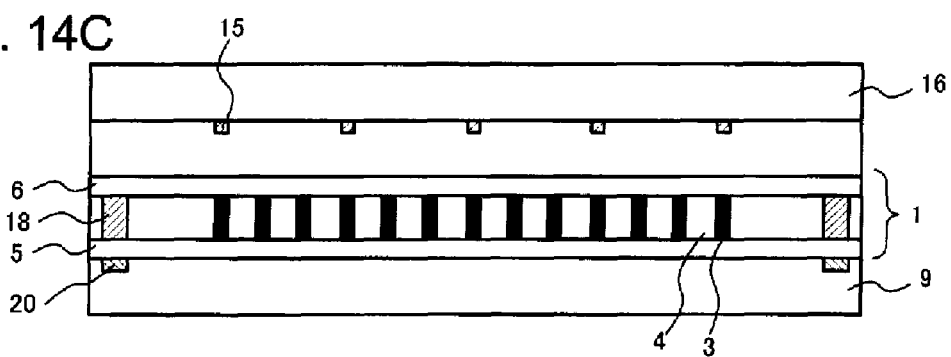
Figure 14D:
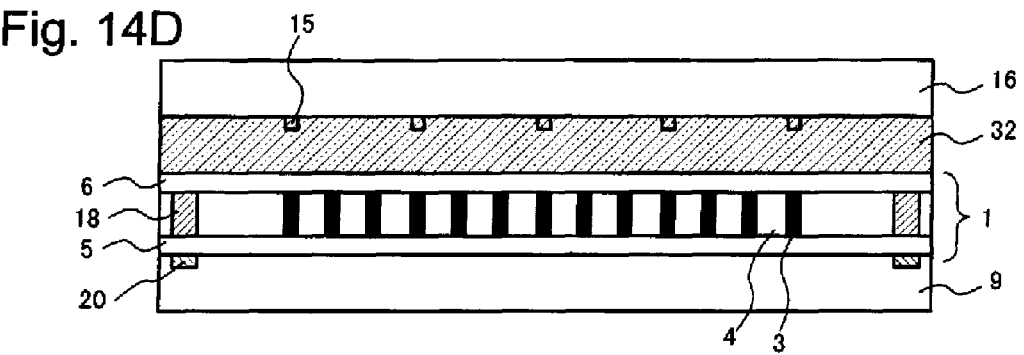

Next, the opposed substrate 9 on which the micro louver 1 has been mounted and the TFT substrate 16 are pasted together (refer to FIGS. 14B and C). Next, the liquid crystal layer 32 is injected between the TFT substrate 16 and the opposed substrate 9 (refer to FIG. 14D). Then, by radiating the backlight 10 from the opposed substrate 9 side as shown in FIG. 15, the image forming apparatus 200 of the fourth exemplary embodiment is obtained.

[Description of the effect] In the case of the image forming apparatus 200 of this exemplary embodiment, it is possible to omit the BM pattern 2. Because influence of a positional displacement of the BM pattern 2 and the optical absorption layer 3 and a forming defect or the like of the BM pattern 2 are eliminated, yield improvement becomes possible.

Figure 15:
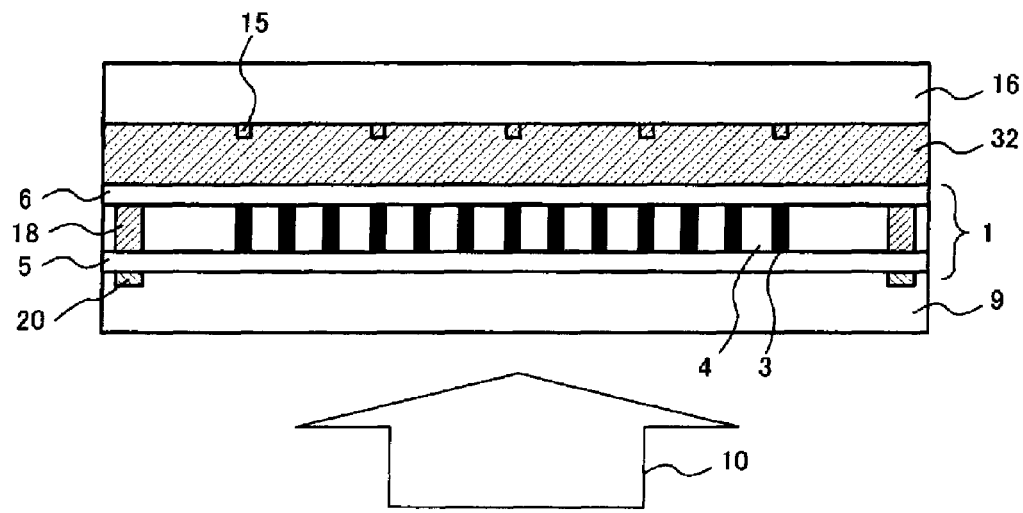
FIG. 15 is a sectional view showing an outline of a structure of the image forming apparatus of the fifth exemplary embodiment of the present invention.
Figure 16:
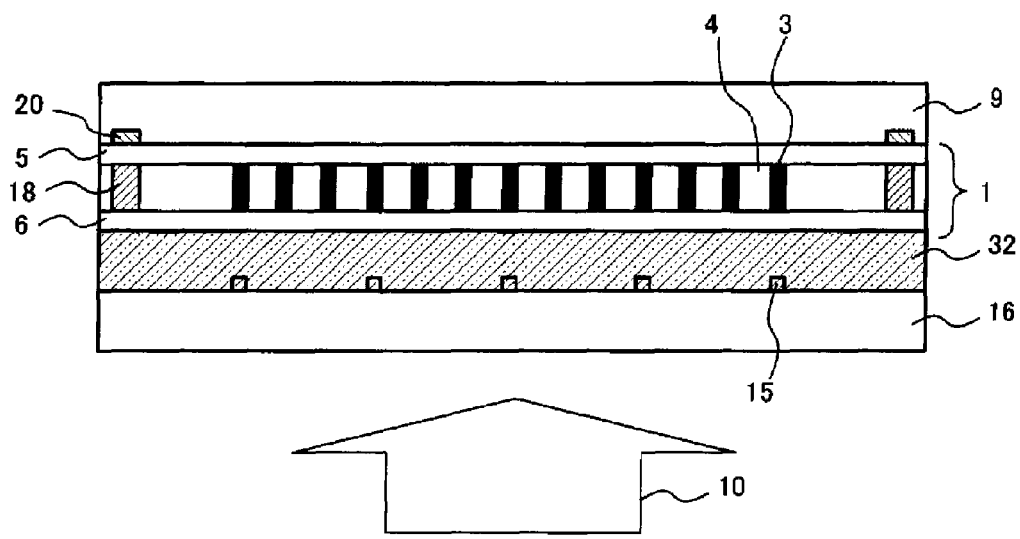
FIG. 16 is a sectional view showing an outline of a structure in the case where the light source direction in an image forming apparatus of the fifth exemplary embodiment of the present invention is reversed.

Although, in FIG. 15, a case where the micro louver 1 is arranged in the incident light side has been described, the similar effect can be obtained also in a case where it is provided in the outgoing light side as shown in FIG. 16, and in addition, as indicated in the second exemplary embodiment, the light distribution characteristic of the image forming apparatus 200 is improved compared with the case where the micro louver 1 is arranged in the incident light side.

Further, in FIGS. 14-16, although a case where the laminated substrate 6 is attached to the micro louver 1 has been described, even when there is not laminated substrate 6, the similar effect is obtained.

[The Sixth Exemplary Embodiment]

Next, the sixth exemplary embodiment will be described.

FIG. 17 and FIG. 18 show a summary of a manufacturing process of the micro louver 1 in this exemplary embodiment. Meanwhile, for easiness, symbols of such as a substrate will be described using the same symbols as the first and second exemplary embodiments.

A point of difference of this exemplary embodiment and the first exemplary embodiment is a point that the micro louver 1 is formed directly on the opposed substrate 9 and the BM pattern 2 is not formed.

Figure 17A:
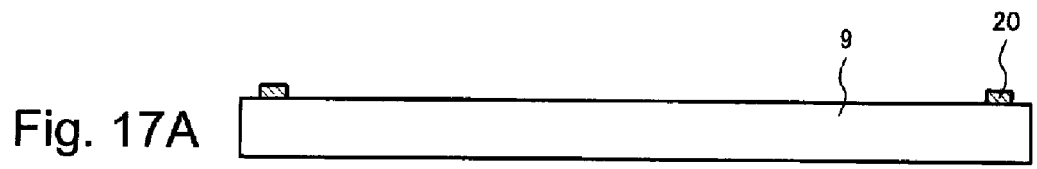
FIGS. 17A to 17G are sectional views showing a summary of a manufacturing process of a micro louver used in an image forming apparatus of a sixth exemplary embodiment of the present invention.
Figure 17B:
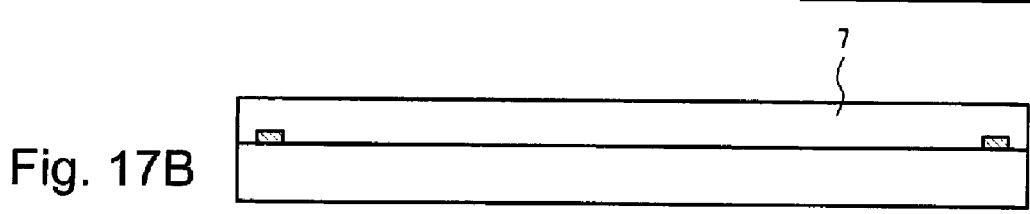
Figure 17C:
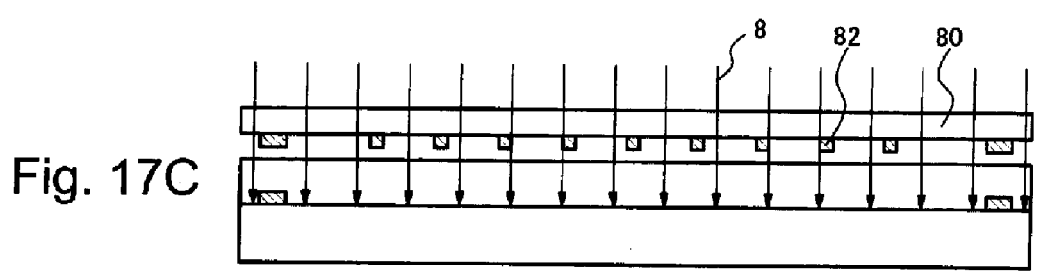

First, the transparent photosensitive resin 7 is formed in the same manner as the first example onto the surface on which the opposed substrate alignment mark 20 of the opposed substrate 9 is formed (refer to FIGS. 17A and 17B). Next, the transparent photosensitive resin 7 is patterned using the mask pattern 82 of the photomask 80 (refer to FIG. 17C).

The mask pattern 82 is made be the same as that of the first and second exemplary embodiments. The exposing light 8 uses parallel light like the first exemplary embodiment. At that time, alignment with the photomask 80 is performed using the opposed substrate alignment mark 20 formed onto the opposed substrate 9.

Figure 17D:
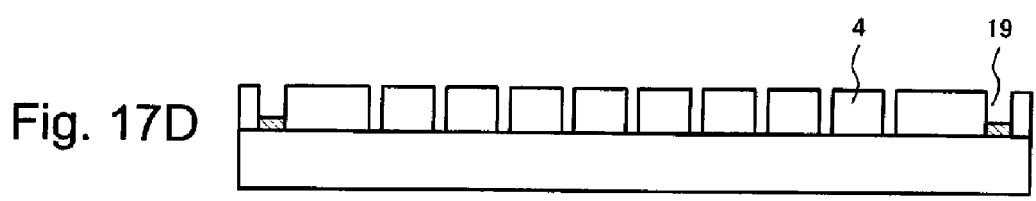
Figure 17E:
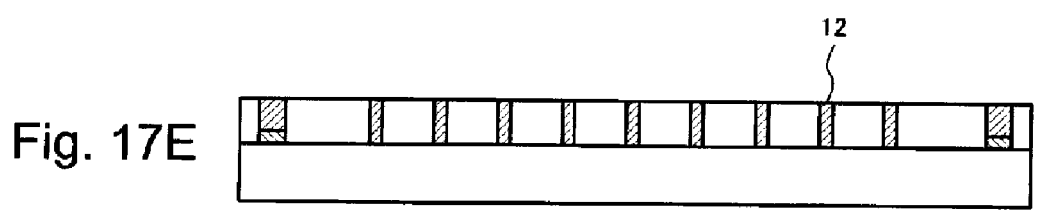
Figure 17F:
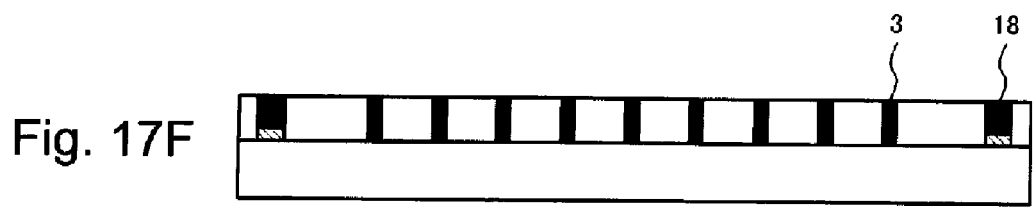
Figure 17G:
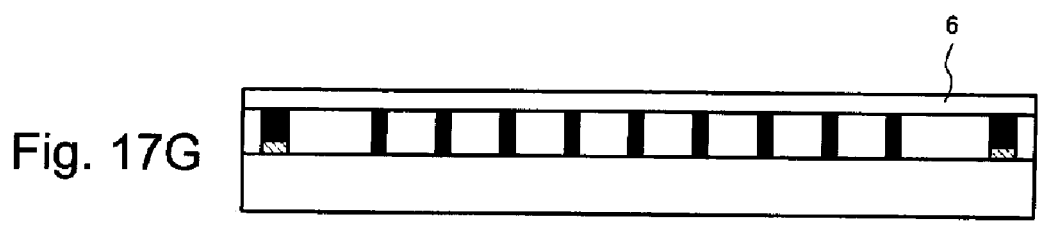

Transparent layer 4 is formed by exposure and development (refer to FIG. 17D). After this, like the first exemplary embodiment, optical absorption layer 3 is formed between transparent layer 4 and the laminated substrate 6 is mounted on transparent layer 4 and optical absorption layer 3, and the micro louver 1 is obtained (refer to FIGS. 17E, 17F and 17G).

Figure 18A:
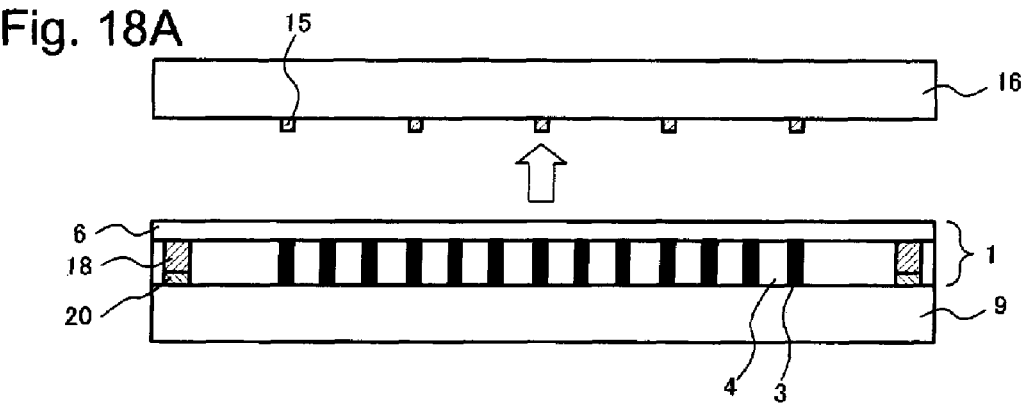
FIGS. 18A to 18C are sectional views showing a summary of a manufacturing process of an image forming apparatus of the sixth exemplary embodiment of the present invention.
Figure 18B:
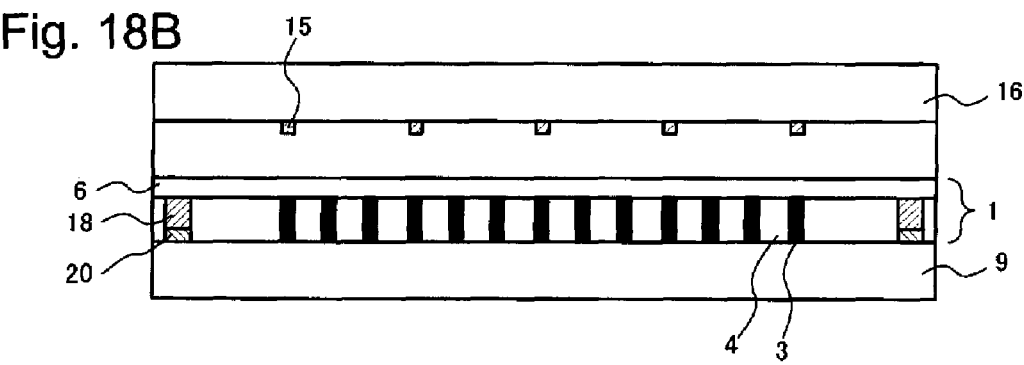
Figure 18C:
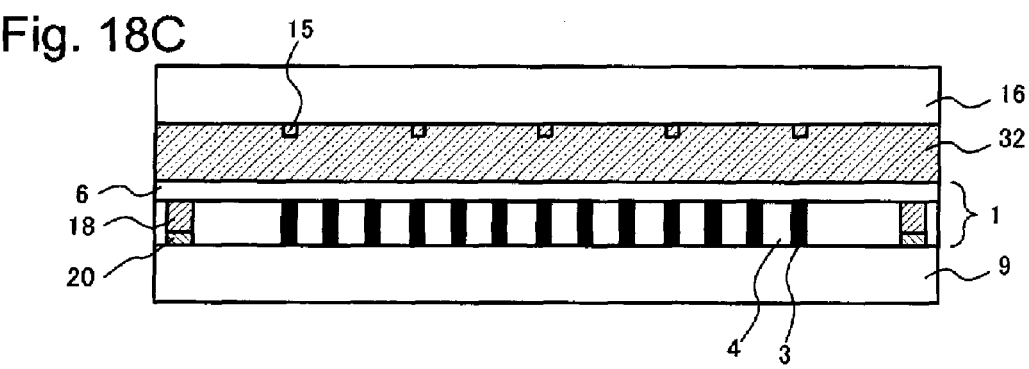

As shown in FIG. 18A to 18C, the opposed substrate 9 on which the micro louver 1 has been formed is pasted together with the TFT substrate 16 first (refer to FIGS. 18A and 18B). Next, the liquid crystal layer 32 is formed between the TFT substrate 16 and the opposed substrate 9 (refer to FIG. 18C). By radiating the backlight 10 from the opposed substrate 9 side as shown in FIG. 19, the image forming apparatus 200 of the fifth exemplary embodiment is obtained.

[Description of the effect] In the case of the image forming apparatus 200 of this exemplary embodiment, a thinner film structure is possible by forming the micro louver 1 directly on the opposed substrate 9, and yield improvement becomes possible by reduction of the number of components. Also, thanks to the omission of the BM pattern 2, influence of a positional displacement between the BM pattern 2 and the optical absorption layer 3 and a forming defect or the like of the BM pattern 2 disappears, enabling yield improvement.

Figure 19:
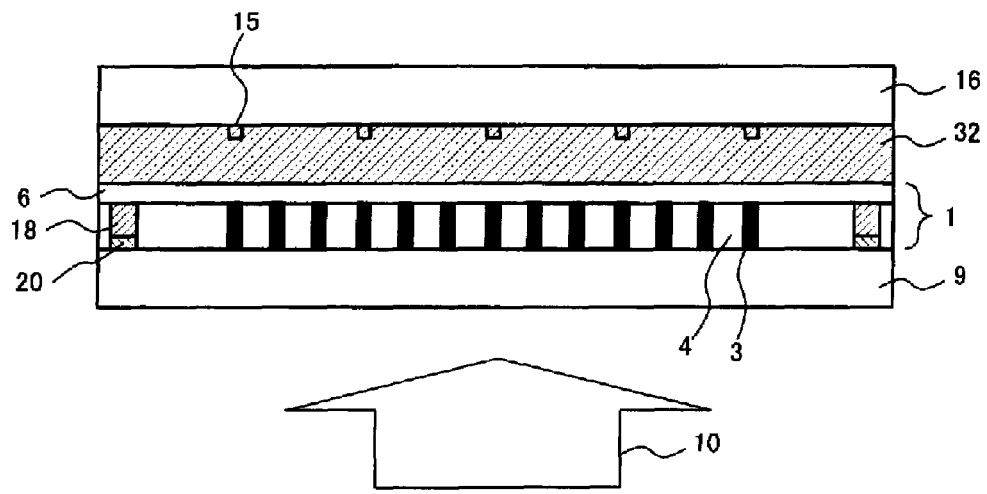
FIG. 19 is a sectional view showing an outline of a structure of an image forming apparatus of the sixth exemplary embodiment of the present invention.
Figure 20:
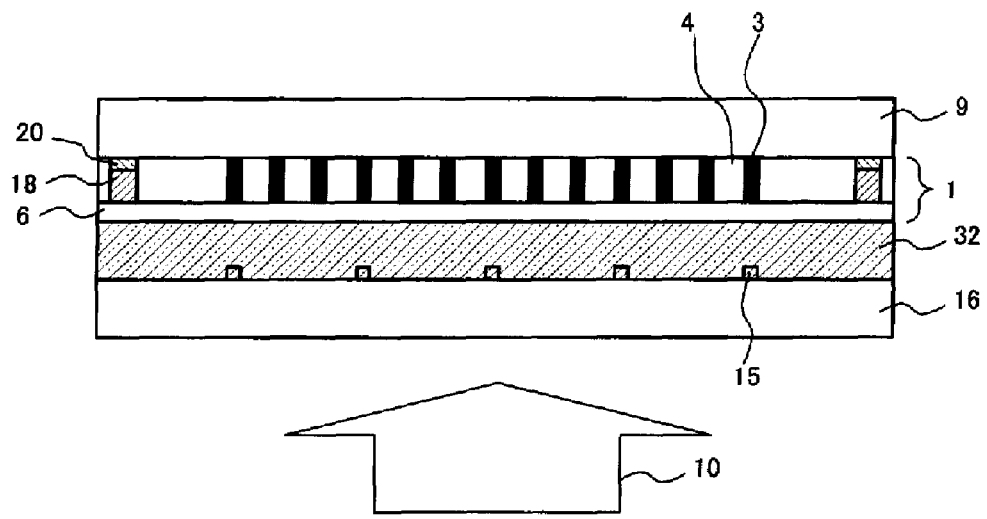
FIG. 20 is a sectional view showing an outline of a structure in the case where the light source direction in an image forming apparatus of the sixth exemplary embodiment of the present invention is reversed.

Further, in FIG. 19, although a case where the micro louver 1 is arranged in the incident light side relative to the liquid crystal layer 32 has been described, the similar effect can be also obtained about a case where it is provided in the outgoing light side as shown in FIG. 20, and a light distribution characteristic improves compared with a case where the micro louver 1 is arranged in the incident light side.

Meanwhile, in FIGS. 17-20, although a case where the laminated substrate 6 is attached to the micro louver 1 has been described, even when the laminated substrate 6 is not attached, the similar effect can be obtained.

[The Seventh Exemplary Embodiment]

Next, the seventh exemplary embodiment will be described in detail with reference to drawings.

Figure 21:
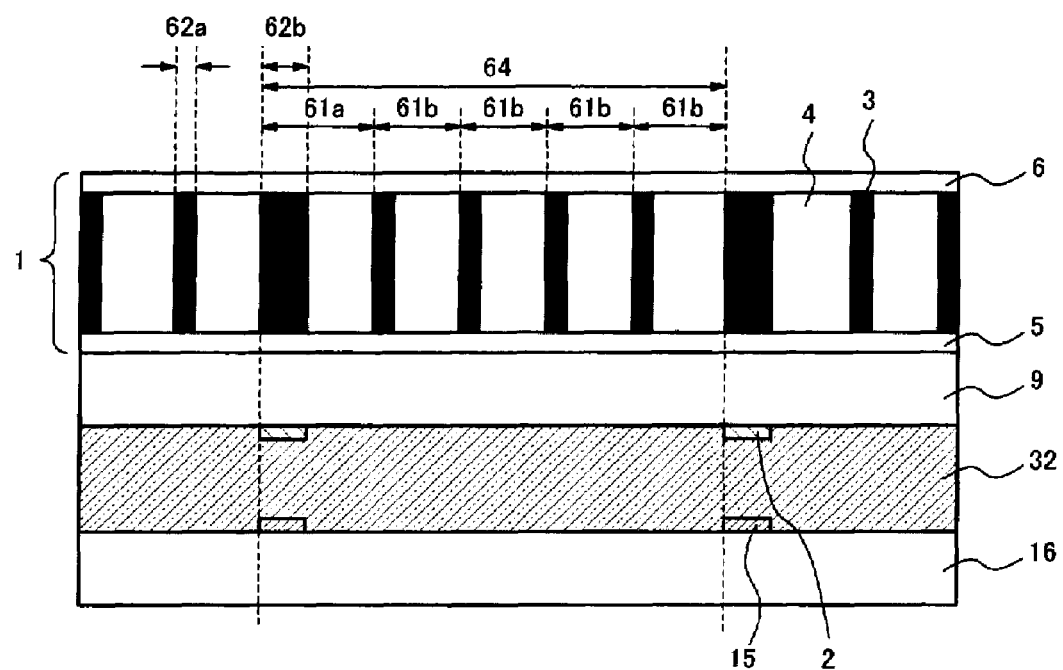
FIG. 21 is a sectional view showing an outline of a structure of an image forming apparatus of a seventh exemplary embodiment of the present invention.

FIG. 21 is a sectional view of the image forming apparatus 200 in this exemplary embodiment in the thickness wise direction.

A point of difference of this exemplary embodiment and the first exemplary embodiment is a point that the width of optical absorption layer 3 in an opposed position of the BM pattern 2 is wider than a width of the BM pattern 2. And the width of said optical absorption layer at a position not opposed to the BM pattern 2 is smaller than a width of the BM pattern 2.

Optical absorption layer 3 is formed on the transparent substrate 5, and transparent layer 4 is formed between each optical absorption layer 3. The laminated substrate 6 is mounted on the surfaces of transparent layer 4 and optical absorption layer 3.

It is reasonable that the height of transparent layer 4 is in the range of 30 μm-300 μm, and it is set to 120 μm in this exemplary embodiment. It is reasonable that the width of transparent layer 4 at the surface of the transparent substrate 5 is of the range of 5 μm-150 μm, and it is set to 40 μm in this example, and all the aspect ratios of transparent layer 4 are made be the same.

On the other hand, regarding optical absorption layer 3, there are two kinds of width (62a and 62b). The optical absorption layer width 62b at portions overlapping with the BM pattern 2 is wider than the optical absorption layer width 62a at a portions not overlapping with the BM pattern 2.

It is desirable that the width 62b of optical absorption layer 3 that overlaps with the BM pattern 2 is in the range of 10 μm-30 μm at the transparent substrate 5 surface, and it is set to 15 μm in this exemplary embodiment. It is desirable that, for portions not overlapping with the BM pattern 2, the width is of the range of 1 μm-15 μm at the transparent substrate 5 surface, and it is made be 5 μm in this exemplary embodiment.

There are also two kinds of louver pitch 61 (61a and 61b). The louver pitch 61a between optical absorption layer 3 overlapping with the BM pattern 2 and optical absorption layer 3 neighboring the former is made wider than the louver pitch 61b inside thereof. In the case of this exemplary embodiment, the louver pitch 61b is made be 45 μam, and the louver pitch 61a be 55 μm.

[Description of the effect] In the case of the image forming apparatus 200 of this exemplary embodiment, optical absorption layer 3 corresponding to the BM pattern 2 is wide, and the width of optical absorption layer 3 that does not overlap with the BM pattern 2 is of a narrow shape. By this, improvement of contrast and transmittance is possible simultaneously by prevention of light leak from the BM pattern 2 portions.

[The Eighth Exemplary Embodiment]

Next, the eighth exemplary embodiment will be described in detail with reference to a drawing.

Figure 22A:
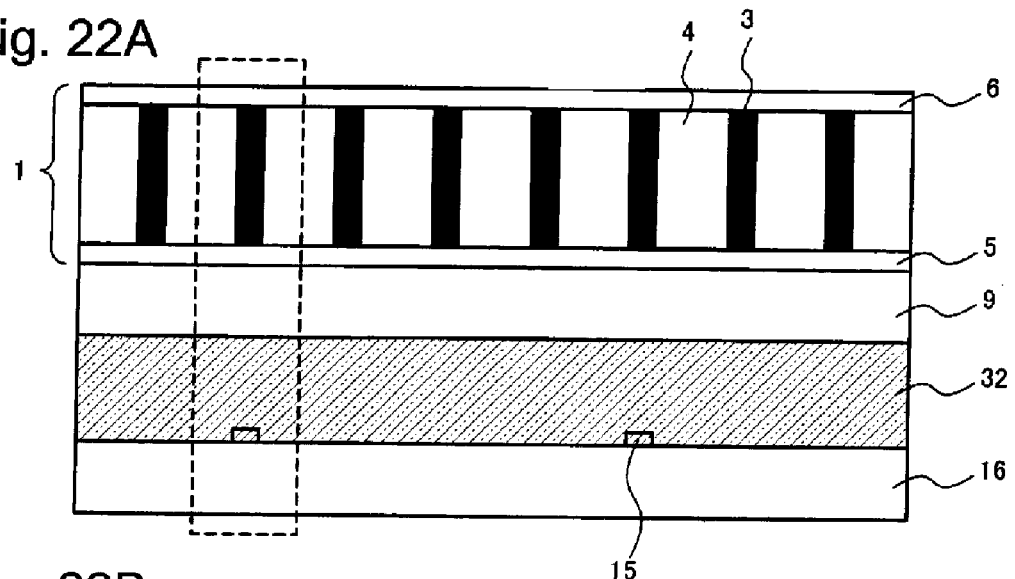
FIG. 22A is a sectional view showing an outline of a structure of the image forming apparatus of the seventh exemplary embodiment of the present invention, and 22B is a sectional view showing the dotted line frame part of 22A in an expanded state.
Figure 22B:
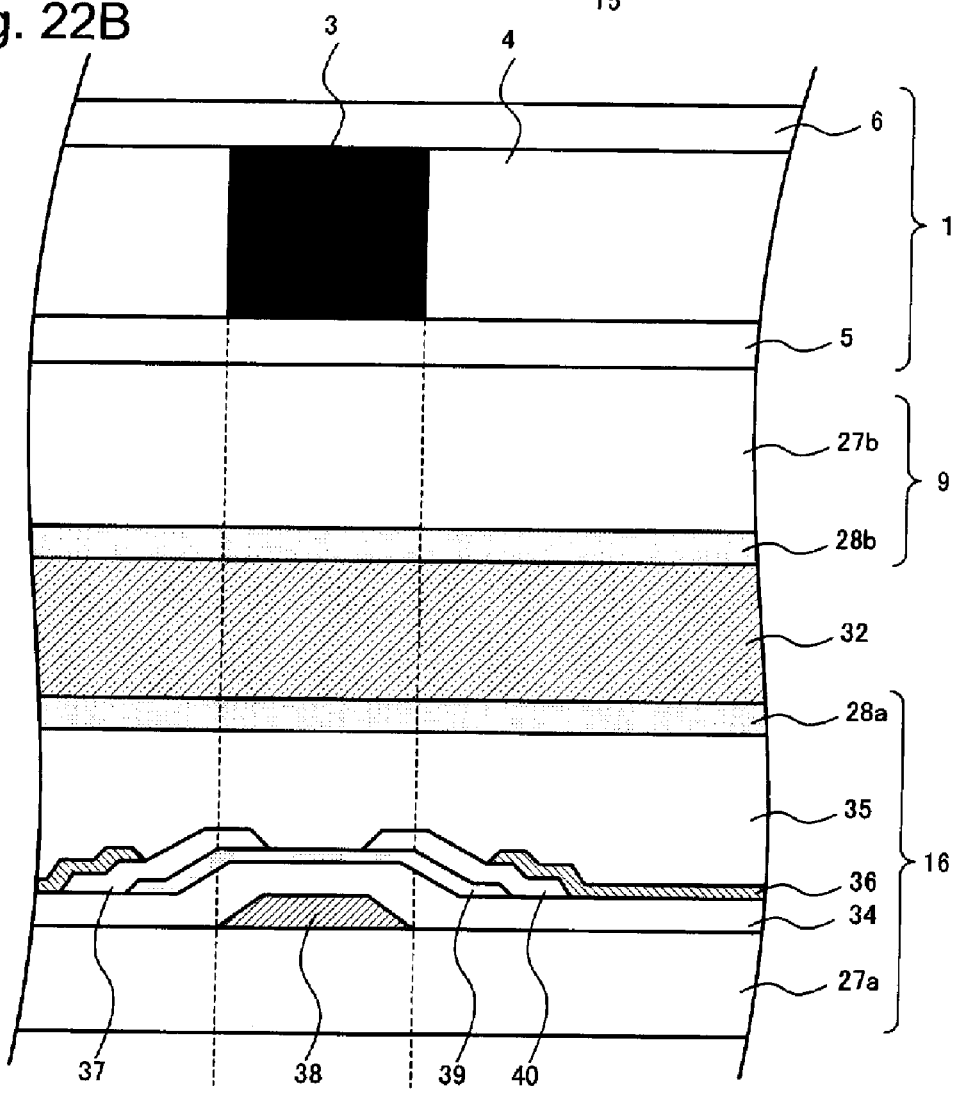

FIG. 22A indicates a sectional view of the image forming apparatus 200 in this exemplary embodiment in the thickness wise direction, and FIG. 22B shows a magnified view of the area indicated by a dotted line in the diagram.

A point of difference of this exemplary embodiment from the first exemplary embodiment is a point that some of optical absorption layer 3 and a gate electrode 38 in the TFT substrate 16 are arranged in a manner they are overlapped.

Optical absorption layer 3 is formed on the transparent substrate 5, and transparent layer 4 is formed between each optical absorption layer 3. The laminated substrate 6 is mounted on the surface of transparent layer 4 and optical absorption layer 3.

The liquid crystal display 29 is of a structure that the liquid crystal layer 32 is sandwiched by a pair of substrates, the TFT substrate 16 and the opposed substrate 9. A bottom gate type TFT is formed into the TFT substrate 16.

An active layer 39 is formed on the gate electrode 38 of the TFT via a gate insulation film 34. A source electrode 37 and a drain electrode 40 are formed on the active layer 39. The active layer 39 includes hydrogenated amorphous silicon (a-Si:H).

A part where the gate electrode 38 and the active layer 39 overlap is a channel of the TFT. Optical absorption layer 3 is arranged so that it may prevent light from a backlight from coming into the channel.

A drain wire 36 extends from the drain electrode 40 of the TFT, and connects with a transparent electrode 28a via a contact hole (not illustrated) provided in an interlayer insulation film 35. A transparent electrode 28b is formed on the whole surface of a substrate 27b of the opposed substrate 9.

[Description of the effect] As above, in the liquid crystal display 29 in this exemplary embodiment, the micro louver 1 is arranged in the opposed substrate 9 side, and some of optical absorption layer 3 are arranged such that they are overlapped with the gate electrode 38 in the TFT substrate 16. Also, it has a structure that the backlight 10 enters from the back of a substrate 27a of the TFT substrate 16.

In the case of the image forming apparatus 200 of this exemplary embodiment, because the gate electrode 38 and the optical absorption layer 3 shield the channel part of the TFT from the up and down sides and a leak caused by light incident to the channel part of the TFT does not occur, improvement of the contrast becomes possible.

Figure 23:
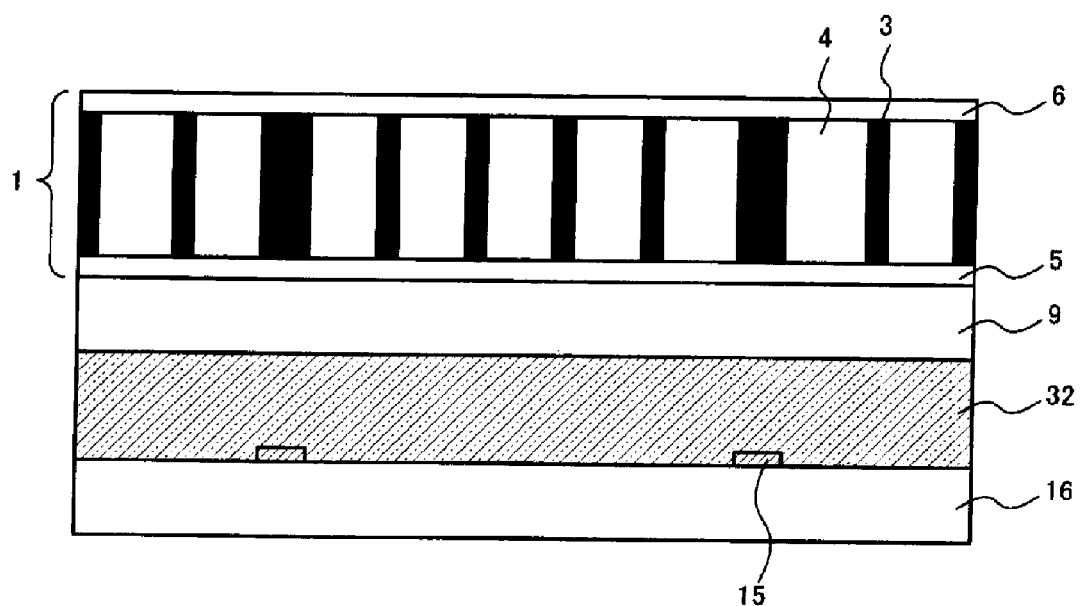
FIG. 23 is a sectional view showing an outline of a modification example of an image forming apparatus according to an eighth exemplary embodiment of the present invention.
Figure 24A:
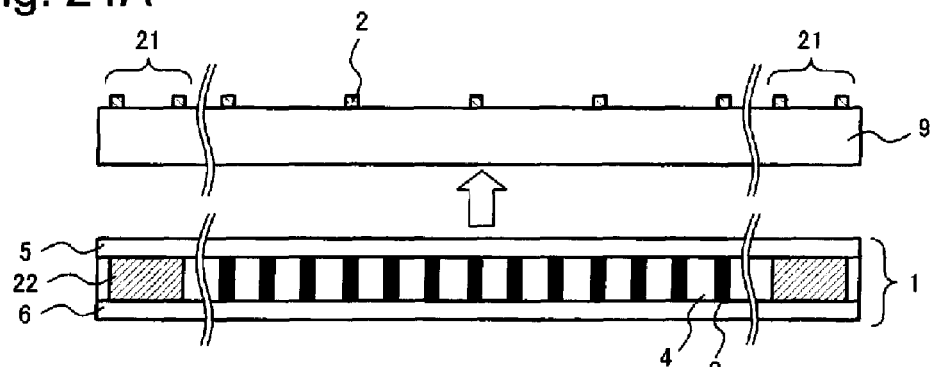
FIGS. 24A to 24D are sectional views showing a summary of a manufacturing process of an image forming apparatus of a ninth exemplary embodiment of the present invention.
Figure 24B:
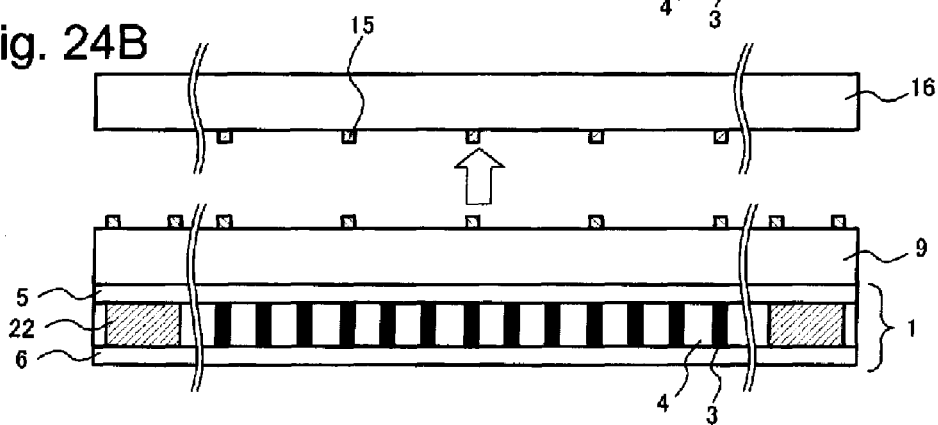
Figure 24C:
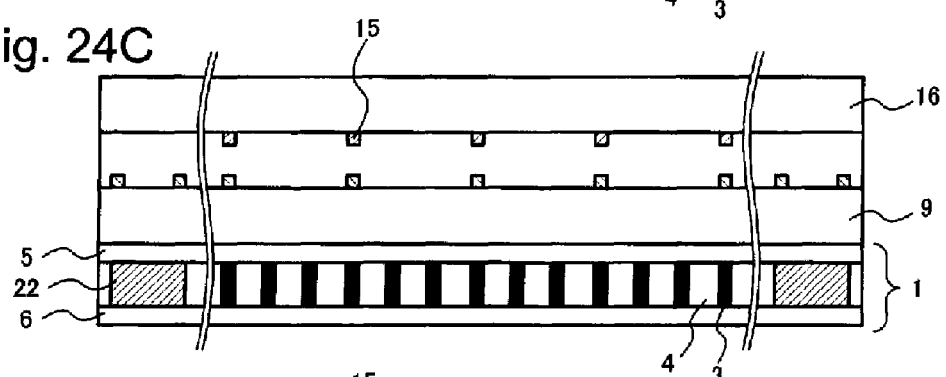
Figure 24D:
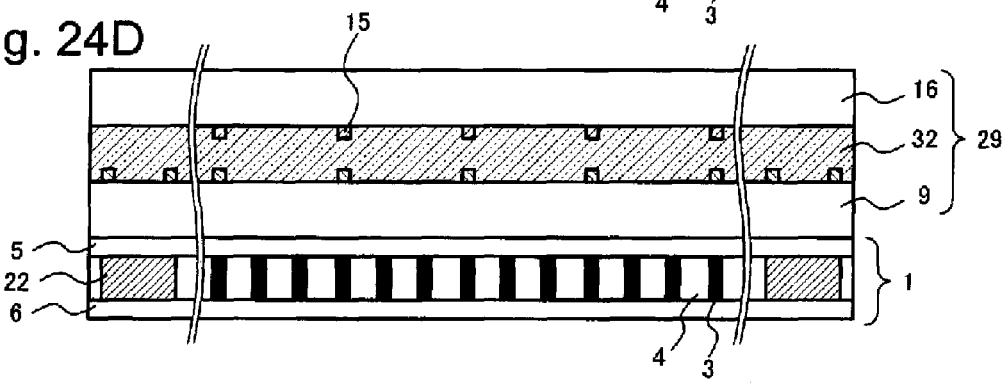

As shown in FIG. 23, a structure that the width of optical absorption layer 3 that overlaps with a gate wiring is of a size corresponding with the gate wiring, and the width of optical absorption layer 3 in the other portions is thin is also acceptable. The transmittance in this case improves compared with the structure of the micro louver 1 described in FIG. 22A.

Although a case where the backlight 10 is radiated from the back of the TFT substrate 16 has been described in FIGS. 22 and 23, even when the backlight 10 is radiated from the micro louver 1 side, the similar effect is obtained. When light enters the TFT substrate 16 after passing the micro louver 1, because it is possible to suppress incidence from an oblique direction to the picture element 63 to reduce the risk of occurrence of stray light, optical leaks of a TFT are further suppressed and thus precision of contrast improves.

[The Ninth Exemplary Embodiment]
Next, the ninth exemplary embodiment will be described in detail with reference to drawings.

Figure 25:
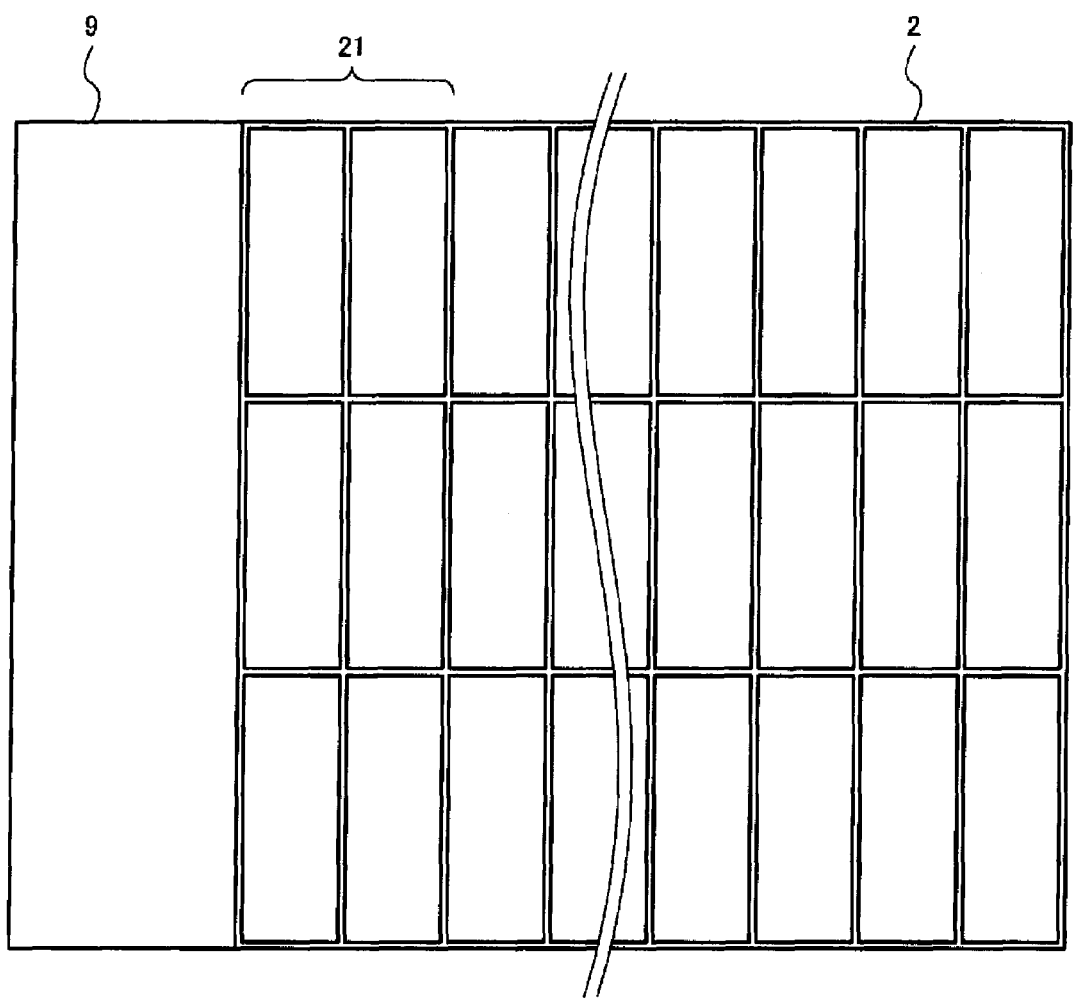
FIG. 25 is a plan view showing an outline of a BM pattern of a liquid crystal display in an image forming apparatus of the ninth exemplary embodiment of the present invention.
Figure 26:
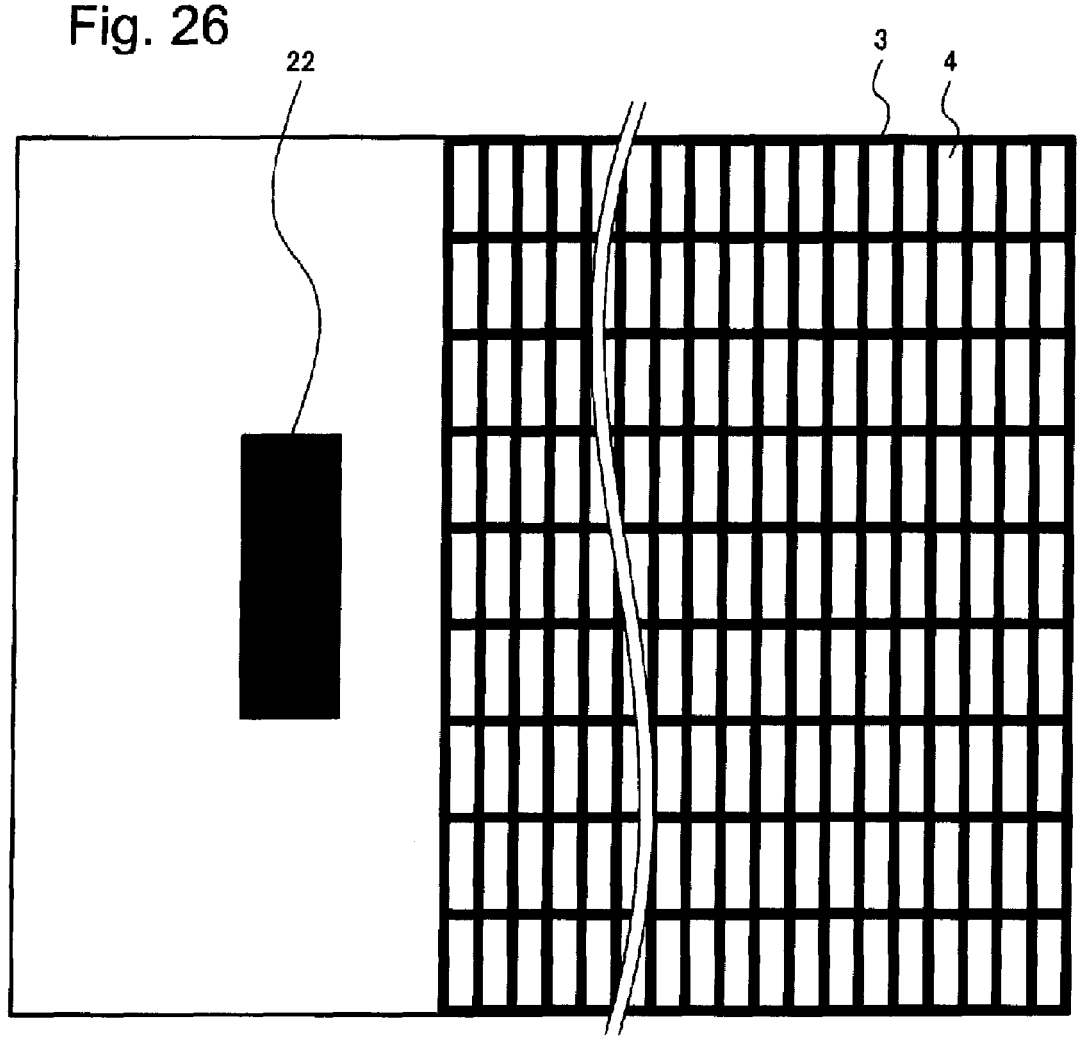
FIG. 26 is a plan view showing an outline of an optical absorption layer and an alignment pattern of a micro louver in an image forming apparatus of the ninth exemplary embodiment of the present invention.
Figure 27:
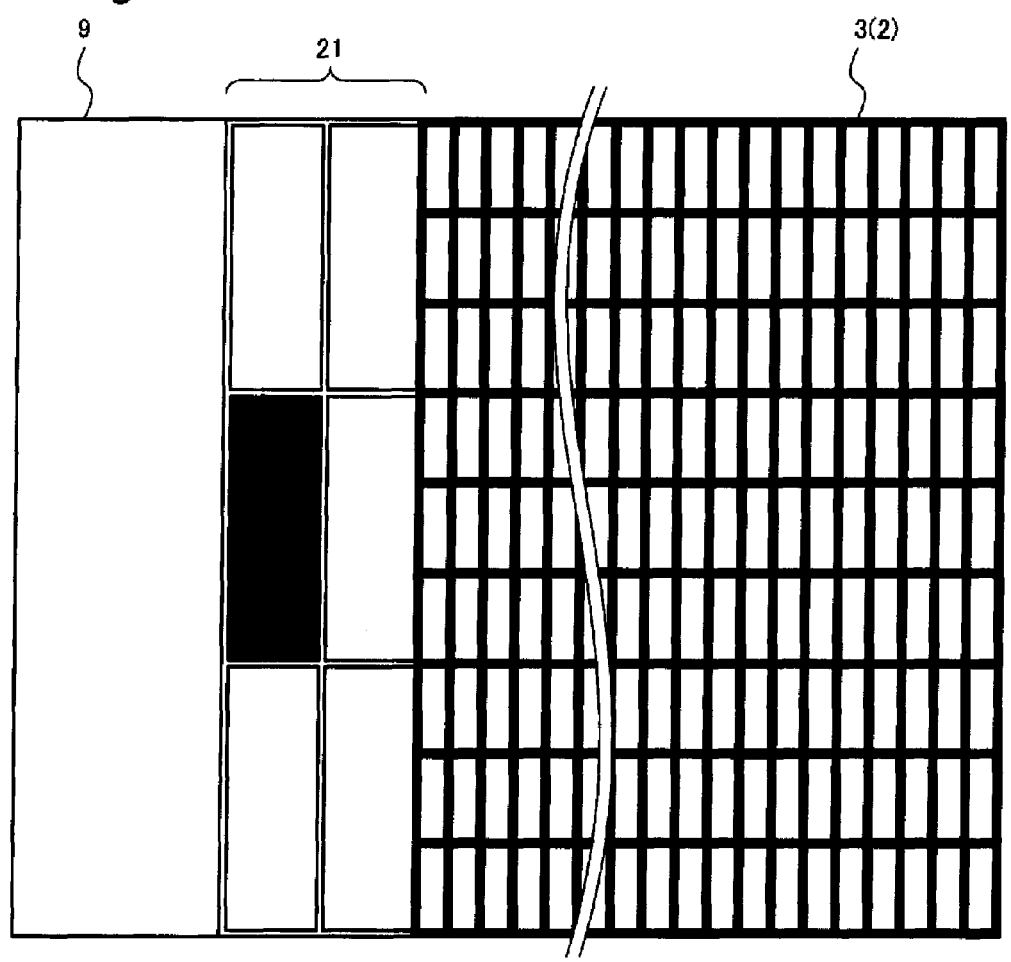
FIG. 27 is a plan view showing an outline of a positional relationship in the state where a liquid crystal display and a micro louver in an image forming apparatus of the ninth exemplary embodiment of the present invention are stacked.

FIG. 24 indicates schematic cross sectional views of the image forming apparatus 200 in this exemplary embodiment in the manufacturing process, and FIGS. 25-27 shows plan views.

A point of difference of this exemplary embodiment and the first exemplary embodiment is a point that a micro louver alignment mark 22 for dummy pixels is formed in the outside of the forming area of optical absorption layer 3 and transparent layer 4.

Optical absorption layer 3 is formed on the transparent substrate 5, and transparent layer 4 is formed between each optical absorption layer 3. The laminated substrate 6 is mounted on the surface of transparent layer 4 and optical absorption layer 3. The dummy pixel micro louver alignment mark 22 is formed outside the forming area of optical absorption layer 3 and transparent layer 4 (refer to FIG. 26). This micro louver 1 is mounted on the opposed substrate 9.

In the image forming apparatus 200 in this exemplary embodiment, alignment is made using dummy pixels 21 formed in a perimeter part of the opposed substrate 9 and the dummy pixel micro louver alignment mark 22. FIG. 27 shows a state of the dummy pixels 21 when the micro louver 1 is mounted without a positional displacement. Thus, because the dummy pixels 21 (refer to FIG. 25) and the dummy pixel micro louver alignment mark 22 fit with each other correctly, the whole of one of the dummy pixels 21 becomes black.

Figure 28:
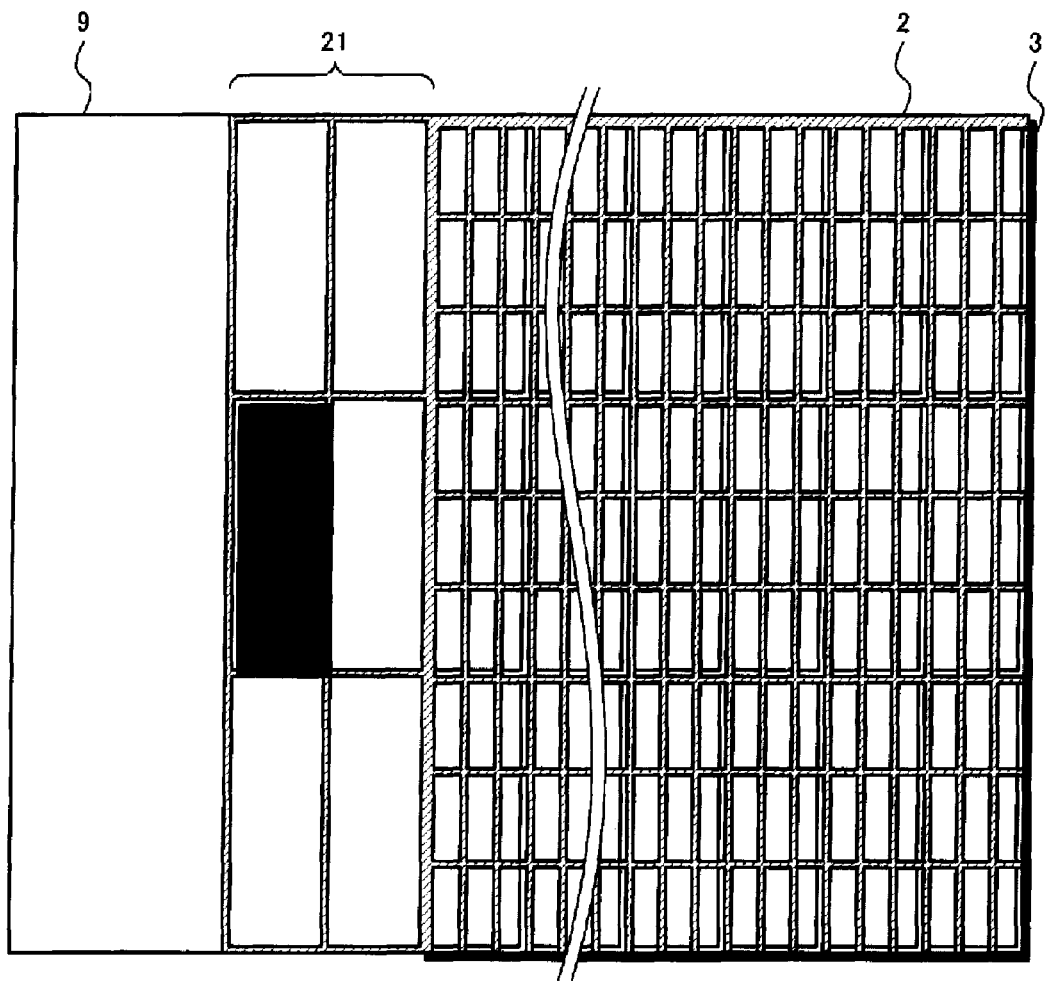
FIG. 28 is a plan view showing an outline of a positional relationship in the state where the positions of a liquid crystal display and a micro louver in an image forming apparatus of the ninth exemplary embodiment of the present invention shift.
Figure 29:
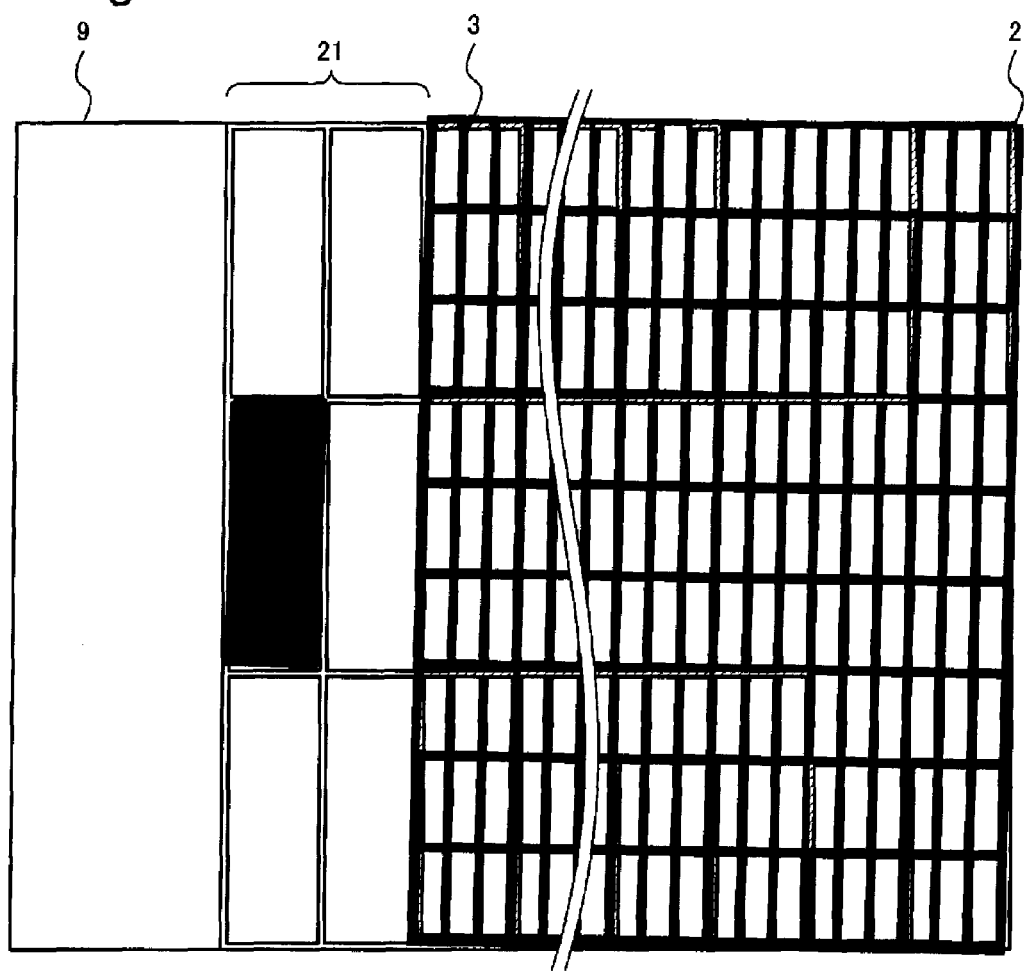
FIG. 29 is a plan view showing an outline of a positional relationship in the state where the positions of a liquid crystal display and a micro louver in an image forming apparatus of the ninth exemplary embodiment of the present invention shift.

In contrast, when the micro louver 1 is mounted with its position shifting, a gap is formed between the BM pattern 2 of the dummy pixel 21 and the dummy pixel micro louver alignment mark 22 as shown in FIG. 28 and FIG. 29, and as a result, it can be distinguished easily that a positional displacement is occurring.

[Description of the effect] By checking such state, the check of alignment of the micro louver 1 and the opposed substrate 9 can be carried out easily. Only opposed substrate 9 that has passed the alignment check among opposed substrate 9 to which the micro louver 1 is mounted is pasted together with the TFT substrate 16. Finally, by forming the liquid crystal layer 32, the image forming apparatus 200 of the eighth exemplary embodiment can be obtained.

Figures 35A, 35B:
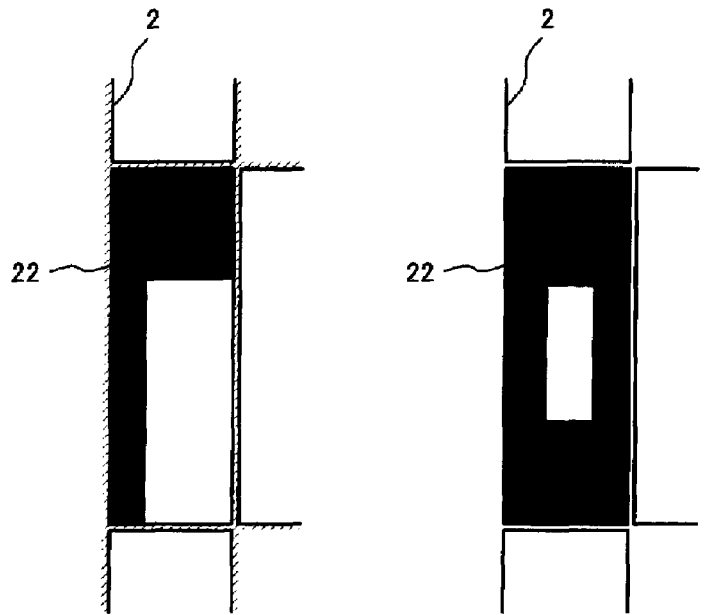
FIGS. 35A and 35B are plan views showing an outline of another example of an alignment pattern of a micro louver in an image forming apparatus of the ninth exemplary embodiment of the present invention.

Meanwhile, as the dummy pixel micro louver alignment mark 22, any pattern in which the horizontal and vertical lengths and the respective angles are identical with the shape of the dummy pixel 21 inside the BM pattern 2 is usable, and for example, the patterns as shown in FIGS. 35A and 35B can be also used.

As mentioned above, because a check of alignment of the micro louver 1 and the opposed substrate 9 can be performed easily according to this exemplary embodiment, it is possible to prevent occurrence of yield degradation caused by a positional displacement. Because an alignment mark or the like for alignment with the micro louver 1 does not need to be formed onto the opposed substrate 9, application of an existing pattern to the liquid crystal display 29 becomes easy.

[The Tenth Exemplary Embodiment]
Next, the tenth exemplary embodiment will be described in detail referring to drawings.

In this exemplary embodiment, a fixation method after alignment of the micro louver 1 is adjusted with the opposed substrate 9 will be described.

Figure 30A:
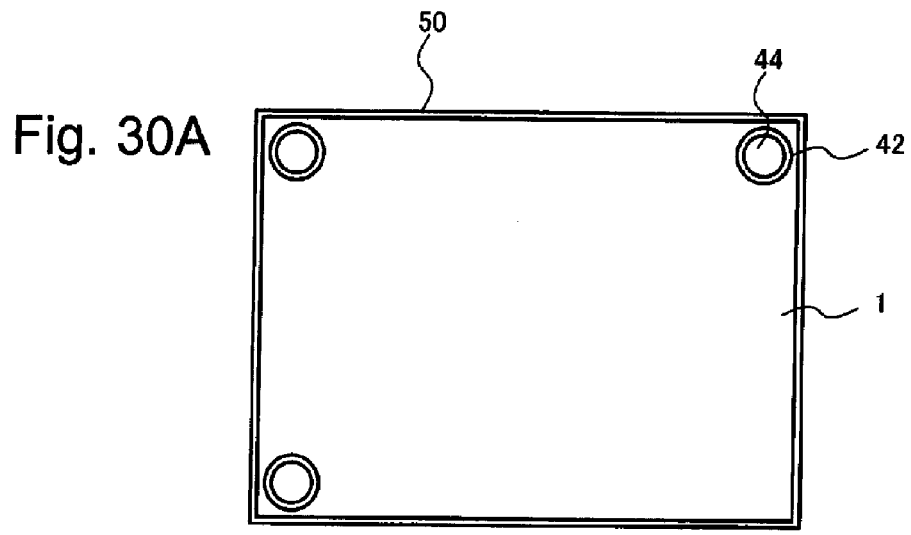
FIGS. 30A to 30C are plan views showing an outline of a method of rough adjustment in alignment of a micro louver on a stage.

As shown in FIG. 30A, the micro louver 1 in this exemplary embodiment has an alignment pin hole 42 in a perimeter part. Alignment with a stage 50 is performed by inserting an alignment pin 44 provided in the stage 50 side into the pinhole 42.

Figure 30B:
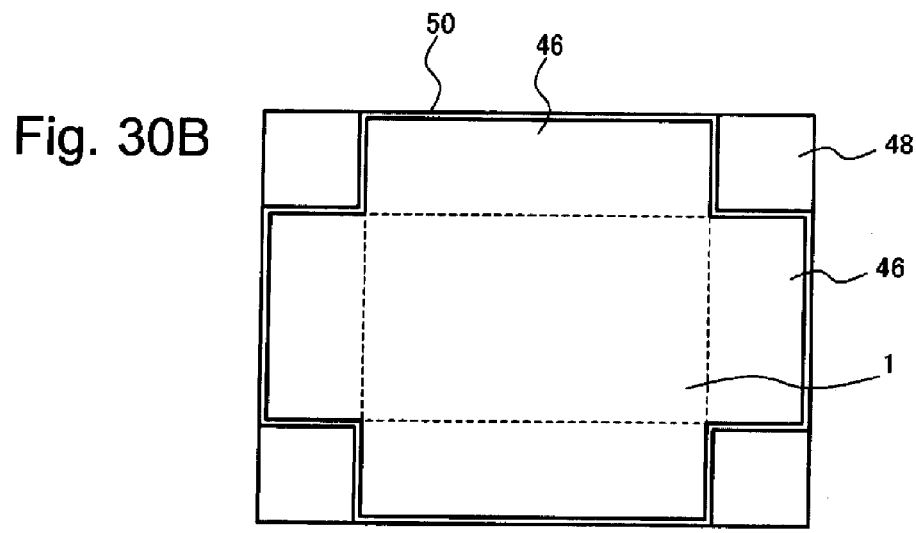

As an alternative of the alignment pin hole 42, alignment can be also made by forming an alignment protrusion 46 in the periphery of the micro louver 1 and fitting it to an alignment guide 48 as shown in FIG. 30B.

Figure 30C:
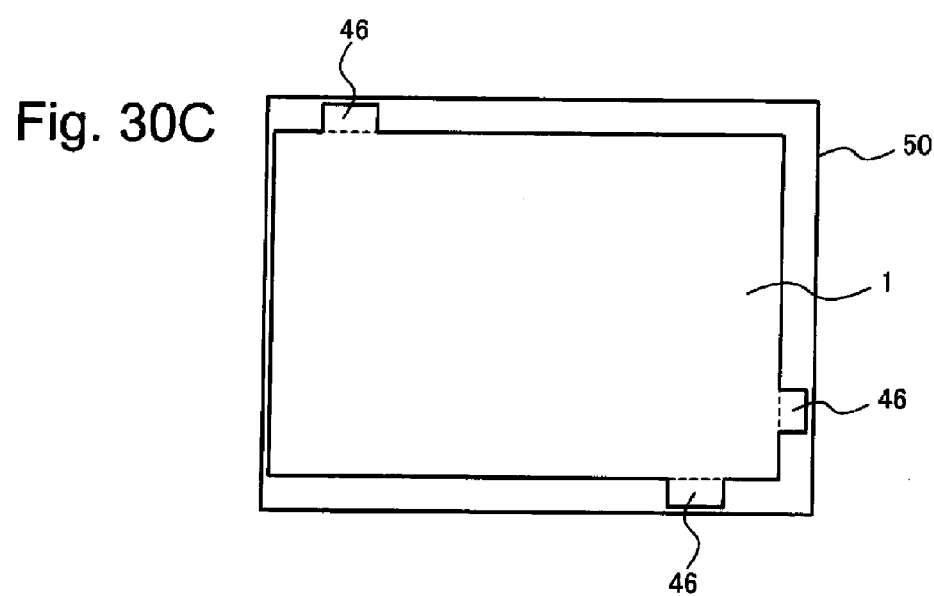

Further, there is a method to perform rough adjustment of a position by fitting the alignment protrusion 46 to the periphery of the stage 50 directly as shown in FIG. 30C.

[The Eleventh Exemplary Embodiment]
Next, the eleventh exemplary embodiment will be described.

Figure 32:
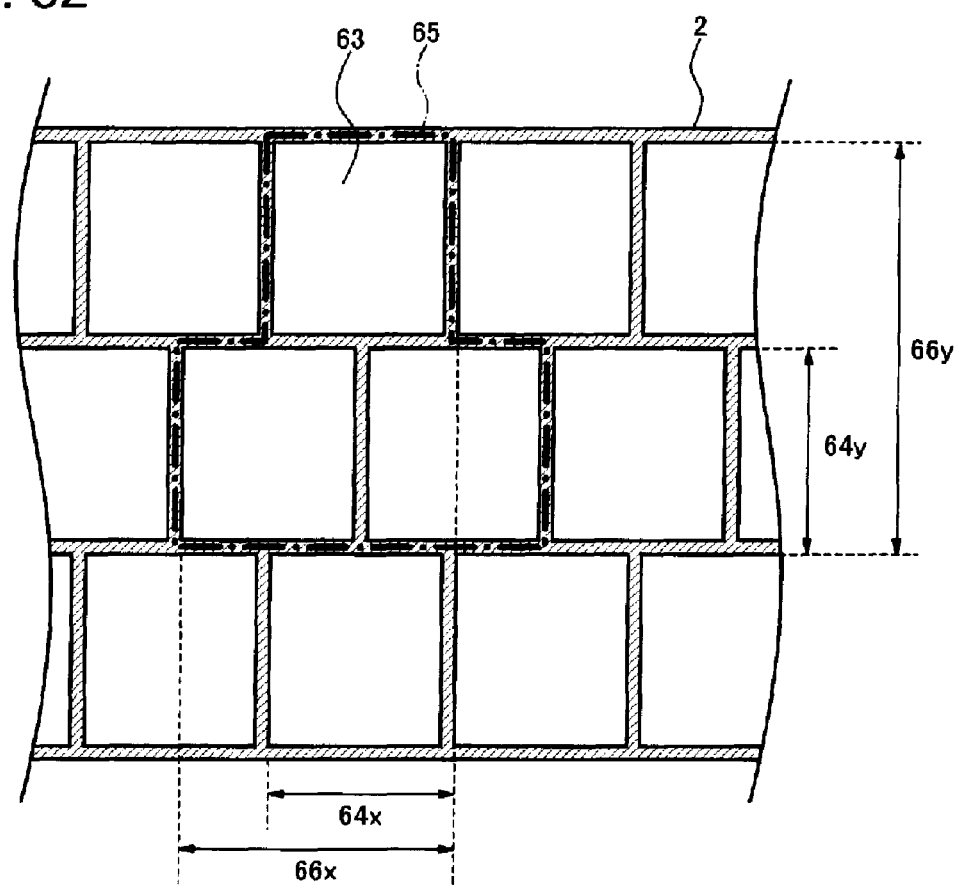
FIG. 32 is a plan view showing a pixel structure of a liquid crystal display in an image forming apparatus of an eleventh exemplary embodiment of the present invention.
Figure 33:
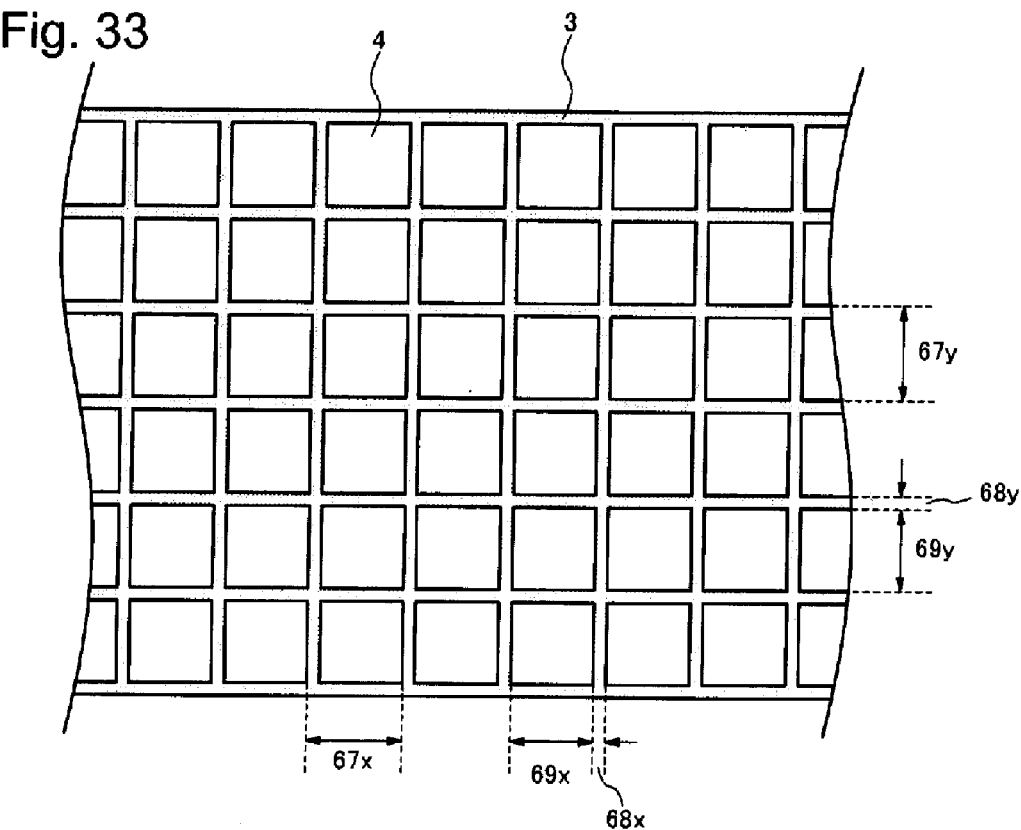
FIG. 33 is a plan view showing a structure of a micro louver in an image forming apparatus of the eleventh exemplary embodiment of the present invention.
Figure 34:
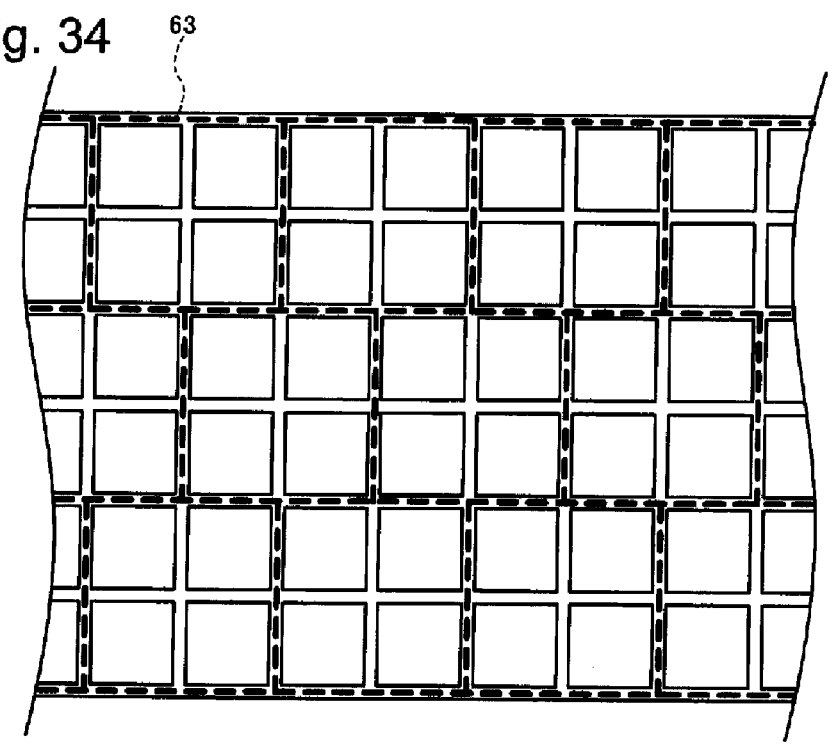
FIG. 34 is a plan view showing an outline of a positional relationship in the state where a liquid crystal display and a micro louver in an image forming apparatus of the eleventh exemplary embodiment of the present invention are stacked.

FIGS. 32-34 are plan views indicating a pixel structure of an image forming apparatus 200 of this exemplary embodiment.

A structure of the pixel 65 in the liquid crystal display 29 of this exemplary embodiment is shown in FIG. 32. The pixel 65 is indicated by a thick dashed-dotted line in this drawing. The pixel array is a delta array here. The pixel 65 includes three picture elements 63.

In this case, the X-direction pixel pitch 66x will be of a value obtained by multiplying the X-direction picture element pitch 64x by 1.5, and the Y-direction pixel pitch 66y be of a value obtained by multiplying the Y-direction picture element pitch 64y by 2. The liquid crystal display 29 in this exemplary embodiment can be applied to both a monochrome display and a color display. In the case of a monochrome display, there is no concept as the pixel 65 and only the picture element 63 is arranged, and in the case of a color display, picture element 63 of each of R, G and B is arranged in an arbitrary position in the pixel 65.

FIG. 33 indicates a structure of the micro louver 1 in this exemplary embodiment. Louver pitches 67 in the X-direction and the Y-direction are 67x and 67y respectively. The X-direction louver pitch 67x and the Y-direction louver pitch 67y are the sizes of 1/2 of the X-direction picture element pitch 64x and the Y-direction picture element pitch 64y shown in FIG. 32 respectively.

The surface structure in the state that the micro louver 1 is stacked on the liquid crystal display 29 is shown in FIG. 34. The position of picture element 63 is indicated by a dotted line in the drawing. Four transparent layer 4 of the micro louver 1 exist in one picture element 63, and the position of the BM pattern 2 (not illustrated) is identical with that of optical absorption layer 3.

[Description of the effect] The image forming apparatus 200 in this exemplary embodiment described above can be applied not only to the liquid crystal display 29 but also to other display devices having a display panel such as a plasma display, for example.

As a pattern of usage of the image forming apparatus 200 of this exemplary embodiment, there is a pattern that it is mounted onto an optical writing type electronic paper 150 which holds a projected document image in the display part. A structure in this usage pattern will be described in detail below.

The image forming apparatus 200 in this exemplary embodiment can be installed into the optical writing type electronic paper 150 which holds a projected document image in the display part. Meanwhile, it is supposed that the micro louver 1 will be described taking the image forming apparatus 200 described in the second exemplary embodiment as an example.

Figure 31:
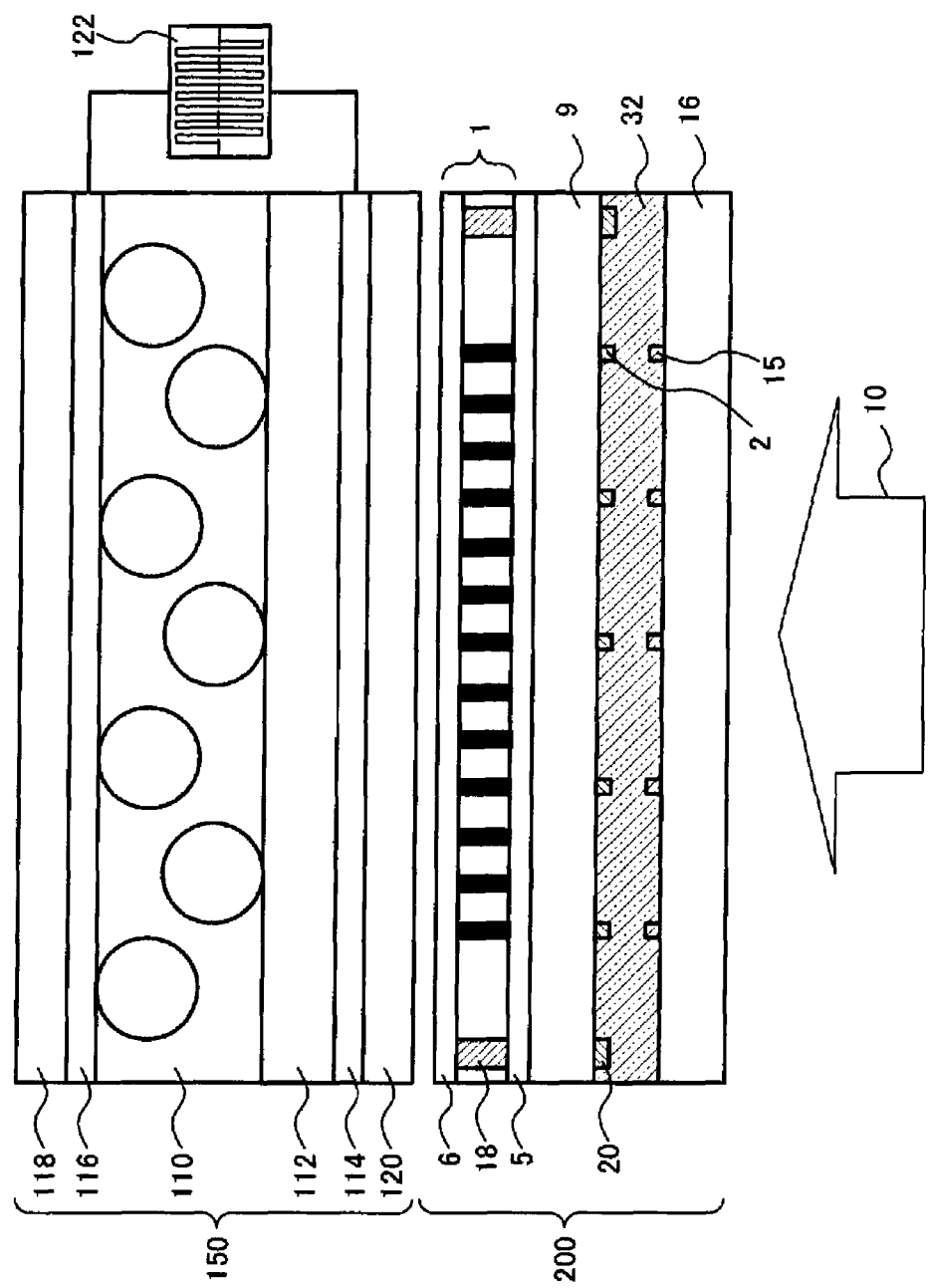
FIG. 31 is a sectional view showing a structure of optical writing type electronic paper to which an image forming apparatus of the present invention is mounted.

In FIG. 31, a structure where the image forming apparatus 200 in this exemplary embodiment is mounted onto the optical writing type electronic paper 150 is shown. Referring to FIG. 31, the optical writing type electronic paper 150 includes an indication recording medium and a power supply 122.

As it has been described in the second exemplary embodiment, in the image forming apparatus 200, luminance degradation by the micro louver 1 is suppressed to a minimum and nonuniformity of transmittance does not occur, resulting in a good light distribution characteristic.

The indication recording medium includes a cholesteric liquid crystal 110, a photoconductive layer 112, transparent electrodes 114, 116 and a transparent substrates 118, 120. By applying a voltage to the transparent electrodes 114, 116 at the same time as light from the image forming apparatus 200 enters the photoconductive layer 112, intensity of the incident light is converted into reflecting density and it is indicated and held by the cholesteric liquid crystal 110. At that time, a resolution of image information held by the cholesteric liquid crystal 110 depends on a resolution of the light which enters the photoconductive part from the image forming apparatus 200.

According to the optical writing type electronic paper 150 mentioned above, because, by the micro louver 1, it becomes possible to control a light distribution characteristic of emitted light from the image forming apparatus 200 in the normal line direction of the image plane, the resolution of electronic paper can be improved.

Meanwhile, in patent document 1 and patent document 2, the position of a micro louver installed in the foreside of a display device and the position of a picture element in the display device are not arranged corresponding to each other. Therefore, there is a problem that the number of optical absorption layers which exist within a picture element of the display device varies in the substrate surface, and thus the rate of luminance fall of the display device varies within the surface.

An exemplary advantage according to the invention is that variation of a rate of luminance fall of a display device within the surface can be suppressed according to an image forming apparatus of the present invention.

While the invention has been particularly shown and described with reference to exemplary embodiments thereof, the invention is not limited to these embodiments.

It will be understood by those of ordinary skill in the art that various changes in form and details may be made therein without departing from the spirit and scope of the present invention as defined by the claims.

EXPLANATION OF THE SYMBOLS

1 Micro louver
2 BM pattern
3 Optical absorption layer
4 Transparent layer
5 Transparent substrate
6 Laminated substrate
7 Transparent photosensitive resin
8 Exposing light
9 Opposed substrate
10 Backlight
12 Black hardening resin
15 TFT pattern
16 TFT substrate
18 Micro louver alignment mark
19 Micro louver alignment mark pattern
20 Opposed substrate alignment mark
21 Dummy pixel
22 Dummy pixel micro louver alignment mark
27a and 27b Substrate
28a and 28b Transparent electrode
29 Liquid crystal display
32 Liquid crystal layer
34 Gate insulation film
35 Interlayer insulation film
36 Drain wire
37 Source electrode
38 Gate electrode
39 Active layer
40 Drain electrode
42 Alignment pin hole
44 Alignment pin
46 Alignment protrusion
48 Alignment guide
50 Stage
61 Louver pitch
61a Louver pitch
61b Louver pitch
62a and 62b Optical absorption layer width
63 Picture element
64 Picture element pitch
64x X-direction picture element pitch 64y Y-direction picture element pitch
65 Pixel
66 Pixel pitch
66x X-direction pixel pitch
66y Y-direction pixel pitch
67x X-direction louver pitch
67y Y-direction louver pitch
68x X-direction Optical absorption layer width
68y Y-direction Optical absorption layer width
69x X-direction transparent layer width
69y Y-direction transparent layer width
70 Transmitted light
75 Blocked light
80 Photomask
82 Mask pattern
110 Cholesteric liquid crystal
112 Photoconductive layer
114,116 Transparent electrode
118,120 Transparent substrate
122 Power supply
150 Optical writing type electronic paper
200 Image forming apparatus

The invention claimed is:

1. An image forming apparatus, comprising:
a functional element substrate in which a pixel is arranged in a predetermined pitch;
an opposed substrate formed on said functional element substrate;
an optical device arranged on said opposed substrate; and
a plurality of black matrix patterns arranged on said opposed substrate,
wherein said optical device comprises a transparent layer and an optical absorption layer arranged in a pitch of 1/n (n is an integer number) of said pitch of arranging said pixel, which restricts spread of transmitted light, and
a position of at least a part of said optical absorption layer and a position of at least one of said black matrix patterns are aligned with each other.

2. The image forming apparatus according to claim 1, wherein
an alignment mark is formed onto said optical device; and
an alignment mark corresponding to said optical device alignment mark is formed onto said opposed substrate.

3. The image forming apparatus according to claim 2, wherein
said optical device alignment mark is formed from an optical absorption layer.

4. The image forming apparatus according to claim 3, wherein
said optical device alignment mark and a part restricting transmitted light are formed continuously.

5. The image forming apparatus according to claim 1, wherein
said optical device is arranged in a light emission side of said functional element substrate.

6. The image forming apparatus according to claim 1, wherein
said optical device is arranged in a light incident side of said functional element substrate.

7. The image forming apparatus according to claim 1, wherein
said optical device is arranged for the side facing said functional element substrate in said opposed substrate.

8. The image forming apparatus according to claim 1, wherein
said optical device is formed directly on said opposed substrate.

9. The image forming apparatus according to claim 1, wherein
there is not a light shielding pattern except said optical absorption layer of said optical device in the domain of said pixels.

10. The image forming apparatus according to claim 1, wherein
said functional element substrate includes a thin film transistor; and wherein
said optical absorption layer and at least part of a gate electrode constituting said thin film transistor are arranged in a manner said optical absorption layer and said at least part of said gate electrode overlap.

11. The image forming apparatus according to claim 1, wherein
said opposed substrate includes said light shielding pattern;
a width of said optical absorption layer at an opposed position of said light shielding pattern is wider than a width of said light shielding pattern; and
a width of said optical absorption layer at a position not opposed to said light shielding pattern is of a shape smaller than a width of said light shielding pattern.

12. The image forming apparatus according to claim 2, wherein
said alignment mark provided in said opposed substrate is a dummy pixel; and
said optical device includes an alignment mark corresponding to said dummy pixel.

13. The image forming apparatus according to claim 1, wherein n is not smaller than 2.

14. The image forming apparatus according to claim 1, wherein the optical absorption layer is formed on a position on the opposed substrate opposed to said plurality of black matrix patterns.

15. The image forming apparatus according to claim 1, wherein the transparent layer has a height of 30 µm to 300 µm.

16. The image forming apparatus according to claim 1, wherein the transparent layer has a width of 5 µm to 150 µm.

17. The image forming apparatus according to claim 1, wherein the optical absorption layer has a width of 5 µm to 150 µm at a surface of the opposed substrate.

18. The image forming apparatus according to claim 1, wherein the image forming apparatus is a micro louver and a liquid crystal display.

19. The image forming apparatus according to claim 18, wherein the micro louver has a pitch, the liquid crystal display has a picture element pitch, and an aspect ratio of the transparent layer defined as a ratio of a height of the transparent layer to a width of the transparent layer is 3:1.

20. The image forming apparatus according to claim 18, wherein the micro louver pitch/the picture element pitch is 1/2.

* * * * *